United States Patent
Da Silva et al.

(10) Patent No.: US 12,317,223 B2
(45) Date of Patent: May 27, 2025

(54) RELEASE, SUSPEND AND RECONFIGURATION IN PAGING

(71) Applicant: Telefonaktiebolaget LM Ericsson (publ), Stockholm (SE)

(72) Inventors: Icaro L. J. Da Silva, Solna (SE); Magnus Stattin, Upplands Väsby (SE); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 533 days.

(21) Appl. No.: 17/624,484

(22) PCT Filed: Jul. 3, 2020

(86) PCT No.: PCT/SE2020/050710
§ 371 (c)(1),
(2) Date: Jan. 3, 2022

(87) PCT Pub. No.: WO2021/015655
PCT Pub. Date: Jan. 28, 2021

(65) Prior Publication Data
US 2023/0007623 A1    Jan. 5, 2023

Related U.S. Application Data

(60) Provisional application No. 62/876,142, filed on Jul. 19, 2019.

(51) Int. Cl.
*H04W 68/00* (2009.01)
*H04W 24/08* (2009.01)
(Continued)

(52) U.S. Cl.
CPC ......... *H04W 68/005* (2013.01); *H04W 24/08* (2013.01); *H04W 76/19* (2018.02); *H04W 76/30* (2018.02)

(58) Field of Classification Search
CPC ... H04W 68/005; H04W 24/08; H04W 76/19; H04W 76/30; H04W 52/0238;
(Continued)

(56) References Cited

U.S. PATENT DOCUMENTS

2010/0216421 A1*  8/2010  Hsu ............... H04W 76/50
                                                      455/404.1
2017/0325282 A1   11/2017  Hong et al.
(Continued)

FOREIGN PATENT DOCUMENTS

EP        3481140 A1    5/2019
WO     2019096912 A1    5/2019
(Continued)

OTHER PUBLICATIONS

"3GPP TS 36.331 V15.6.0", 3rd Generation Partnership Project; Technical Specification Group Radio Access Network; Evolved Universal Terrestrial Radio Access (E-UTRA); Radio Resource Control (RRC); Protocol specification (Release 15), Jun. 2019, pp. 1-960.
(Continued)

*Primary Examiner* — John D Blanton
(74) *Attorney, Agent, or Firm* — Weisberg I.P. Law, P.A.

(57) ABSTRACT

A wireless device performs a method for updating a stored configuration. While in a power saving state, the wireless device monitors a paging channel. When the wireless device receives a paging message on the paging channel, it determines whether the paging channel includes a message relating to updating a stored configuration of the wireless device. If the paging channel includes a message relating to updating the stored configuration of the wireless device, the wireless device performs actions determined by said message.

17 Claims, 29 Drawing Sheets

(51) Int. Cl.
*H04W 76/19* (2018.01)
*H04W 76/30* (2018.01)

(58) Field of Classification Search
CPC . H04W 52/0251; H04W 52/02; H04W 76/11; H04W 76/27; Y02D 30/70
See application file for complete search history.

(56) References Cited

U.S. PATENT DOCUMENTS

| | | | | |
|---|---|---|---|---|
| 2018/0098269 | A1* | 4/2018 | Pradas | H04L 41/0813 |
| 2019/0021058 | A1 | 1/2019 | Cheng et al. | |
| 2019/0150221 | A1 | 5/2019 | Tseng et al. | |
| 2019/0182693 | A1* | 6/2019 | Zhang | H04W 36/0085 |
| 2019/0387496 | A1* | 12/2019 | Liu | H04W 4/06 |
| 2021/0014928 | A1* | 1/2021 | Zheng | H04W 68/005 |
| 2021/0160890 | A1* | 5/2021 | Selvanesan | H04W 72/56 |
| 2021/0410107 | A1* | 12/2021 | Park | H04W 68/02 |
| 2022/0124859 | A1* | 4/2022 | Wang | H04W 76/12 |
| 2022/0150739 | A1* | 5/2022 | Da Silva | H04W 12/0431 |
| 2022/0167140 | A1* | 5/2022 | Shrestha | H04W 4/90 |
| 2022/0174562 | A1* | 6/2022 | Da Silva | H04W 76/27 |
| 2022/0174593 | A1* | 6/2022 | Teyeb | H04W 24/08 |
| 2022/0217598 | A1* | 7/2022 | Ishii | H04W 36/0058 |
| 2022/0264518 | A1* | 8/2022 | Da Silva | H04W 76/27 |

FOREIGN PATENT DOCUMENTS

| | | |
|---|---|---|
| WO | 2020069144 A1 | 4/2020 |
| WO | 2020186092 A2 | 9/2020 |
| WO | 2021010880 A1 | 1/2021 |

OTHER PUBLICATIONS

"3GPP TS 38.213 V15.6.0", 3rd Generation Partnership Project; Technical Specification Group Radio Access Network; NR; Physical layer procedures for control (Release 15), Jun. 2019, pp. 1-107.

"3GPP TS 24.501 V16.1.0", Non-Access-Stratum (NAS) protocol for 5G System (5GS); Stage 3, Jun. 2019, pp. 1-541.

"3GPP TS 38.300 V15.5.0", 3rd Generation Partnership Project; Technical Specification Group Radio Access Network; NR; NR and NG-RAN Overall Description; Stage 2 (Release 15), Mar. 2019, pp. 1-97.

"3GPP TS 38.321 V15.5.0", 3rd Generation Partnership Project; Technical Specification Group Radio Access Network; NR; Medium Access Control (MAC) protocol specification (Release 15), Mar. 2019, pp. 1-78.

"3GPP TS 38.331 V15.5.1", 3rd Generation Partnership Project; Technical Specification Group Radio Access Network; NR; Radio Resource Control (RRC) protocol specification (Release 15), Apr. 2019, pp. 1-491.

"3GPP TS 38.304 V15.3.0", 3rd Generation Partnership Project; Technical Specification Group Radio Access Network; NR; User Equipment (UE) procedures in Idle mode and RRC Inactive state (Release 15), Mar. 2019, pp. 1-29.

"3GPP TS 33.501 V15.4.0", 3rd Generation Partnership Project; Technical Specification Group Services and System Aspects; Security architecture and procedures for 5G system (Release 15), Mar. 2019, pp. 1-187.

* cited by examiner

RELEASE, SUSPEND AND RECONFIGURATION IN PAGING

TECHNICAL FIELD

This disclosure relates to methods and devices for updating a stored configuration of a device in a wireless communications network.

BACKGROUND

More specifically, this disclosure relates to issues relating to paging, and to monitoring of paging while a User Equipment (UE) is in an inactive state.

In wireless communications networks operating in accordance with the Long-Term Evolution (LTE) or New Radio (NR) standards, paging allows the network to reach UEs in RRC_IDLE and in RRC_INACTIVE state, and to notify UEs in RRC_IDLE, RRC_INACTIVE and RRC_CONNECTED state of system information changes and ETWS/CMAS indications. RRC refers to the Radio Resource Control protocol layer.

In RRC_IDLE the UE monitors the paging channels for Core Network (CN)-initiated paging (e.g. with a CN paging identifier). In RRC_INACTIVE the UE monitors paging channels for Radio Access Network (RAN)-initiated paging, for example with a RAN paging identifier, such as the Inactive Radio Network Temporary Identifier (I-RNTI). A UE need not monitor paging channels continuously though; Paging Discontinuous Reception (DRX) is defined where the UE in RRC_IDLE or RRC_INACTIVE is only required to monitor paging channels during one Paging Occasion (PO) per DRX cycle (as defined in TS 38.304). The Paging DRX cycles are configured by the network:
- For CN-initiated paging, a default cycle is broadcast in system information;
- For CN-initiated paging, a UE specific cycle can be configured via Non-access stratum (NAS) signalling;
- For RAN-initiated paging, a UE-specific cycle is configured via RRC signalling;
- The UE uses the shortest of the DRX cycles applicable i.e. a UE in RRC_IDLE uses the shortest of the first two cycles above, while a UE in RRC_INACTIVE uses the shortest of the three.

The POs of a UE for CN-initiated and RAN-initiated paging are based on the same UE Identifier (ID), resulting in overlapping POs for both states. The number of different POs in a DRX cycle is configurable via system information and a network may distribute UEs to those POs based on their IDs.

Paging is defined as an RRC message. It is transmitted in Radio Link Control-Service Access Point Transparent Mode (RLC-SAP TM) and over a Paging Control Channel (PCCH), whose lower layer configuration(s) are broadcast in system information.

To receive paging messages from the Evolved Universal Terrestrial Radio Access Network (E-UTRAN), UEs in idle mode monitor the Physical Downlink Control Channel (PDCCH) channel for a Radio Network Temporary Identifier (RNTI) value used to indicate paging: the Paging Radio Network Temporary Identifier (P-RNTI) (see Section 9.2.2.2). The UE only needs to monitor the PDCCH channel at certain UE-specific occasions (i.e. at specific subframes within specific radio frames—see Section 6.2 for an introduction to the LTE radio frame structure.). At other times, the UE may apply DRX, meaning that it can switch off its receiver to preserve battery power.

Paging is transmitted as: a Downlink Control Information (DCI) on the common PDCCH addressed to a special identifier called the P-RNTI, allocating Physical Downlink Shared Channel (PDSCH) resources for transmission of a Paging RRC message, containing a list of max 32 UE paging IDs. A UE has to decode the Paging RRC message to find out whether it is paged. Paging may be configured in multiple Bandwidth Parts (BWPs), but only the initial BWP is used for RRC_INACTIVE and RRC_IDLE UEs.

In RRC_IDLE, the UE monitors one PO in its DRX cycle (also known as its paging cycle). The DRX cycle is the smallest of a default DRX cycle configured in system information (SI) and a possible UE specific DRX cycle sent from the UE to the Access and Mobility Management Function (AMF) in the Registration NAS message. The UE monitors CN paging and SI update notifications. In RRC_INACTIVE, the UE monitors one PO in its DRX cycle, configured by the anchor base station (for example a gNB in NR) in the RRCRelease message. The RAN paging cycle can be shorter than the CN paging cycle, but every CN PO must coincide with a RAN PO. In RRC_CONNECTED the UE monitors any PO, but at least one during each SI modification period. The UE only monitors SI update notifications, i.e. it does not have to decode the PDSCH.

When it comes to the exact transmission scheme of paging messages, some concepts exist in NR. A paging frame (PF) is defined as a frame with 1, 2 or 4 associated paging occasions (POs). The UE monitors one paging occasion (PO) per DRX cycle. A PO is a set of PDCCH monitoring occasions (MOs) and can consist of multiple time slots (e.g. subframes or Orthogonal Frequency Division Multiplexing (OFDM) symbols) where paging DCI can be sent (TS 38.213). In multi-beam operations, the UE assumes that the same paging message is repeated in all transmitted beams and thus the selection of the beam(s) for the reception of the paging message is up to UE implementation. The paging message is same for both RAN initiated paging and CN initiated paging.

The number of PDCCH monitoring occasions for each PO is equal to the number of Synchronisation Signal Blocks (SSBs) in the cell. And there can be different manners to configure these PDCCH paging occasions:
- Non-default association—the pagingSearchSpace is configured and its searchSpaceId is not set to 0:
- The PDCCH monitoring occasions configured by the pagingSearchSpace, excluding PDCCH monitoring occasions overlapping with Uplink (UL) symbols, are sequentially numbered from 0 starting with the first PDCCH monitoring occasion following the start of the PF.
- If the firstPDCCH-MonitoringOccasionOfPO parameter is configured in the first System Information Block (SIB1), with one value for each PO associated with the PF, it points out the first of a set of S consecutively numbered PDCCH monitoring occasions for each PO. There may be unused PDCCH monitoring occasions before the first PO and between the POs.
- Otherwise, the POs are packed back to back from the first numbered PDCCH monitoring occasion in the PF, i.e. the PO with index i_s consists of a set of S consecutively numbered PDCCH monitoring occasions starting at number i_s*S.
- Non-default association—the pagingSearchSpace is configured and its searchSpaceId is not set to 0:
- The PDCCH monitoring occasions for paging are the same as for remaining minimum system information (RMSI), determined as described in chapter 13 of TS 38.213, based on the index provided in pdcch-ConfigSIB1 in the Master Information Block (MIB).

Some examples are shown below.

Specifically, FIG. 1 shows the PDCCH monitoring occasion grouping for paging occasions, in the case of an example with 2 paging occasions per frame and 4 beams.

Thus, FIG. 1 shows a paging frame 100, consisting of multiple slots, which includes multiple OFDM symbols, where the OFDM symbols that may be monitored are shown shaded. The potential PDCCH monitoring occasions are numbered 0, 1, 2, . . . , 59.

As shown at 102, the first paging occasion starts at monitoring occasion 3 and includes monitoring occasions 3-6. As shown at 104, the second paging occasion starts at monitoring occasion 33 and includes monitoring occasions 33-36.

Similarly, FIG. 2 shows the PDCCH monitoring occasion grouping for paging occasions, in the case of examples with 4 paging occasions per frame and 8 beams.

Thus, FIG. 2 shows a first example of a paging frame 200, consisting of multiple slots, which includes multiple OFDM symbols, and multiple potential PDCCH monitoring occasions. The paging frame 200 is an example with first PDCCH-Monitoring OccasionOfPO, and, as shown at 202, the four paging occasions PO1, PO2, PO3, and PO4 start at monitoring occasions 0, 15, 30, and 45 respectively.

FIG. 2 also shows a second example of a paging frame 210, again consisting of multiple slots, which includes multiple OFDM symbols, and multiple potential PDCCH monitoring occasions. The paging frame 210 is an example without first PDCCH-Monitoring OccasionOfPO, and shows the four paging occasions PO1, PO2, PO3, and PO4.

FIG. 3 shows an overview of a UE performing the monitoring for a paging message in its POs during its DRX cycles and the procedure when the UE responds to paging (in this particular example a CN initiated paging).

When the UE is camping on a cell (while in any of the power saving states, such as Idle or Inactive), the UE monitors the paging channel for that cell. And, in the case the UE is in Inactive state, the reception of a paging message addressed to a given Inactive UE leads that UE to initiate a Resume procedure in that cell in the success case (i.e. when network triggers RAN paging for an Inactive UE), as shown below, as captured in TS 38.331:

Reception of the Paging Message by the UE
Upon receiving the Paging message, the UE shall:
1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored full-RNTI:
3> if the UE is configured by upper layers with Access Identity 1:
4> initiate the RRC connection resumption procedure according to 5.3.13 with resumeCause set to mps-PriorityAccess;
3> else if the UE is configured by upper layers with Access Identity 2:
4> initiate the RRC connection resumption procedure according to 5.3.13 with resumeCause set to mcs-PriorityAccess;
3> else if the UE is configured by upper layers with one or more Access Identities equal to 11-15:
4> initiate the RRC connection resumption procedure according to 5.3.13 with resumeCause set to highPriorityAccess;
3> else:
4> initiate the RRC connection resumption procedure according to 5.3.13 with resumeCause set to mt-Access;
2> else if the ue-Identity included in the PagingRecord matches the UE identity allocated by upper layers:
3> forward the ue-Identity to upper layers and accessType (if present) to the upper layers;
3> perform the actions upon going to RRC_IDLE as specified in 5.3.11 with release cause 'other'.
. . .

```
Paging
The Paging message is used for the notification of one or more UEs.
Signalling radio bearer: N/A
RLC-SAP: TM
Logical channel: PCCH
Direction: Network to UE
Paging message
-- ASN1START
-- TAG-PAGING-START
Paging ::=                    SEQUENCE {
    pagingRecordList              PagingRecordList        OPTIONAL, -- Need N
    lateNonCriticalExtension      OCTET STRING            OPTIONAL,
    nonCritical Extension         SEQUENCE{ }             OPTIONAL
}
PagingRecordList ::=          SEQUENCE (SIZE(1..maxNrofPageRec)) OF
PagingRecord
PagingRecord ::=              SEQUENCE {
    ue-Identity                   PagingUE-Identity,
    accessType                    ENUMERATED {non3GPP}    OPTIONAL, -- Need N
    ...
}
PagingUE-Identity ::=         CHOICE {
    ng-5G-S-TMSI                  NG-5G-S-TMSI,
    fullI-RNTI                    I-RNTI-Value,
    ...
}
-- TAG-PAGING-STOP
-- ASN1STOP
```

As mentioned above, the RRC connection resume procedure is described in section 5.3.13 of the standard.

FIG. 4 illustrates the successful RRC connection resume procedure, as shown in FIG. 5.3.13.1-1 of the standard.

The purpose of the procedure is to resume a suspended RRC connection, including resuming SRB(s) and DRB(s) or perform an RNA update.

The standard describes the initiation procedure in section 5.3.13.2.

Initiation

The UE initiates the procedure when upper layers or AS (when responding to RAN paging or upon triggering RNA updates while the UE is in RRC_INACTIVE) requests the resume of a suspended RRC connection.

The UE shall ensure having valid and up to date essential system information as specified in clause 5.2.2.2 before initiating this procedure.

Upon initiation of the procedure, the UE shall:
1> if the resumption of the RRC connection is triggered by response to NG-RAN paging:
2> select '0' as the Access Category;
2> perform the unified access control procedure as specified in 5.3.14 using the selected Access Category and one or more Access Identities provided by upper layers;
3> if the access attempt is barred, the procedure ends;
. . .
1> release the MCG SCell(s) from the UE Inactive AS context, if stored;
1> apply the default L1 parameter values as specified in corresponding physical layer specifications, except for the parameters for which values are provided in SIB1;
1> apply the default SRB1 configuration as specified in 9.2.1;
1> apply the default MAC Cell Group configuration as specified in 9.2.2;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> apply the CCCH configuration as specified in 9.1.1.2;
1> apply the timeAlignmentTimerCommon included in SIB1;
1> start timer T319;
1> set the variable pendingRnaUpdate to false;
1> initiate transmission of the RRCResumeRequest message or RRCResumeRequest1 in accordance with 5.3.13.3.

Section 5.3.13.3 sets out the actions related to transmission of RRCResumeRequest or RRCResumeRequest1 message:—

The UE shall set the contents of RRCResumeRequest or RRCResumeRequest1 message as follows:
1> if field useFullResumeID is signalled in SIB1:
2> select RRCResumeRequest1 as the message to use;
2> set the resumeIdentity to the stored fullI-RNTI value;
1> else:
2> select RRCResumeRequest as the message to use;
2> set the resumeIdentity to the stored shortI-RNTI value;
1> restore the RRC configuration and AS security context from the stored UE Inactive AS context except the masterCellGroup;
1> set the resumeMAC-I to the 16 least significant bits of the MAC-I calculated:
2> over the ASN.1 encoded as per clause 8 (i.e., a multiple of 8 bits) VarResumeMAC-Input;
2> with the KRRCint key in the UE Inactive AS Context and the previously configured integrity protection algorithm; and
2> with all input bits for COUNT, BEARER and DIRECTION set to binary ones;
1> restore the RRC configuration and the KgNB and KRRCint keys from the UE Inactive AS context except the masterCellGroup and pdcp-Config;
1> derive the KgNB key based on the current KgNB key or the NH, using the stored nextHopChainingCount value, as specified in TS 33.501 [11];
1> derive the KRRCenc key, the KRRCint key, the KUPint key and the KUPenc key;
1> configure lower layers to apply integrity protection for all radio bearers except SRB0 using the configured algorithm and the KRRCint key and KUPint key derived in this subclause immediately, i.e., integrity protection shall be applied to all subsequent messages received and sent by the UE;

NOTE 1: Only DRBs with previously configured UP integrity protection shall resume integrity protection.

1> configure lower layers to apply ciphering for all radio bearers except SRB0 and to apply the configured ciphering algorithm, the KRRCenc key and the KUPenc key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.

NOTE 2: Only DRBs with previously configured UP ciphering shall resume ciphering.

If lower layers indicate an integrity check failure while T319 is running, perform actions specified in 5.3.13.5.

The UE shall continue cell re-selection related measurements as well as cell re-selection evaluation.

Section 5.3.13.4 describes reception of the RRCResume by the UE:—

The UE shall:
1> stop timer T319;
1> stop timer T380, if running;
1> if the RRCResume includes the fullConfig:
2> perform the full configuration procedure as specified in 5.3.5.11;
1> else:
2> restore the masterCellGroup and pdcp-Config from the UE Inactive AS context;
1> discard the UE Inactive AS context except the ranNotificationAreaInfo;
1> if the RRCResume includes the masterCellGroup:
2> perform the cell group configuration for the received masterCellGroup according to 5.3.5.5;
1> if the RRCResume includes the radioBearerConfig:
2> perform the radio bearer configuration according to 5.3.5.6;
1> resume SRB2 and all DRBs;
1> if stored, discard the cell reselection priority information provided by the cellReselectionPriorities or inherited from another RAT;
1> stop timer T320, if running;
1> if the RRCResume message includes the measConfig:
2> perform the measurement configuration procedure as specified in 5.5.2;
1> resume measurements if suspended;
1> if T390 is running:
2> stop timer T390 for all access categories;

2> perform the actions as specified in 5.3.14.4;
1> if T302 is running:
2> stop timer T302;
2> perform the actions as specified in 5.3.14.4;
1> enter RRC_CONNECTED;
1> indicate to upper layers that the suspended RRC connection has been resumed;
1> stop the cell re-selection procedure;
1> consider the current cell to be the PCell;
1> set the content of the of RRCResumeComplete message as follows:
2> if the upper layer provides NAS PDU, set the dedicatedNAS-Message to include the information received from upper layers;
2> if the upper layer provides a PLMN, set the selected PLMN-Identity to PLMN selected by upper layers (TS 24.501 [23]) from the PLMN(s) included in the plmn-IdentityList in SIB1;
2> if the masterCellGroup contains the reportUplinkTxDirectCurrent:
3> include the uplinkTxDirectCurrentList;
1> submit the RRCResumeComplete message to lower layers for transmission;
1> the procedure ends.

FIG. 5 is a flow diagram summarizing this procedure.

Paging optimizations may be provided on the network side. For example, for UEs in CM_IDLE, at UE context release, the NG-RAN node may provide the AMF with a list of recommended cells and NG-RAN nodes as assistance info for subsequent paging. The AMF may also provide Paging Attempt Information consisting of a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at next paging attempt. If the UE has changed its state to CM CONNECTED the Paging Attempt Count is reset. Paging optimization for UEs in RRC_INACTIVE: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts and the Next Paging Area Scope. The Paging Attempt Count shall be increased by one at each new paging attempt. The Next Paging Area Scope, when present, indicates whether the serving NG_RAN node plans to modify the RAN Paging Area currently selected at next paging attempt. If the UE leaves RRC_INACTIVE state the Paging Attempt Count is reset.

In NR a procedure has been introduced where the network may respond to an RRC Resume Request like message (e.g. RRCResumeRequest or RRCResumeRequest1) with an RRC Release with or without a suspend configuration (RRCRelease with or without suspendConfig). In the case the network responds with an RRC Release with suspend configuration, the UE remains in RRC_INACTIVE. In case the network responds with an RRC Release without suspend configuration, the UE moves from RRC_INACTIVE to RRC_IDLE.

In stage-2 specifications, TS 38.300, this is mainly shown for the use case of RAN Notification Area Updates (RNAU(s)), e.g. triggered by the expiry of periodic RNAU (T380) and/or when UE selects/re-selects to a cell not belong to its configured RAN notification area.

FIG. 6 is a flow chart that corresponds to FIG. 9.2.2.5-1 of the standard, and describes the UE triggered RAN Notification Area (RNA) update procedure involving context retrieval over Xn. The procedure may be triggered when the UE moves out of the configured RNA, or periodically.

At 601, the UE resumes from RRC_INACTIVE, providing the I-RNTI allocated by the last serving gNB and appropriate cause value, e.g., RAN notification area update.

At 602, the gNB, if able to resolve the gNB identity contained in the I-RNTI, requests the last serving gNB to provide UE Context, providing the cause value received in step 601.

At 603, the last serving gNB may provide the UE context (as assumed in the following). Alternatively, the last serving gNB may decide to move the UE to RRC_IDLE (and the procedure follows steps 3 and later of FIG. 9.2.2.5-3) or, if the UE is still within the previously configured RNA, to keep the UE context in the last serving gNB and to keep the UE in RRC_INACTIVE (and the procedure follows steps 3 and later of FIG. 9.2.2.5-2).

At 604, the gNB may move the UE to RRC_CONNECTED (and the procedure follows step 4 of FIG. 9.2.2.4.1-1), or send the UE back to RRC_IDLE (in which case an RRCRelease message is sent by the gNB), or send the UE back to RRC_INACTIVE as assumed in the following.

At 605, if loss of downlink (DL) user data buffered in the last serving gNB shall be prevented, the gNB provides forwarding addresses.

At 606 and 607, the performs path switch.

At 608, the gNB keeps the UE in RRC_INACTIVE state by sending RRCRelease with suspend indication.

At 609, the gNB triggers the release of the UE resources at the last serving gNB. The following figure describes the RNA update procedure for the case when the UE is still within the configured RNA and the last serving gNB decides not to relocate the UE context and to keep the UE in RRC_INACTIVE:

FIG. 7 is a flow chart that corresponds to FIG. 9.2.2.5-2 of the standard, and shows the periodic RNA update procedure without UE context relocation.

At 701, the UE resumes from RRC_INACTIVE, providing the I-RNTI allocated by the last serving gNB and appropriate cause value, e.g., RAN notification area update.

At 702, the gNB, if able to resolve the gNB identity contained in the I-RNTI, requests the last serving gNB to provide UE Context, providing the cause value received in step 701.

At 703, the last serving gNB stores received information to be used in the next resume attempt (e.g. C-RNTI and PCI related to the resumption cell), and responds to the gNB with the RETRIEVE UE CONTEXT FAILURE message including an encapsulated RRCRelease message. The RRCRelease message includes Suspend Indication.

At 704, the gNB forwards the RRCRelease message to the UE.

FIG. 8 is a flow chart that corresponds to FIG. 9.2.2.5-2 of the standard, and shows the RNA update procedure for the case when the last serving gNB decides to move the UE to RRC_IDLE:

At 801, the UE resumes from RRC_INACTIVE, providing the I-RNTI allocated by the last serving gNB and appropriate cause value, e.g., RAN notification area update.

At 802, the gNB, if able to resolve the gNB identity contained in the I-RNTI, requests the last serving gNB to provide UE Context, providing the cause value received in step 801.

At 803, instead of providing the UE context, the last serving gNB provides an RRCRelease message to move the UE to RRC_IDLE.

At 804, the last serving gNB deletes the UE context.

At 805, the gNB sends the RRCRelease which triggers the UE to move to RRC_IDLE.

In RRC, the following actions are defined upon the reception of an RRC Release like message in response to an RRC Resume Request like message:—

5.3.8.3 Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if the AS security is not activated:
2> ignore any field included in RRCRelease message except waitTime;
2> perform the actions upon going to RRC_IDLE as specified in 5.3.11 with the release cause 'other' upon which the procedure ends;
1> if the RRCRelease message includes redirectedCarrierInfo indicating redirection to eutra:
2> if cnType is included:
3> after the cell selection, indicate the available CN Type(s) and the received cnType to upper layers;
NOTE: Handling the case if the E-UTRA cell selected after the redirection does not support the core network type specified by the cnType, is up to UE implementation.
1> if the RRCRelease message includes the cellReselectionPriorities:
2> store the cell reselection priority information provided by the cell Reselection Priorities;
2> if the t320 is included:
3> start timer T320, with the timer value set according to the value of t320;
1> else:
2> apply the cell reselection priority information broadcast in the system information;
1> if deprioritisationReq is included:
2> start or restart timer T325 with the timer value set to the deprioritisationTimer signalled;
2> store the deprioritisationReq until T325 expiry;
1> if the RRCRelease includes suspendConfig:
2> apply the received suspendConfig;
2> reset MAC and release the default MAC Cell Group configuration, if any;
2> re-establish RLC entities for SRB1;
2> if the RRCRelease message with suspendConfig was received in response to an RRCResumeRequest or an RRCResumeRequest1:
3> stop the timer T319 if running;
3> in the stored UE Inactive AS context:
4> replace the KgNB and KRRCint keys with the current KgNB and KRRCint keys;
4> replace the C-RNTI with the temporary C-RNTI in the cell the UE has received the RRCRelease message;
4> replace the cellIdentity with the cellIdentity of the cell the UE has received the RRCRelease message;
4> replace the physical cell identity with the physical cell identity of the cell the UE has received the RRCRelease message;
2> else:
3> store in the UE Inactive AS Context the current KgNB and KRRCint keys, the ROHC state, the C-RNTI used in the source PCell, the cellIdentity and the physical cell identity of the source PCell, and all other parameters configured except for the ones within ReconfigurationWithSync and servingCellConfigCommonSIB;
2> suspend all SRB(s) and DRB(s), except SRB0;
2> indicate PDCP suspend to lower layers of all DRBs;
2> if the t380 is included:
3> start timer T380, with the timer value set to t380;
2> if the RRCRelease message is including the waitTime:
3> start timer T302 with the value set to the waitTime;
3> inform upper layers that access barring is applicable for all access categories except categories '0' and '2';
2> if T390 is running:
3> stop timer T390 for all access categories;
3> perform the actions as specified in 5.3.14.4;
2> indicate the suspension of the RRC connection to upper layers;
2> enter RRC_INACTIVE and perform cell selection as specified in TS 38.304 [20];
1> else
2> perform the actions upon going to RRC_IDLE as specified in 5.3.11, with the release cause 'other'.

Thus, when the UE enters Inactive state for the first time, it stores some configuration that was used in the Connected state (e.g. received in RRC Resume and/or RRC Reconfiguration and/or RRC Setup), some configuration that was used in Inactive state configuration (e.g. I-RNTIs, RNA configuration, timer T380 value, NCC, etc.) and some further set of parameters that should be used later, such as the security context.

FIG. 9 shows an example of this. In this example, the UE Access Stratum (AS) Inactive context 900 contains information 902 about the RRC configuration (specifically, in this example, parameters received in RRC Resume and/or RRC Reconfiguration and/or RRC Setup), some configuration information 904 that was used in Inactive state configuration (e.g. I-RNTIs, RNA configuration, timer T380 value, NCC, etc.), and some further set of parameters 906 that should be used later, such as the security context. comprising keys $K_{gNB}$ and $K_{RRCInt}$, the C-RNTI used in the source PCell, the cellidentity and the physical cell identity of the source PCell.

This is captured in 5G NR RRC (TS 38.331), as follows:
1> if the RRCRelease includes suspendConfig:
2> apply the received suspendConfig;
2> reset MAC and release the default MAC Cell Group configuration, if any;
2> re-establish RLC entities for SRB1;
2> if the RRCRelease message with suspendConfig was received in response to an RRCResumeRequest or an RRCResumeRequest1:
. . .
2> else:
3> store in the UE Inactive AS Context the current KgNB and KRRCint keys, the ROHC state, the C-RNTI used in the source PCell, the cellIdentity and the physical cell identity of the source PCell, and all other parameters configured except for the ones within ReconfigurationWithSync and servingCellConfigCommonSIB;

The network may want to update the UE Access Stratum (AS) Inactive context of a UE in INACTIVE state for different reasons. For example, if network wants to re-assign the UE's I-RNTI because it needs to change the location of the UE AS Inactive context. Or, if the network may also want to update the UE behavior regarding other parameters such as cell reselection priorities. Or, if the network want to change the RNA configuration due to some re-configuration at the network side, addition of new nodes/cells, etc.

As described above, the UE monitors paging occasions (POs) while in INACTIVE state. If network decides that the UE should resume a connection for some reason, e.g. if there is incoming data at the downlink that arrives at the last serving gNodeB (i.e., the gNodeB responsible for the latest cell the UE was suspended to RRC_INACTIVE), the gNodeB will try to page the UE. In the typical case, the last serving gNodeB, knowing the RAN Notification Area Configuration (RANAC) at the UE, knows where the UE may be. However, the last serving gNodeB may first try to page the UE in the last serving cell assuming the UE may be static (as a possibly smart paging implementation).

Upon receiving a paging message, addressed in one of its PO (with a P-RNTI on PDCCH) and identified by an I-RNTI in the paging message, an Inactive UE initiates a resume procedure by transmitting a random-access preamble (which in the best case is the first available RACH occasion associated to the selected beam e.g. SSB resource), receiving a random access response (before the RAR time window expires), and based on the UL grant in the RAR, transmitting an RRC Resume Request like message (e.g. RRCResumeRequest) using default configuration e.g. for L1 and MAC.

FIG. 10 shows a procedure 1000 based on the current standard, in which the network implementation would first need to transmit a RAN paging message 1001 to the UE (e.g. in the UE's RAN configuration area), which would trigger the UE to initiate a resume procedure by performing random access 1002, 1003, and then transmitting an RRC Resume Request 1004. The network could respond that resume request with i) an RRC Resume message, or ii) an RRC Release like message (with or without a suspend configuration), in the case it wants a 2-step procedure.

In the case the network wants to update parts of the RRC configuration context, even if just for the sake of preparing the UE to use that later when attempting to resume again, or the next time it needs to transmit data (like in small data transmission), the network responds with an RRC Resume like message 1005. Upon receiving that, the UE restores its AS context, processes the message, enters CONNECTED, and transmits an RRC Resume Complete like message 1006. The network may then send an RRC Release message 1007.

Once the UE enters Connected state, the network could update the RRC configuration parts of the UE AS Inactive context i.e. the configurations the UE has been using when it was in Connected state, done by the RRC Resume like message (or even a subsequent RRC Reconfiguration, if network wants to).

FIG. 11 shows a procedure 1100 that may be performed in the case the network wants to update the Inactive parameters parts of the AS Inactive context. The procedure of FIG. 11 is similar to that of FIG. 10, in that the network implementation would first need to transmit a RAN paging message 1101 to the UE (e.g. in the UE's RAN configuration area), which would trigger the UE to initiate a resume procedure by performing random access 1102, 1103, and then transmitting an RRC Resume Request 1104.

In the case where the network wants to update the Inactive parameters parts of the AS Inactive context, it may respond the resume request with an RRC Release like message (e.g. RRCRelease with or without a suspend configuration) 1105. Upon receiving the message, the UE restores its AS context, processes the message and updates whatever needs to be updated, and remains in INACTIVE, as shown below.

However, these procedures involve unnecessary signalling for the use case in which the network needs to update the UE AS Inactive context, without the need to move the UE to Connected state e.g. to start a data transmission/reception or without the need to first try to resume the connection.

SUMMARY

According to a first aspect of the invention, there is provided a method performed by a wireless device for updating a stored configuration. While in a power saving state, the wireless device monitors a paging channel. When it receives a paging message on the paging channel, the wireless device determines whether the paging channel includes a message relating to updating a stored configuration of the wireless device. If the paging channel includes a message relating to updating the stored configuration of the wireless device, the wireless device performs actions determined by said message.

According to a second aspect of the invention, there is provided a method performed by a base station for updating a stored configuration of a wireless device. The base station transmits a paging message to a wireless device that is in a power saving state, on a paging channel. The base station includes a message relating to updating the stored configuration of the wireless device on the paging channel.

According to a third aspect of the invention, there is provided a wireless device, comprising a processor and a memory, wherein the wireless device is configured for performing a method according to the first aspect.

According to a fourth aspect of the invention, there is provided a base station, comprising a processor and a memory, wherein the base station is configured for causing a method according to the second aspect to be performed.

Thus, certain aspects of the present disclosure and their embodiments may provide solutions to these or other challenges.

DETAILED DESCRIPTION

Figure 1:
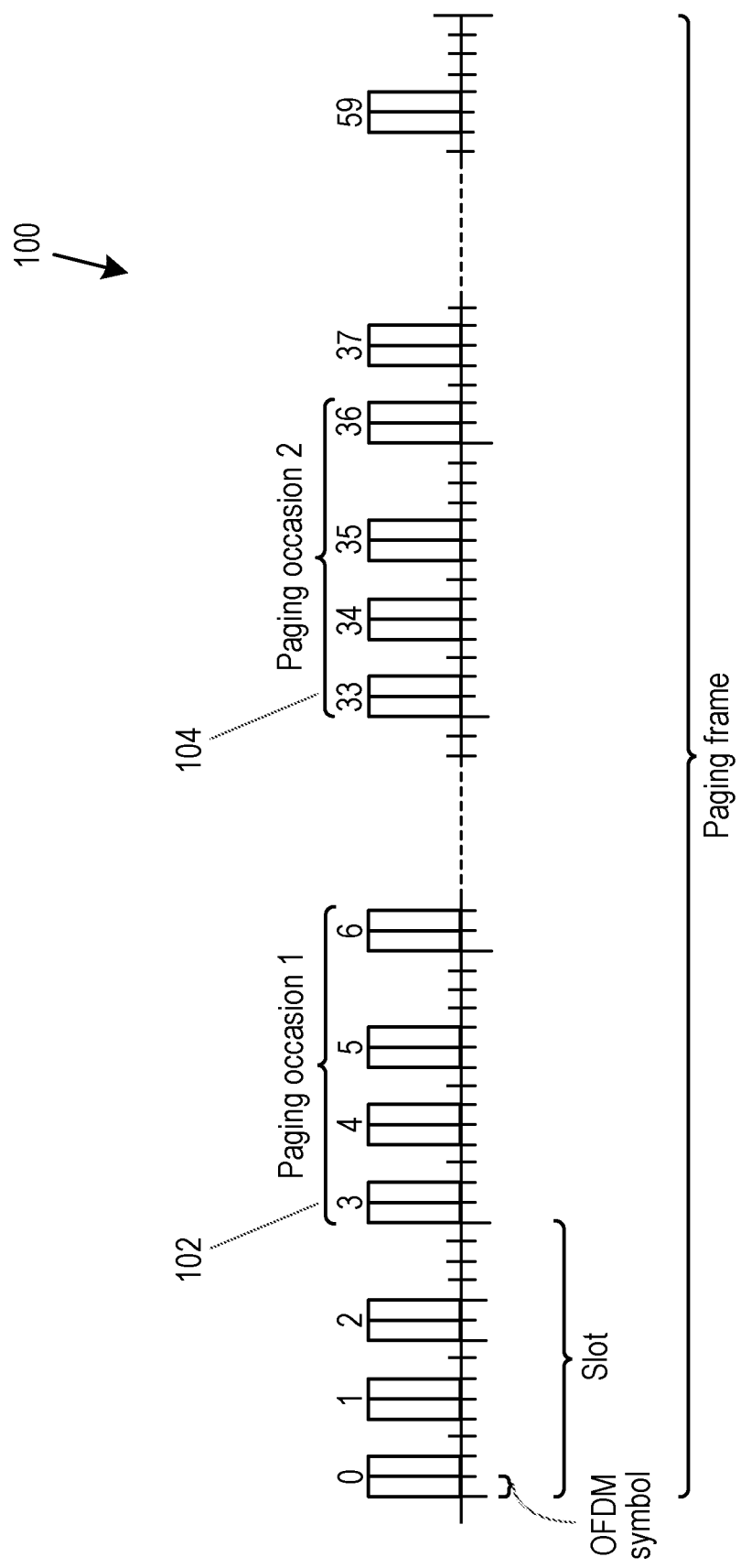
FIGS. 1 and 2 illustrate aspects of paging in a cellular network.
Figure 2:
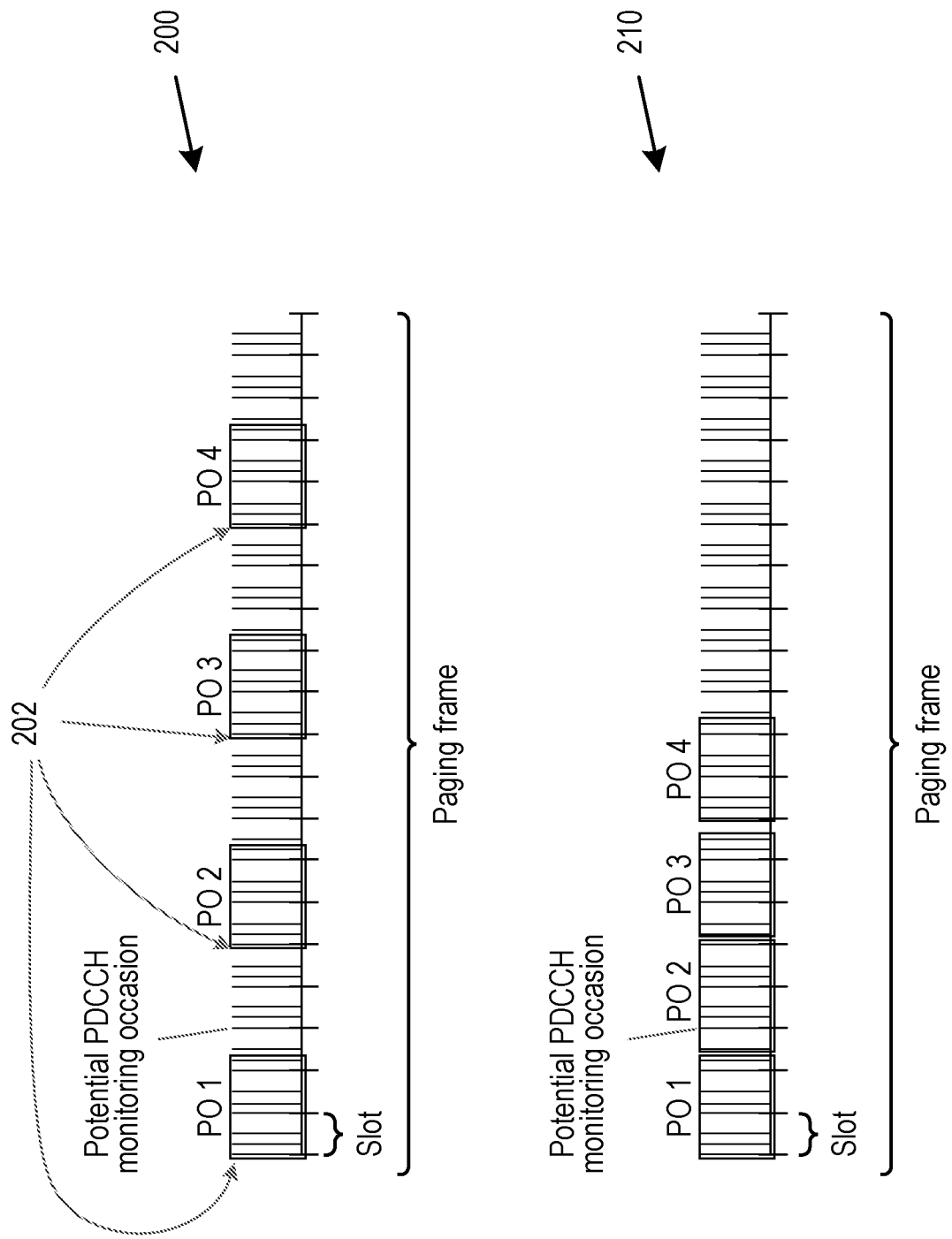
Figure 3:
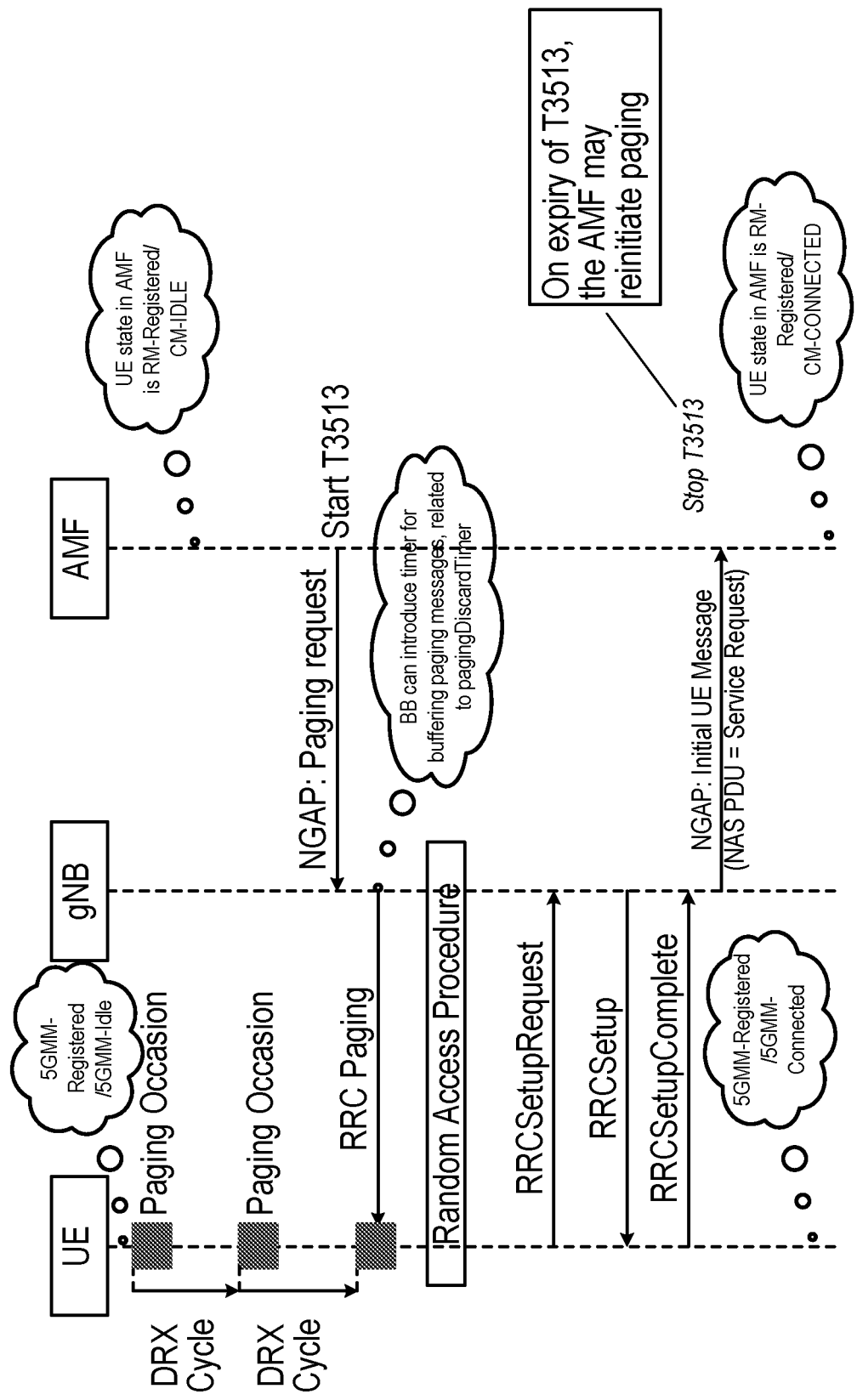
FIG. 3 is a signalling diagram illustrating a paging procedure.
Figure 4:
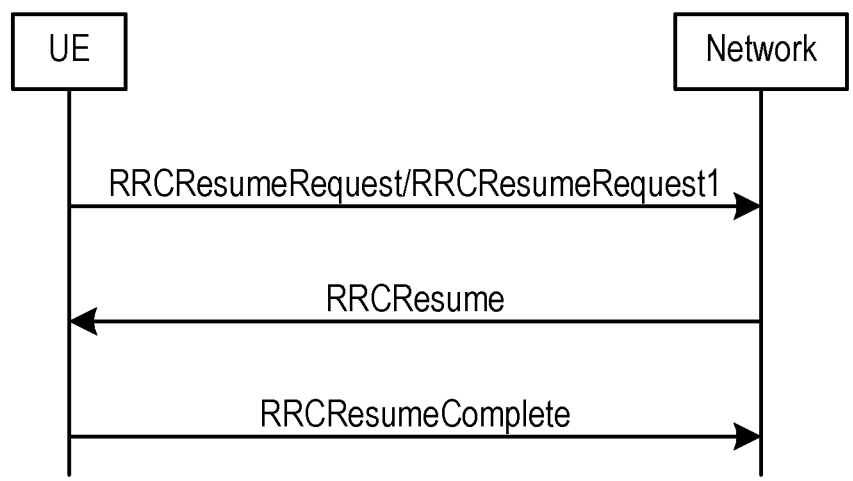
FIG. 4 is a signalling diagram illustrating a further paging procedure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In this disclosure, it is assumed that the UE is monitoring paging while in Inactive state. However, the method is applicable for any power saving state (e.g. Idle, Inactive, etc.) where the UE may have a stored context and where the UE may be paged and resumed. What is referred to herein as a paging channel, or as a paging like channel, may be any channel monitored when the UE is in a power saving state, in defined occasions in the time domain.

In the following disclosure, we mainly use the terminology and examples having 5G NR as the Radio Access Technology (RAT) where the UE is camping, monitoring paging and receives a paging message possibly containing an RRC Release or Reconfiguration like message. However, that should be considered as an example, so the invention is applicable to any RAT with similar procedures i.e. UE is camping on a cell of a RAT, monitoring paging channel of a RAT and responding to a paging message containing an RRC Release or Reconfiguration like message.

In the following disclosure, we mainly use the intra-RAT case as an example, but the method is applicable for inter-RAT procedures where the UE is suspending in a first RAT (e.g. NR) and has a stored context on it. Then, the UE performs cell re-selection to another RAT (e.g. LTE) and camps in a cell of that other RAT, and monitors paging channel in that other RAT and possibly receives an RRC Release like message or RRC Reconfiguration like message in that other RAT.

One aspect of the disclosure comprises a method at a wireless device (also called a wireless terminal or a User Equipment—UE) for updating stored configurations of UEs in a power saving state the method comprising:

monitoring a paging like channel while in a power saving state, for the possible reception of a message re-configuring the UE AS Inactive context (such as an RRC Release or RRC Reconfiguration like message e.g. RRCRelease or RRCReconfiguration as defined in the RRC specifications);

receiving a paging message and determining that it includes a PDCP PDU, and determining that this is a message re-configuring the UE AS Inactive context (such as an RRC Release like message or RRC Reconfiguration like message e.g. RRCRelease as defined in the RRC specifications or RRCReconfiguration as defined in the RRC specifications);

processing the PDCP PDU (e.g. releasePaging PDCP PDU) as an SRB1 message (i.e. RRCReleasePdcpPdu);

if after processing the PDCP PDU the UE detects an RRC Release like message (e.g. RRCRelease as defined in the RRC specifications), the UE perform the actions upon reception of an RRCRelease in paging.

If the RRC Release like message contains a suspend configuration, the UE remains in Inactive state; Else, if RRC Release like message does not contains a suspend configuration, the UE transitions to Idle and perform actions upon going to Idle.

If after processing the PDCP PDU the UE detects an RRC Reconfiguration like message (e.g. RRCReconfiguration as defined in the RRC specifications), the UE updates parameters in the AS Inactive context, in particular the RRC configuration to be used in Connected state (e.g. Connected measConfig, etc.). In that case the UE remains in Inactive state.

The method also comprises the UE acknowledging (ACK) the reconfiguration of the UE context via paging as described above. In other words, the UE ACKs the successful reception of the message and successful reconfiguration, so both the network and the UE have same understanding of the UE's current context/configuration and UE state. There may be different solutions regarding how that ACK may be defined (as described in more detail below).

To acknowledge the updated configuration in case the UE receives an RRC Reconfiguration or RRC Release message with suspend configuration (or a proper transition to Idle in case RRC Release does not include a suspend configuration) the UE can (either by default or if ordered explicitly by the network) perform a Random Access procedure by transmitting a dedicated Random Access Preamble (bitstring) on the Random Access channel. The dedicated Random Access Preamble can part of the RRC message to the UE including the new UE configuration. When the network receives the dedication Random Access Preamble it can consider the re-configuration of the UE configuration successful. If the network does not receive the dedication Random Access Preamble it can based on implementation re-transmit the configuration message. Other methods for acknowledging the new configuration is also discussed in more detail below.

Figure 12:
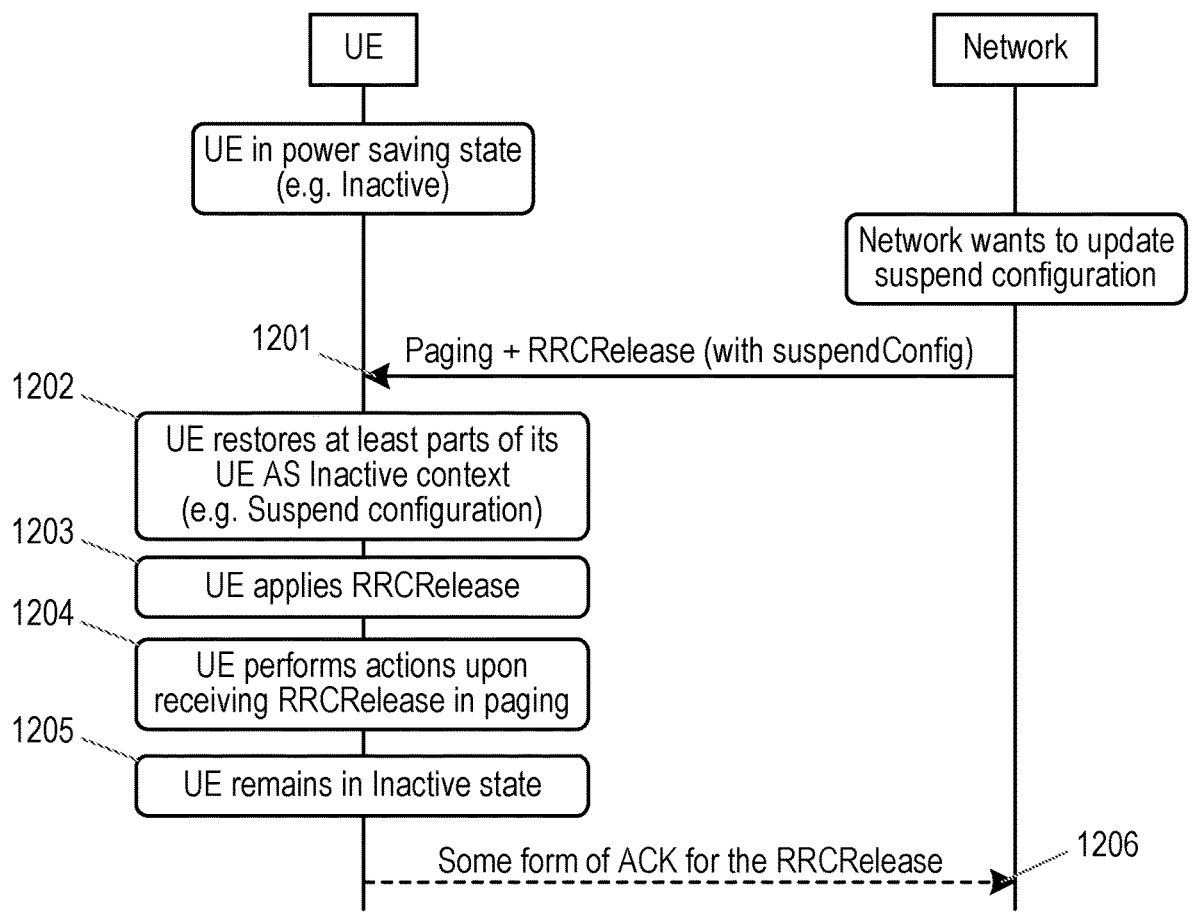
FIG. 12 is a signalling diagram illustrating a further paging procedure.

FIG. 12 is a signaling flow diagram illustrating the basic scheme in one situation in which the network sends the RRC Release like message.

Specifically, FIG. 12 shows a procedure in which the UE is in a power saving state, and the network wants to update the suspend configuration.

At 1201, the network sends a paging message with an RRC Release like message, with a suspend configuration.

In response, at 1202, the UE restores at least parts of its UE AS Inactive content, for example its suspend configuration; at 1203, the UE applies RRCRelease; at 1204, the UE performs actions upon receiving RRCRelease in paging; and, as shown at 1205, the UE remains in the Inactive state.

At 1206, the UE sends a message that acts as an acknowledgement for the RRCRelease.

Figure 13:
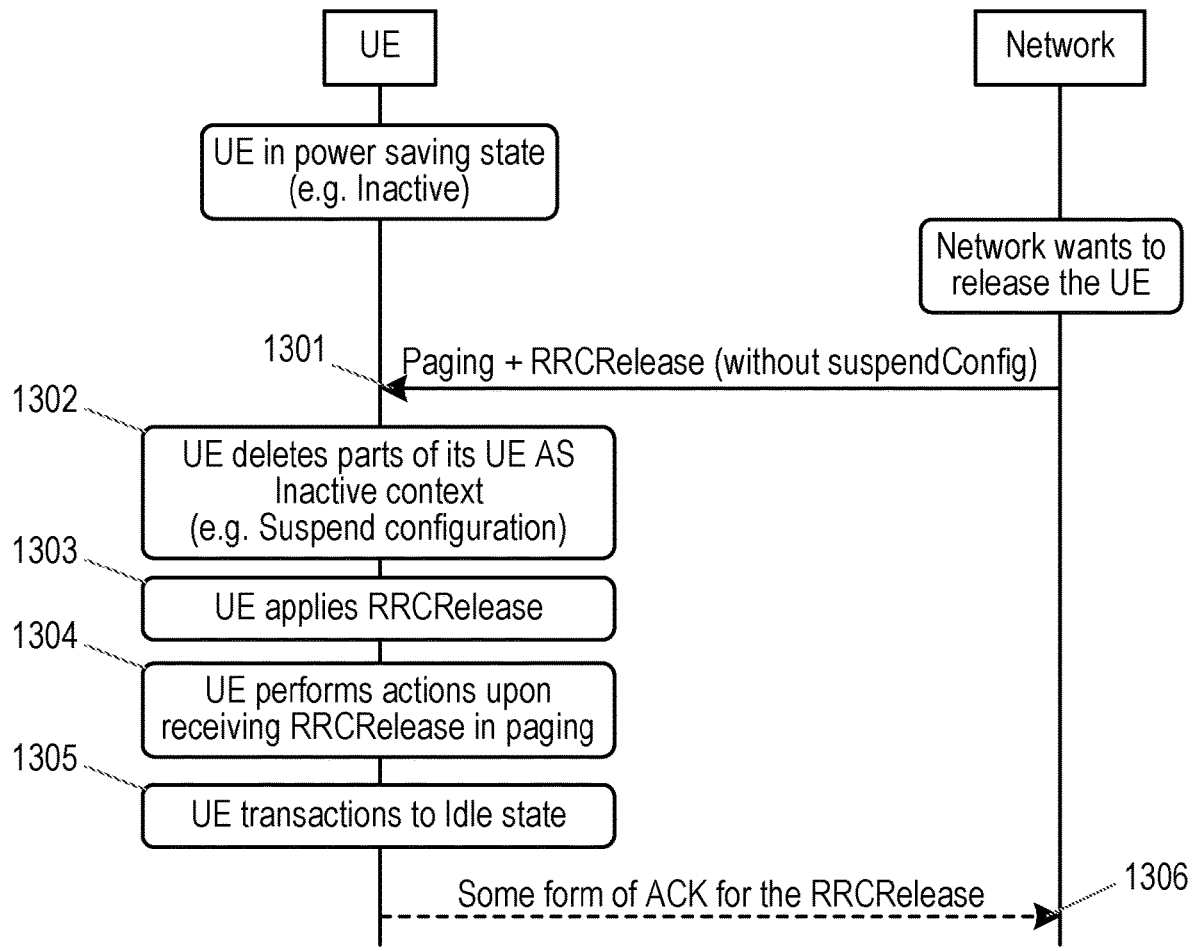
FIG. 13 is a signalling diagram illustrating a further paging procedure.

FIG. 13 is a signaling flow diagram illustrating the basic scheme in another situation in which the network sends the RRC Release like message.

Specifically, FIG. 13 shows a procedure in which the UE is in a power saving state, and the network wants to update the suspend configuration.

At 1301, the network sends a paging message with an RRC Release like message, without a suspend configuration.

In response, at 1302, the UE deletes at least parts of its UE AS Inactive content, for example its suspend configuration; at 1303, the UE applies RRCRelease; at 1304, the UE performs actions upon receiving RRCRelease in paging; and, as shown at 1305, the UE transitions to the Idle state.

At 1306, the UE sends a message that acts as an acknowledgement for the RRCRelease.

Figure 14:
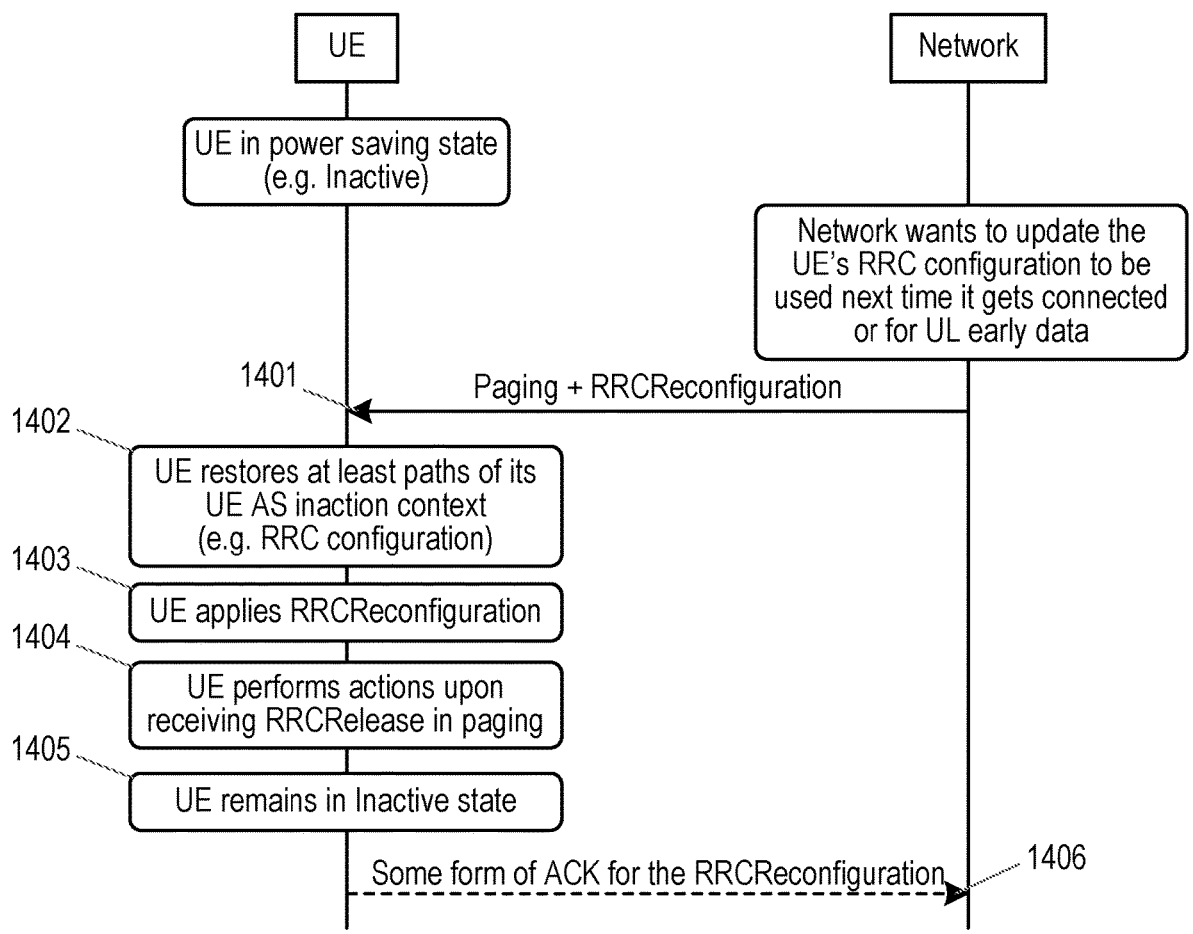
FIG. 14 is a signalling diagram illustrating a further paging procedure.

FIG. 14 is a signaling flow diagram illustrating the basic scheme in a situation in which the network sends the RRC Reconfiguration like message.

Specifically, FIG. 14 shows a procedure in which the UE is in a power saving state, and the network wants to update the UE's RRC configuration to be used the next time that it is connected, or for uplink early data.

At 1401, the network sends a paging message with an RRC Reconfiguration like message.

In response, at 1402, the UE restores at least parts of its UE AS Inactive content, for example its RRC configuration; at 1403, the UE applies RRCReconfiguration; at 1404, the UE performs actions upon receiving RRCRelease in paging; and, as shown at 1405, the UE remains in the inactive state.

Figure 15:
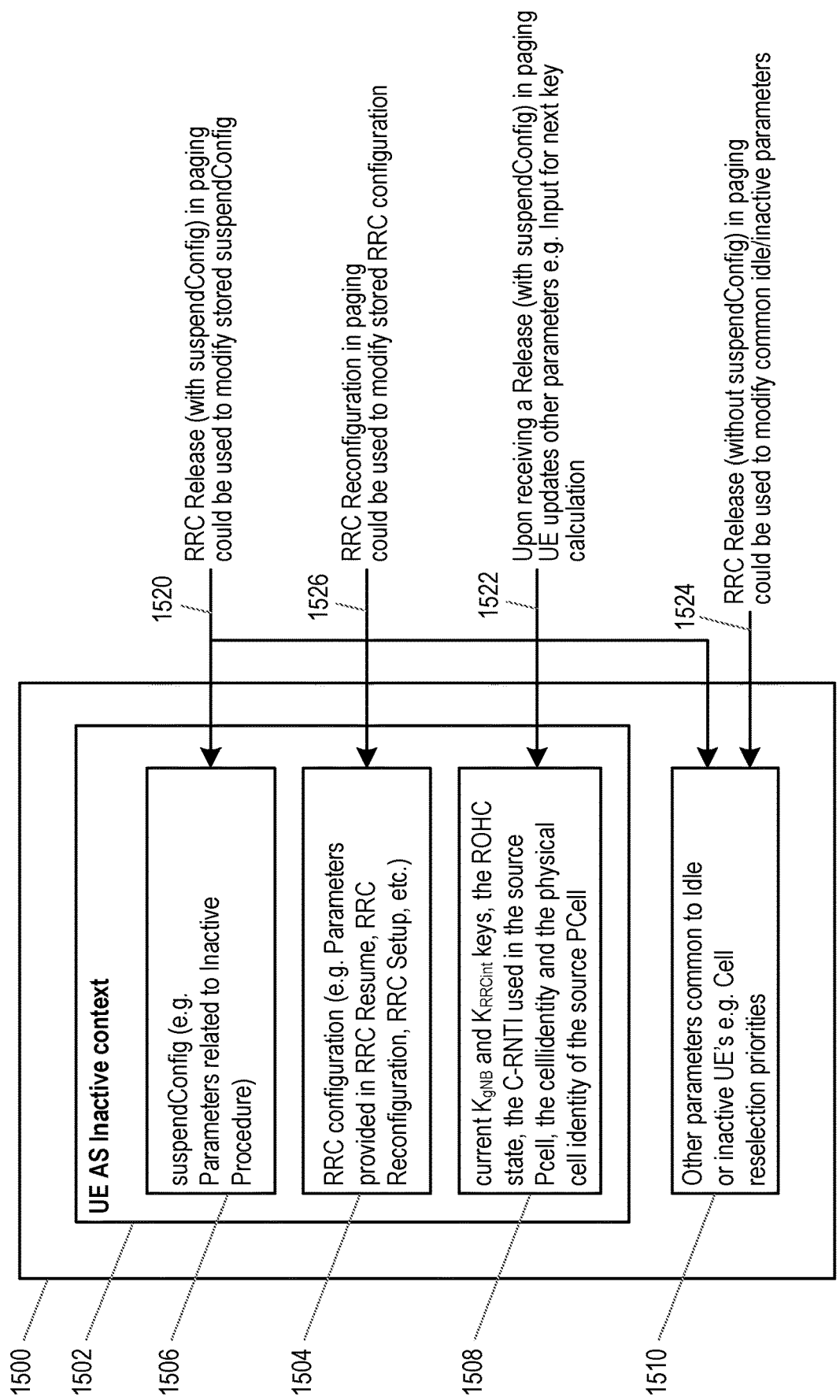
FIG. 15 illustrates a form of a context of a User Equipment device.

At 1406, the UE sends a message that acts as an acknowledgement for the RRCReconfiguration FIG. 15 shows the form of the configuration 1500 that is stored at an Inactive UE. This configuration includes the UE Access Stratum (AS) Inactive context 1502, which contains information 1504 about the RRC configuration (specifically, in this example, parameters received in RRC Resume and/or RRC Reconfiguration and/or RRC Setup), the suspend configuration 1506, for example parameters relating to the Inactive procedure configuration (e.g. I-RNTIs, RNA configuration, timer T380 value, NCC, etc.), and some further set of parameters 1508 that should be used later, such as the security context. comprising keys $K_{gNB}$ and $K_{RRCInt}$, the C-RNTI used in the source PCell, the cellidentity and the physical cell identity of the source PCell.

The configuration 1500 also includes other parameters 1510 common to Idle or Inactive UE's for example cell reselection priorities.

As shown at 1520, the procedure of FIG. 12, in which the network sends a paging message with an RRC Release like message, with a suspend configuration, can be used to modify the stored suspend configuration 1506. The procedure of FIG. 12 can also be used to modify the other parameters 1510 common to Idle or Inactive UE's.

As shown at 1522, upon receiving an RRC Release like message, with a suspend configuration, the UE updates some of the parameters 1508, such as the Input for the next key calculation.

As shown at 1524, the procedure of FIG. 13, in which the network sends a paging message with an RRC Release like message, without a suspend configuration, can be used to modify the parameters 1510 that are common to Idle or Inactive UE's.

As shown at 1526, the procedure of FIG. 14, in which the network sends a paging message with an RRC Reconfiguration like message, can be used to modify the stored RRC configuration 1504.

Thus, in certain embodiments, the UE monitors a paging message that contains a Packet Data Convergence Protocol (PDCP) Protocol data Unit (PDU), which may comprise an RRC Reconfiguration message that may reconfigure the RRC configuration in the UE AS Inactive context (e.g. any configuration the UE have received in RRC Resume like message, RRC Setup like message, RRC Reconfiguration like message). The disclosure also comprises an RRC Release message (with or without a suspend configuration) that may reconfigure the Inactive configurations in the UE AS Inactive context (e.g. any configuration the UE have received in RRC Release and further configurations e.g. security context. The disclosure also includes a mechanism for the UE to efficiently transmit an acknowledgement to the network that it has received the new configuration. In this way the reconfiguration can be used in robust way. The disclosure also includes a mechanism for the network and UE to encrypt/decrypt as well as integrity protect the reconfiguration messages ensuring privacy and preventing security attacks using fake messages.

An alternative proposal is that the UE monitors a paging channel to receive an RRC Resume like message, so that the UE enters Connected, quickly receives DL data and possibly responds to it with UL data also quickly. In this disclosure, it is proposed that the UE monitors a paging channel to receive a reconfiguration message for the AS context, but without moving the UE to Connected. Another difference from that alternative proposal is that the type of message proposed to be transmitted in paging is different (so it is different its effect). In the current disclosure, the message may be equivalent to an RRC Release like message, in case the network wants to update the parts of the context related to Inactive parameters, or an RRC Reconfiguration like message, in case the network wants to update the parts of the context related to the RRC configuration to be later used in Connected state.

Certain embodiments may provide one or more of the following technical advantages.

Specifically, the procedure of updating the UE AS Inactive context without the need to transition the UE to Connected state reduces the amount of signaling exchanged between the UE and the network when the network wants to update the UE AS Inactive context or when the network wants to securely and robustly transition the UE from Inactive state to Idle, or when the network wants to re-configure the UE RRC configuration (to be used next time the UE tries to resume). The solution is secure since the re-configuration message is encrypted, and integrity protected. The solution is also robust (avoids mismatching configuration between UE and network) since the UE can acknowledge the new configuration by sending a dedicated Random Access Preamble to the network which was included in the configuration message.

There could be different cases where the network may want to update, for example, the suspend configuration of an Inactive UE, such as:
  Network may want to re-assign the I-RNTI because it wants/needs to move the AS Inactive context location, hence, it would possibly require a change in some bits of the I-RNTI;
  Network may want to re-assign the I-RNTI because it wants/needs to add more UEs and reassign the number of bits in the I-RNTI with more bits for the UE component;
  Network may want to re-assign the I-RNTI because it wants/needs to add more nodes and reassign the number of bits in the I-RNTI with more bits for the node component;
  Network may want to update in the NCC;
  Network may want to update the RNA Configuration Area e.g. increase/decrease the area for a given UE due to at least one of the following use cases:
  Changes in Xn setup such as:
  new Xn is setup between nodes, hence possible to perform RAN paging within a new area;
  removal Xn between nodes, e.g., because network needs to free some memory or due to some error;
  New nodes being deployed;
  Network may want to update timer T380 values;
  One reason could be because network is close to expiry its own value and wants to renew the value before UE sends a RAN Area Update;
  Network may want to change the UE state from INACTIVE to IDLE e.g. so it can free some context space on the network side.

The fact that the procedures described herein are secure allows the UE to make sure that a fake base station is not trying to transition the UE to Idle and making the UE to release its UE AS Inactive context.

Another benefit is the possibility to leverage the fact that the UE may still be synchronized with a given cell when the network wants to reconfigure the UE, since at least some aspects of the disclosure do not require the UE to be UL synchronized with the network. That UL synchronization would otherwise be needed for the transmission of an RRC Resume Request like message, which would first require a random-access procedure. A side effect is also the additional round-trip delays caused by random access preamble transmission(s) attempt(s) and random access response (RARs). With the method disclosed herein, the UE receives the updated configuration in paging without performing random access. And, in case an ACK is to be transmitted, a preamble based solution can be defined (so that there is no need to UL sync).

Detailed Description of UE Aspects of the Method The disclosure relates to a method at a wireless terminal (also called a User Equipment—UE) for updating stored configurations of UEs in a power saving state the method comprising:
  Monitoring a paging like channel while in a power saving state, for the possible reception of a message re-configuring the UE AS Inactive context;
  where: the power saving state may be an RRC Inactive state, RRC Idle with a stored context, RRC Idle without a stored context;
  where: the paging like channel may be a paging channel monitored during DRX cycles according to the configuration depending on the UE power saving state and/or the provided configuration e.g. dedicated;
  where: the message re-configuring the UE AS Inactive context may be an RRC Release like message that re-configures UE Inactive state parameters. That may be at least one of the messages:
  RRCRelease message with a suspend configuration as defined in NR specifications (TS 38.331);
  RRCRelease message without a suspend configuration as defined in NR specifications (TS 38.331);
  RRCConnectionRelease message with a suspend configuration as defined in EUTRA specifications (TS 36.331);
  RRCConnectionRelease message without a suspend configuration as defined in EUTRA specifications (TS 36.331);
  where: the message re-configuring the UE AS Inactive context may be an RRC Reconfiguration like message that re-configures UE Connected state parameters for next time the UE tries to resume. That may be at least one of the messages:
  RRCReconfiguration message as defined in NR specifications (TS 38.331);
  RRCConnectionReconfiguration message as defined in EUTRA specifications (TS 36.331);
  The method then comprises:
  Receiving a paging message and determining that it includes a PDCP PDU, and determining that this is a message re-configuring the UE AS Inactive context (such as an RRC Release like message or RRC Reconfiguration like message e.g. RRCRelease as defined in the RRC specifications or RRCReconfiguration as defined in the RRC specifications);
  where: the PDCP PDU could either be included in the paging message directly or sent as a separate PDCP PDU in conjunction with the paging message e.g. in the same resource block or time frame as the paging message; Another alternative is to provide in the paging message some resources mapping where the UE should look at to find the PDCP PDU.

Even though we use the term PDCP PDU this could be any packet from any protocol layer below RRC carrying a message.

The method then comprises:
  Upon determining step that the paging message included an PDCP PDU which may be an RRC Release like message or an RRC Reconfiguration like message, the UE performs a set of preparation actions and clean up actions, such as:

release the Master Cell Group (MCG) Secondary cell(s) (SCell(s)) from the UE Inactive AS context, if stored;
In one alternative solution these SCell(s) configurations are not released, since it could be assumed that these SCell(s) may still be used next time the UE resumes and enters Connected state.
In another alternative these SCell(s) configurations are stored or released depending on configuration provided in the suspend/release/re-configuration message in paging and/or based on system information indication that the cell supports the maintenance of SCell configurations.
apply the default L1 parameter values as specified in corresponding physical layer specifications, except for the parameters for which values are provided in SIB1;
In one alternative the paging message is decoded according to the PCH/PCCH configurations while the PDCP PDU is decoded according to what is described herein i.e. a default L1 parameter values.
apply the default SRB1 configuration as specified in 9.2.1 (in the NR RRC specification, or in any other place where default configurations are defined);
apply the default MAC Cell Group configuration as specified in 9.2.2 (in the NR RRC specification, or in any other place where default configurations are defined);
release delayBudgetReportingConfig from the UE Inactive AS context, if stored;
stop timer T342, if running;
release overheatingAssistanceConfig from the UE Inactive AS context, if stored;
stop timer T345, if running;
apply the timeAlignmentTimerCommon included in SIB1.

The UE may then restore the RRC configuration (the configuration the UE has last used when it was in Connected state), the suspend configuration (the configuration the UE has been using in Inactive state) and the security context such as KgNB, keys from the UE Inactive AS context, except the masterCellGroup and pdcp-Config.

The reasoning to restore the RRC configuration is that the network may include the re-configuration like message(s) in the paging message. And, that message may include a delta configuration having the restored configuration as basis. The reason that masterCellGroup is an exception is that default L1/L2 configurations are used to decode the PDCP PDU received in the paging message.

The reasoning to restore the suspend configuration is that the network may include the release like message with a suspend configuration in the paging message. And, that message may include a delta configuration having the restored configuration as basis, to possibly re-configure I-RNTI(s), RAN Area configuration(s), T380 timer value, etc.

In an alternative solution instead of L1/L2 default configurations, the UE uses the restored masterCellGroup to decode the PDCP PDU that may be the resume message.

Notice that with re-configuration and/or release in paging, in one solution there is no need for the UE to compute a resume MAC-I or any other form of security token to be included in an RRC message, which represents an additional gain in terms of processing that is avoided at the UE, compared to the legacy procedure. In an alternative solution, a token like a resume MAC-I is computed and included in an ACK message responded to the network, to indicate that the right UE has received the reconfiguration message and updated its configuration accordingly.

Similar alternatives for PDCP configuration also exist, where default is used instead of restored configuration for the processing of the PDCP PDU.

The UE may then derive the KgNB key based on the current KgNB key or the NH, using the stored nextHopChainingCount (NCC) value, as specified in TS 33.501;

In an alternative solution the UE may already have derived the new keys, to be possibly used in a target cell e.g. upon reception of RRC Release and cell selection when entering a power saving state (Inactive, Idle), so that it gets prepared for that procedure in case the UE requires to decode a message according to new security keys. The UE may also update security keys and performs the steps described here upon cell reselection, to be ready for processing the resume message inside the paging.
In one solution, the NCC parameter has been provided in the RRC Release message, when the UE was suspended to Inactive state;
In another solution, the NCC parameter is provided in the RRC Release message that is transmitted with the paging message;
In another solution, the NCC parameter is provided in the RRC Reconfiguration message that is transmitted with the paging message.

The UE may then derive security keys such as the KRRCenc key, the KRRCint key, the KUPint key and the KUPenc key;

These keys may be the keys for encryption and integrity protection of control plane messages; This is particularly important to decode the release or re-configuration like message and verify it comes from a verified network.
These keys may be the keys for encryption and integrity protection of user plane messages; This is particularly relevant for the alternative where user plane data is also transmitted together with the paging message and the resume message.

The UE may then configure lower layers to apply integrity protection for all radio bearers except SRB0 using the configured algorithm and the KRRCint key and KUPint key derived in this subclause immediately, i.e., integrity protection shall be applied to all subsequent messages received and sent by the UE, including the PDCP PDU within the Paging Record;

In one alternative, this is done only for SRB1, since the UE expects an RRC Release or RRC Reconfiguration like message in the paging message.

The UE may then configure lower layers to apply ciphering for all radio bearers except SRB0 and to apply the configured ciphering algorithm, the KRRCenc key and the KUPenc key derived in this subclause, i.e. the ciphering configuration shall be applied to all subsequent messages received and sent by the UE, including the PDCP PDU within the Paging Record;

In one alternative, this is done only for SRB1, since the UE expects an RRC Release or RRC Reconfiguration like message in the paging message.

The UE may then re-establish PDCP entities for SRB1.
The UE may then resume SRB1.
The method may then comprise processing the PDCP PDU (e.g. releasePaging PDCP PDU, reconfigurationPaging PDCP PDU) as an SRB1 message (i.e. RRCReconfigurationPdcpPdu).

This step includes verifying the integrity of the content of the PDCP PDU. The verification could include calculating a message authentication code using RRC integrity protection key and information from the payload part of the PDCP PDU and then comparing this to a message authentication code included in the PDCP PDU (e.g. in the packet header or trailer).

As well as decrypt the PDCP PDU using the RRC encryption key, to the extent the PDCP PDU is encrypted. The PDCP PDU can be encrypted, partially encrypted or unencrypted. Encrypted PDCP PDU is advantageous from privacy p-o-v. Partially encrypted or unencrypted PDCP PDU allows more flexibility w.r.t. providing new values for/update of certain security parameters, e.g., NCC parameter, key change indicator, algorithm, the values of which are needed to configure security and therefore would need to be conveyed unencrypted.

If, after successfully processing the PDCP PDU, the UE detects an RRC Release like message (e.g. RRCRelease as defined in the RRC specifications), the UE performs the actions upon reception of an RRCRelease in paging. At least one of the actions is performed:

Delay the following actions by a predetermined period from the moment the RRC Release like message was received or optionally when lower layers indicate that the receipt of the RRC Release like message has been successfully acknowledged, whichever is earlier;

stop timer T380 (periodic RNA Update), if running (The UE in Inactive state runs timer T380. At the point the UE receives the RRC Release with paging the timer would be running. And, that timer is stopped here since the network may have included a new timer value in the RRC release over paging);

stop timer T320, if running (This timer is related to dedicated cell reselection priority; it is started upon reception of t320 or upon cell (re)selection to NR from another RAT with validity time configured for dedicated priorities (in which case the remaining validity time is applied). Hence, when the UE is paged with an RRC Release like message the timer may be running);

if the AS security is not activated:
ignore any field included in RRC Release like message, except waitTime; This may be useful if network wants to avoid uplink from specific UEs/groups of UEs even before they try to resume, which may avoid load in RACH channels.

perform the actions upon going to RRC_IDLE as specified in 5.3.11 with the release cause 'other' upon which the procedure ends;

if the RRC Release message includes redirectedCarrierInfo indicating redirection to eutra:
if cnType is included:
after the cell selection, indicate the available CN Type(s) and the received cnType to upper layers If the RRC Release like message includes the cellReselectionPriorities:
store the cell reselection priority information provided by the cellReselectionPriorities;
if the t320 is included:
start timer T320, with the timer value set according to the value of t320; Notice that this could be another use case where network may want to configure cell reselection priorities for groups of UEs e.g. for load balancing specific UEs/services.

else:
apply the cell reselection priority information broadcast in the system information; This IF/ELSE may be used in this paging use case to switch from/to dedicated priorities.

if deprioritisationReq is included:
start or restart timer T325 with the timer value set to the deprioritisationTimer signalled;
store the deprioritisationReq until T325 expiry;

if the RRC Release like message (e.g. RRCRelease) includes a suspend configuration (e.g. suspendConfig containing inactive state configuration):
apply the received suspendConfig. This has the effect to update the current inactive parameters in suspend configuration;
reset MAC and release the default MAC Cell Group configuration, if any;
re-establish RLC entities for SRB1;

if the RRC Release like message (e.g. RRCRelease) with a suspend configuration (e.g. suspendConfig) was received in response to an RRCResumeRequest or an RRCResumeRequest1; or
if the RRC Release like message (e.g. RRCRelease) is received in paging and the UE is in Inactive:
stop the timer T319 if running; In the use case of RRC Release in paging that timer has not really been initiated;

in the stored UE Inactive AS context:
replace the KgNB and KRRCint keys with the current KgNB and KRRCint keys;

if the RRC Release like message (e.g. RRCRelease) with a suspend configuration (e.g. suspendConfig) was received in response to an RRCResumeRequest or an RRCResumeRequest1; or
if the RRC Release like message (e.g. RRCRelease) is received in paging and that required the UE to perform a random-access procedure to send an ACK like message to indicate a successful reconfiguration of the AS context:
replace the C-RNTI with the temporary C-RNTI in the cell the UE has received the RRCRelease message; Otherwise, in case another type of ACK solution is defined (e.g. only based on preamble transmission, or no ACK being defined), the UE considers the previous C-RNTI as part of the AS context for key calculation next time it attempts to resume or decodes a Release message in paging.

replace the cellIdentity with the cellIdentity of the cell the UE has received the RRCRelease message;
replace the physical cell identity with the physical cell identity of the cell the UE has received the RRCRelease message;

else:
store in the UE Inactive AS Context the current KgNB and KRRCint keys, the ROHC state, the C-RNTI used in the source PCell, the cellIdentity and the physical cell identity of the source PCell, and all other parameters configured except for the ones within ReconfigurationWithSync and servingCellConfigCommonSIB;
suspend all SRB(s) and DRB(s), except SRB0;
indicate PDCP suspend to lower layers of all DRBs;
if the t380 is included:
start timer T380, with the timer value set to t380;
if the RRCRelease message is including the waitTime:
start timer T302 with the value set to the waitTime;
inform upper layers that access barring is applicable for all access categories except categories '0' and '2';

if T390 is running:
stop timer T390 for all access categories;
perform the actions as specified in 5.3.14.4;
indicate the suspension of the RRC connection to upper layers;
enter RRC_INACTIVE and perform cell selection as specified in TS 38.304 [20];
else
perform the actions upon going to RRC_IDLE as specified in 5.3.11, with the release cause 'other'.

If after processing the PDCP PDU the UE detects an RRC Reconfiguration like message (e.g. RRCReconfiguration as defined in the RRC specifications), the UE perform the actions upon reception of an RRCReconfiguration in paging. At least one of the actions is performed:

If the UE receives that message in paging while in Inactive state, the UE remains in Inactive state and updates the stored RRC Connected configuration in the UE AS Inactive context; That comprises the UE restoring the AS Inactive context, in particular the RRC configuration to be used in connected state, applying the RRC reconfiguration like message to the restored configuration, storing it and suspending them again.

The reconfiguration without entering RRC Connected may be performed as follows:
If a full configuration indication is included, the UE performs the full configuration procedure (for example, as specified in the NR RRC specification, in TS 38.331, sub-clause);
In one alternative, that requires an indication in the reconfiguration message.
restore the masterCellGroup and pdcp-Config from the UE Inactive AS context;
if the RRC Reconfiguration like message (e.g. RRCReconfiguration) includes the masterCellGroup, perform the cell group configuration for the received masterCellGroup according to 5.3.5.5 as defined in TS 38.331; This is basically the reconfiguration of the lower layers (to be used next time the UE gets connected).
if the RRC Reconfiguration includes the radioBearerConfig, perform the radio bearer configuration according to 5.3.5.6 as defined in TS 38.331;
resume SRB2 and all DRBs, if stored, discard the cell reselection priority information provided by the cellReselectionPriorities or inherited from another RAT;
stop timer T320, if running;
if the RRC Reconfiguration like message includes the measConfig, perform the measurement configuration procedure as specified in 5.5.2 as defined in TS 38.331;
resume measurements if suspended; Then, suspend measurements;
If T390 is running, stop timer T390 for all access categories and perform the actions as specified in 5.3.14.4;
if T302 is running, stop timer T302 and perform the actions as specified in 5.3.14.4 as defined in TS 38.331;
remain in RRC_INACTIVE;
indicate to upper layers that the suspended RRC connection has been resumed but immediately suspended;
That may possibly include a new indication that the UE has been resumed via paging so upper layers may take further actions;
consider the current cell to be the latest PCell the UE has connected to;
the procedure ends.

One possible use case for an RRC Reconfiguration over paging could be the update of UE's configuration to be possibly used for UL early data transmission, next time the UE resumes.

The method comprises the possibility to define an acknowledge message to indicate to the network that the RRC Release or RRC Reconfiguration like message has been successfully received. In this way it is ensured that the network knows that the UE received the new configuration and the UE and network state is synchronized. For that there could be different alternatives:—

In a first alternative, upon applying the RRC Release like or RRC Reconfiguration like message (e.g. RRCRelease or RRC Reconfiguration) the UE sends an RRC Release Complete like message, where the UE receives an RRC Release like message while the UE is in Connected state or when the UE receives an RRC Release like message in response to an RRC Resume Request like message. That new message is introduced to acknowledge that the UE has applied the new configuration, so that any sort of state mismatch between UE and network is avoided (or an RRCReconfigurationComplete). The UE would then submit the complete message to lower layers, which would trigger the MAC layer at the UE to initiate random access i.e. select a RACH resource (and possibly a beam, which may be an SSB or CSI-RS), transmit a preamble and wait for a Random-Access Response (RAR) with an Uplink (UL) grant for the transmission of the complete message. In the RAR the UE would also receive a temporary C-RNTI (that if the UE would have transition to Connected could have been upgraded to a C-RNTI after contention resolution). However, as the UE remains in Inactive state, that contention resolution is a way to indicate that things went fine and that the procedure is successful.

In a second alternative, upon applying the RRC Release or RRC Reconfiguration like messages (e.g. RRCRelease or RRCReconfiguration) the UE relies on L2 ACKs to indicate to the network that the re-configuration was properly received and applied, which in principle would have a similar effect compared to an RRC Release Complete like message in the previous alternative.

In this second alternative, if the UE is not synchronized, for transmitting the L2 ACKs, that would require the UE to first initiate random access before L2 ACKs are transmitted to the target cell. That would mean that UE would then submit the L2 ACKs to lower layers, which would trigger the MAC layer at the UE to initiate random access i.e. select a RACH resource (and possibly a beam, which may be an SSB or CSI-RS), transmit a preamble and wait for a Random-Access Response (RAR) with an Uplink (UL) grant for the transmission of the L2 ACKs. In the RAR the UE would also receive a temporary C-RNTI (that if the UE would have transition to Connected could have been upgraded to a C-RNTI after contention resolution).

The UE may be synchronized with the target cell (e.g. if the UE receives the RRC Release in paging not far in time from the time the UE was Connected and properly synchronized). In that case, the L2 ACKs may be transmitted without necessarily synchronizing via random-access procedure.

In a third alternative, upon applying the RRC Release like message (e.g. RRCRelease) or RRC Reconfiguration like message the UE acknowledges the reception with a random-access procedure.

In one solution in the third alternative, the UE receives an indication of a RACH resource and/or Dedicated Random Access Preamble to be used for that purpose in the paging message or in the RRC Release or RRC Reconfiguration like messages transmitted with the paging). That RACH resource may be a preamble and/or a time/frequency. The UE will then perform a Random Access procedure using the specific RACH resource and/or received Preamble. The Random Access procedure could be perform in the next available Random Access channel slot, or in a later slot. When the network receives the Random Access attempt using the configured RACH resource and/or preamble the network could consider the reconfiguration successful. The network could at this state also transmit a Random Access Response (RAR) message to the UE to acknowledge it has received the indication from the UE. If the UE does not receive the RAR it can re-initiate the Random Access procedure.

In another solution in the third alternative, the UE receives a mapping between RACH resources and beams (e.g. SSB, CSI-RS) with/in the paging message (e.g. in the RRC Release like message transmitted with the paging). Then, UE selects a beam and maps to the indicated resource to be used for that purpose. That RACH resource mapped may be a preamble and/or a time/frequency.

One embodiment of a way in which the RRC specifications may be modified to implement the methods described herein is set out below for the RRC Release case.

A first possible way to implement the fact that the RRC Release like message is transmitted with a Paging message for a UE with a power saving mode, is to extend the paging message with an RRC Resume message, as shown below.

Figure 5:
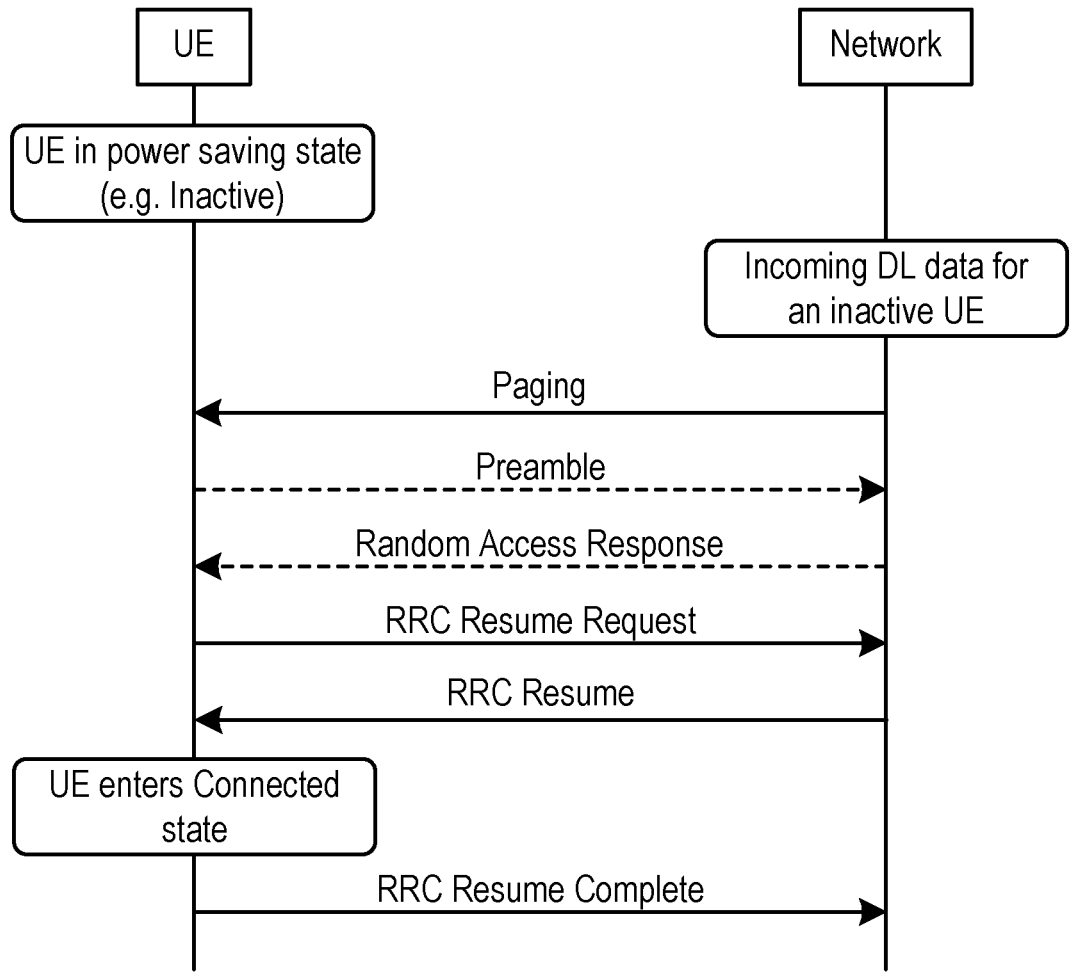
FIG. 5 is a signalling diagram illustrating a further paging procedure.
Figure 6:
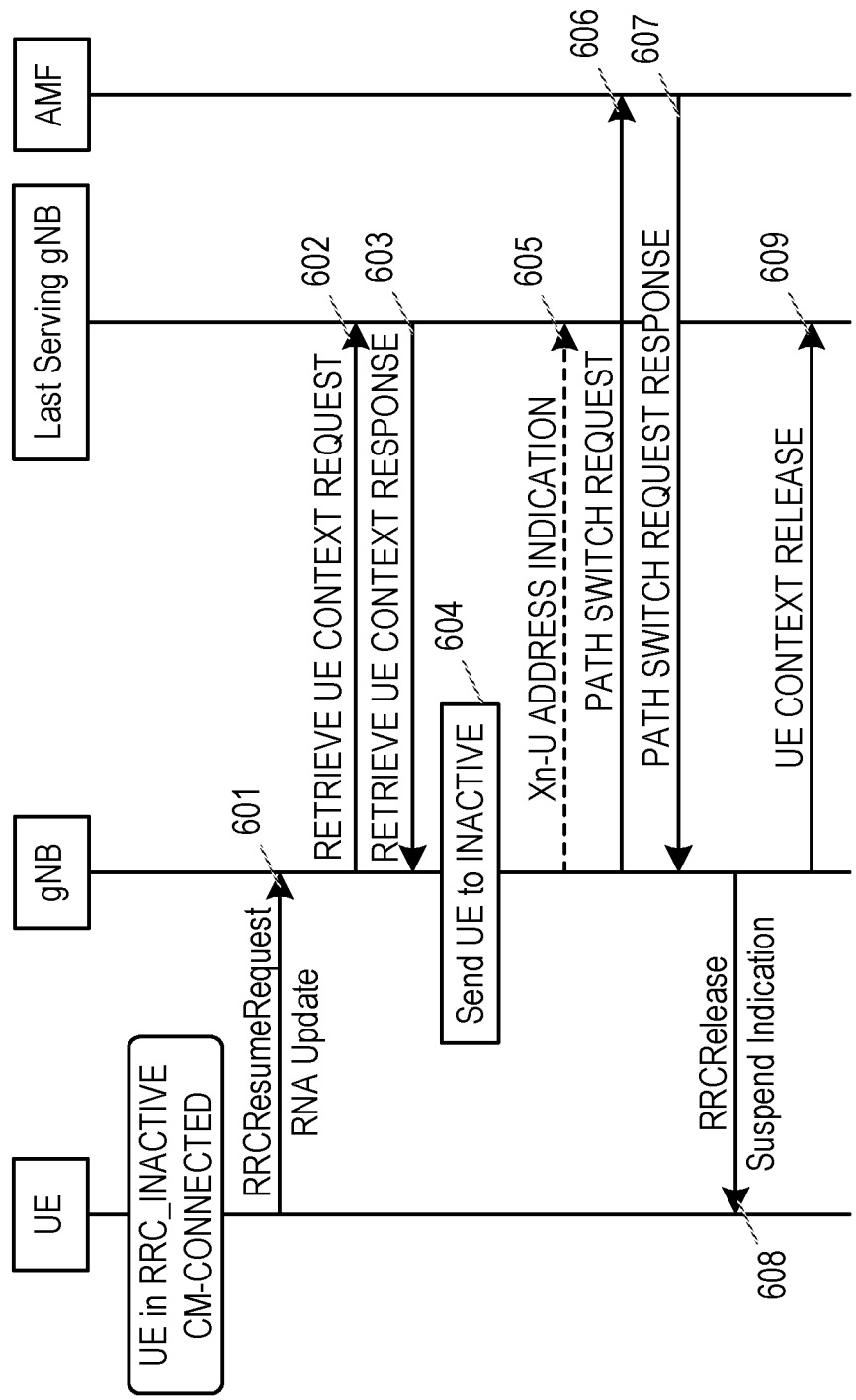
FIG. 6 is a signalling diagram illustrating a further paging procedure.
Figure 7:
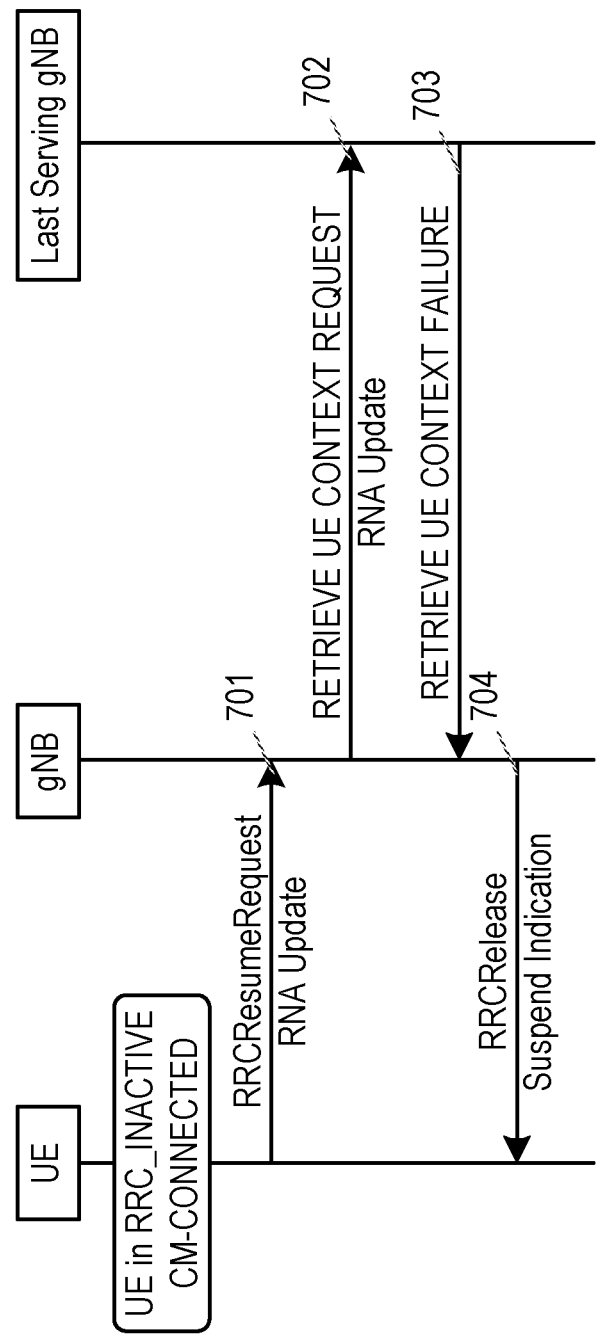
FIG. 7 is a signalling diagram illustrating a further paging procedure.
Figure 8:
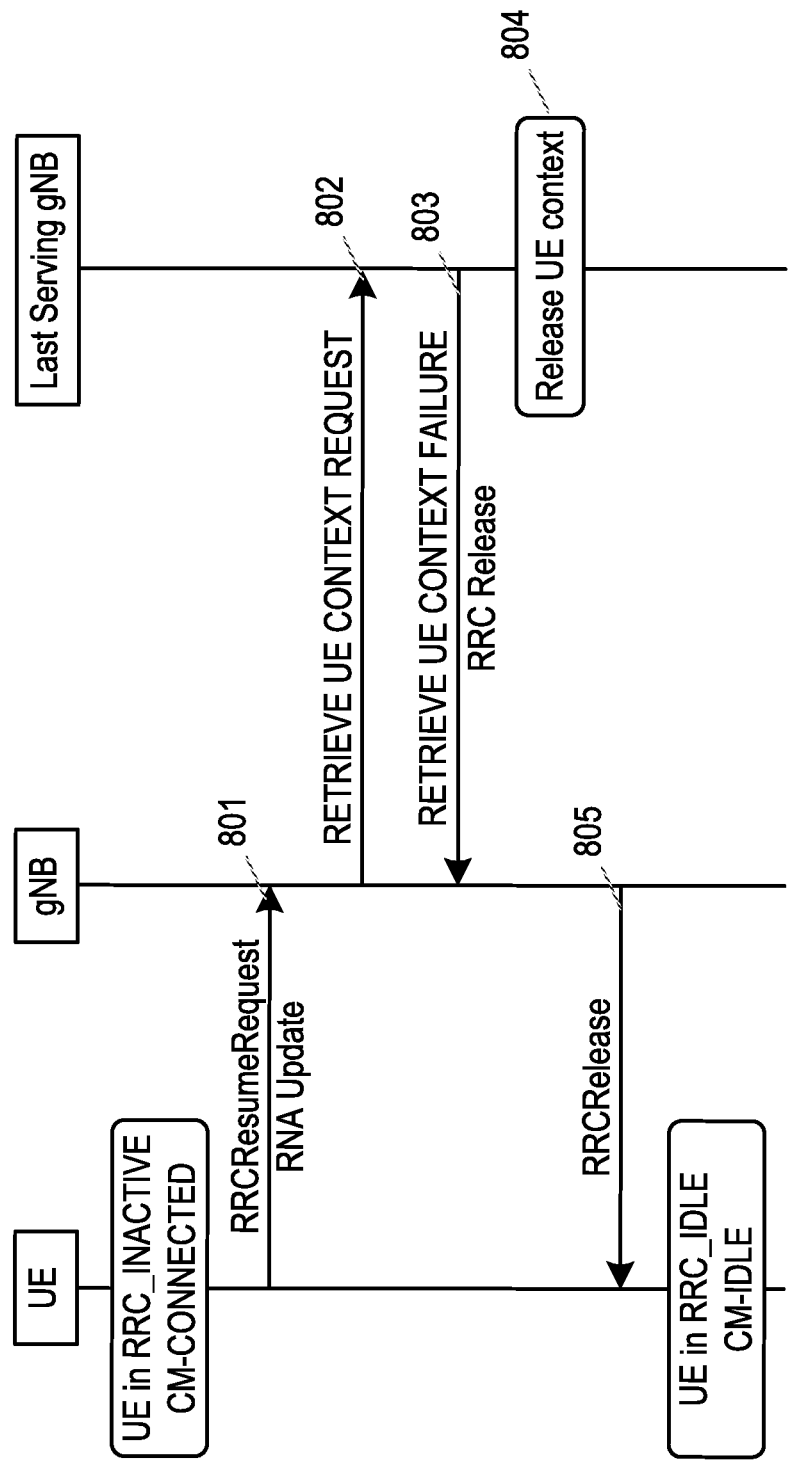
FIG. 8 is a signalling diagram illustrating a further paging procedure.
Figure 9:
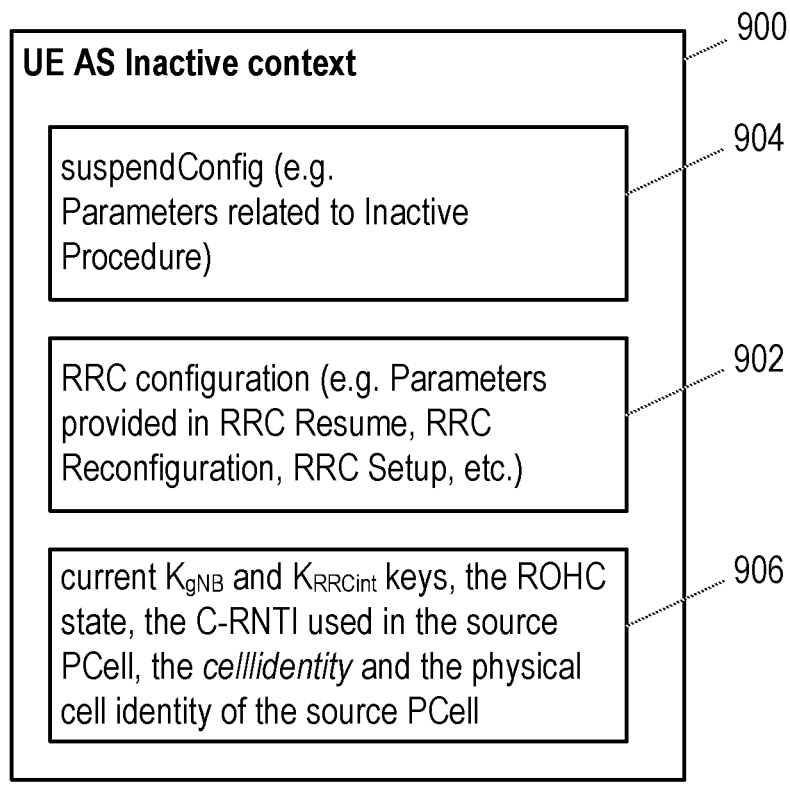
FIG. 9 illustrates a form of a context of a User Equipment device.
Figure 10:
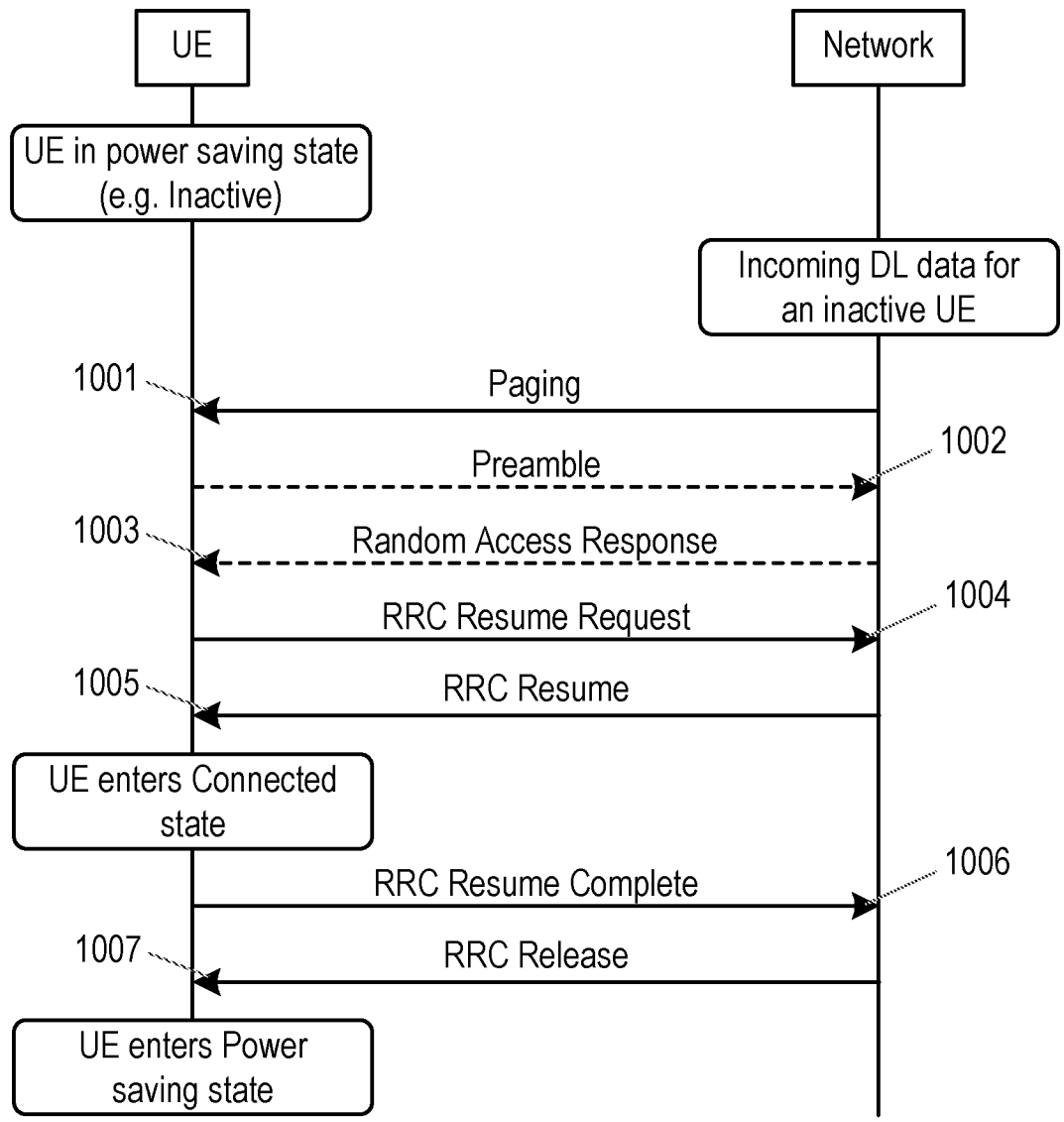
FIG. 10 is a signalling diagram illustrating a further paging procedure.
Figure 11:
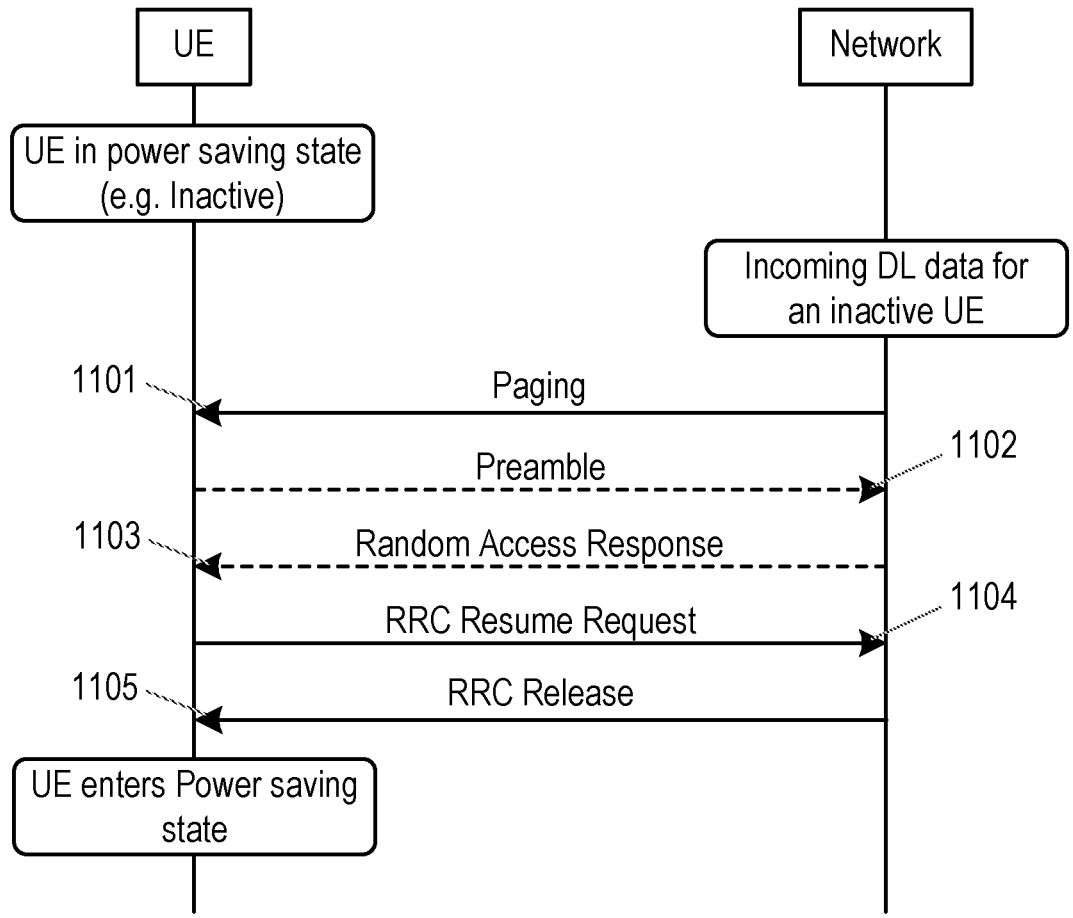
FIG. 11 is a signalling diagram illustrating a further paging procedure.
Figure 16:
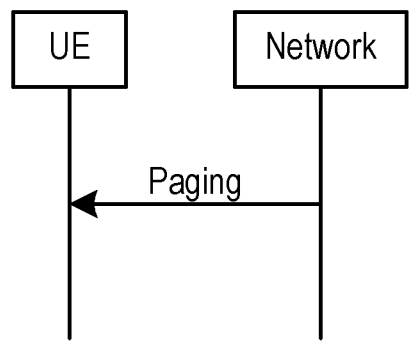
FIG. 16 is a signalling diagram illustrating a further paging procedure.

FIG. 16 is a signalling diagram corresponding to FIG. 5.3.2.1-1 in the standard, showing the general form of a paging procedure as modified by the methods described herein.

The purpose of this procedure is:
  to transmit paging information to a UE in RRC_IDLE or RRC_INACTIVE;
  to update the UE AS Inactive context by including an RRCRelease in the Paging message.

The network initiates the paging procedure by transmitting the Paging message at the UE's paging occasion as specified in TS 38.304 [20]. The network may address multiple UEs within a Paging message by including one PagingRecord for each UE.

Reception of the Paging message by the UE
Upon receiving the Paging message, the UE shall:
1> if in RRC_IDLE, for each of the PagingRecord, if any, included in the Paging message:
  2> if the ue-Identity included in the PagingRecord matches the UE identity allocated by upper layers:
    3> forward the ue-Identity and accessType (if present) to the upper layers;
1> if in RRC_INACTIVE, for each of the PagingRecord, if any, included in the Paging message:
  2> if the ue-Identity included in the PagingRecord matches the UE's stored fulll-RNTI:
    3> (newly added) if a releasePaging is included in the PagingRecord:
      4> perform the preparation actions e.g. equivalent to the resume initiation actions like stopping timers, cleaning up of variables, etc.;
      4> restore the RRC configuration and the KgNB and KRRCint keys from the UE Inactive AS context, except the masterCellGroup;
      4> derive the KgNB key based on the current KgNB key or the NH, using the stored nextHopChainingCount value, as specified in TS 33.501 [11];
      4> derive the KRRCenc key, the KRRCint key, the KUPint key and the KUPenc key;
      4> configure lower layers to apply integrity protection for all radio bearers except SRB0 using the configured algorithm and the KRRCint key and KU Pint key derived in this subclause immediately, i.e., integrity protection shall be applied to all subsequent messages received and sent by the UE, including the PDCP PDU within the Paging Record;
      NOTE 1: Only DRBs with previously configured UP integrity protection shall resume integrity protection.
      4> configure lower layers to apply ciphering for all radio bearers except SRB0 and to apply the configured ciphering algorithm, the KRRCenc key and the KUPenc key derived in this subclause, i.e. the ciphering configuration shall be applied to all subsequent messages received and sent by the UE, including the PDCP PDU within the PagingRecord;
      4> re-establish PDCP entities for SRB1;
      4> resume SRB1;
      4> process the releasePaging PDCP PDU as an SRB1 message (i.e. RRCReleasePdcpPdu);
      NOTE 2: Only DRBs with previously configured UP ciphering shall resume ciphering.
    3> else if the UE is configured by upper layers with Access Identity 1:
      4> initiate the RRC connection resumption procedure according to 5.3.13 with resumeCause set to mps-PriorityAccess;
    3> else if the UE is configured by upper layers with Access Identity 2:
      4> initiate the RRC connection resumption procedure according to 5.3.13 with resumeCause set to mcs-PriorityAccess;
    3> else if the UE is configured by upper layers with one or more Access Identities equal to 11-15:
      4> initiate the RRC connection resumption procedure according to 5.3.13 with resumeCause set to high PriorityAccess;
    3> else:
      4> initiate the RRC connection resumption procedure according to 5.3.13 with resumeCause set to mt-Access;
  2> else if the ue-Identity included in the PagingRecord matches the UE identity allocated by upper layers:
    3> forward the ue-Identity to upper layers and accessType (if present) to the upper layers;
    3> perform the actions upon going to RRC_IDLE as specified in 5.3.11 with release cause 'other'.
. . .

- Paging
The Paging message is used for the notification of one or more UEs.
Signalling radio bearer: N/A
RLC-SAP: TM
Logical channel: PCCH
Direction: Network to UE
Paging message
-- ASN1START -continued

```
-- TAG-PAGING-START
Paging ::=                     SEQUENCE {
    pagingRecordList                   PagingRecordList
OPTIONAL, -- Need N
    lateNonCriticalExtension           OCTET STRING
OPTIONAL,
    nonCriticalExtension               SEQUENCE{ }
OPTIONAL
}
PagingRecordList ::=           SEQUENCE (SIZE(1..maxNrofPageRec)) OF
PagingRecord
PagingRecord ::=               SEQUENCE {
    ue-Identity                    PagingUE-Identity,
    accessType                         ENUMERATED {non3GPP} OPTIONAL, -- Need N
    [
       releasePaging              OCTET STRING (CONTAINING RRCReleasePdcpPdu)
OPTIONAL,-- Need M
    ],
    ...
}
PagingUE-Identity ::=          CHOICE {
    ng-5G-S-TMSI                    NG-5G-S-TMSI,
    fullI-RNTI                      I-RNTI-Value,
    ...
}
-- TAG-PAGING-STOP
-- ASN1STOP
```

Reception of the RRCRelease by the UE
  The UE shall:
  1> delay the following actions defined in this sub-clause 60 ms from the moment the RRCRelease message was received or optionally when lower layers indicate that the receipt of the RRCRelease message has been successfully acknowledged, whichever is earlier;
  1> stop timer T380, if running;
  1> stop timer T320, if running;
  1> if the AS security is not activated:
    2> ignore any field included in RRCRelease message except waitTime;
    2> perform the actions upon going to RRC_IDLE as specified in 5.3.11 with the release cause 'other' upon which the procedure ends;
  1> if the RRCRelease message includes redirectedCarrierInfo indicating redirection to eutra:
    2> if cnType is included:
      3> after the cell selection, indicate the available CN Type(s) and the received cnType to upper layers;
  NOTE: Handling the case if the E-UTRA cell selected after the redirection does not support the core network type specified by the cnType, is up to UE implementation.
  1> if the RRCRelease message includes the cellReselectionPriorities:
    2> store the cell reselection priority information provided by the cellReselectionPriorities;
    2> if the t320 is included:
      3> start timer T320, with the timer value set according to the value of t320;
    1> else:
    2> apply the cell reselection priority information broadcast in the system information;
  1> if deprioritisationReq is included:
    2> start or restart timer T325 with the timer value set to the deprioritisationTimer signalled;
    2> store the deprioritisationReq until T325 expiry;
  1> if the RRCRelease includes suspendConfig:
    2> apply the received suspendConfig;
    2> reset MAC and release the default MAC Cell Group configuration, if any;
    2> re-establish RLC entities for SRB1;
    2> (newly added) if the RRCRelease message with suspendConfig was received in paging and the UE is in RRC_INACTIVE; or
    2> if the RRCRelease message with suspendConfig was received in response to an RRCResumeRequest or an RRCResumeRequest1:
      3> stop the timer T319 if running;
      3> in the stored UE Inactive AS context:
        4> replace the KgNB and KRRCint keys with the current KgNB and KRRCint keys;
        4> replace the C-RNTI with the temporary C-RNTI in the cell the UE has received the RRCRelease message, except (newly added) if RRCRelease is received in paging and that does not lead to a random access procedure;
        4> replace the cellIdentity with the cellIdentity of the cell the UE has received the RRCRelease message;
        4> replace the physical cell identity with the physical cell identity of the cell the UE has received the RRCRelease message;
    2> else:
      3> store in the UE Inactive AS Context the current KgNB and KRRCint keys, the ROHC state, the C-RNTI used in the source PCell, the cellIdentity and the physical cell identity of the source PCell, and all other parameters configured except for the ones within ReconfigurationWithSync and servingCellConfigCommonSIB;
    2> suspend all SRB(s) and DRB(s), except SRB0;
    2> indicate PDCP suspend to lower layers of all DRBs;
    2> if the t380 is included:
      3> start timer T380, with the timer value set to t380;
    2> if the RRCRelease message is including the waitTime:
      3> start timer T302 with the value set to the waitTime;
      3> inform upper layers that access barring is applicable for all access categories except categories '0' and '2';
    2> if T390 is running:
      3> stop timer T390 for all access categories;
      3> perform the actions as specified in 5.3.14.4;
    2> indicate the suspension of the RRC connection to upper layers;

2> enter RRC_INACTIVE and perform cell selection as specified in TS 38.304 [20],
1> else
2> perform the actions upon going to RRC_IDLE as specified in 5.3.11, with the release cause 'other'.

One embodiment of a way in which the RRC specifications may be modified to implement the methods described herein is set out below for the RRC Reconfiguration case.

A first possible way to implement the fact that the RRC Reconfiguration like message is transmitted with a Paging message for a UE with a power saving mode, is to extend the paging message with an RRC Resume message, as shown below.

Again, FIG. 16 is a signalling diagram corresponding to FIG. 5.3.2.1-1 in the standard, showing the general form of a paging procedure as modified by the methods described herein.

The purpose of this procedure is:
to transmit paging information to a UE in RRC_IDLE or RRC_INACTIVE;
to update the UE AS Inactive context by including an RRCReconfiguration in the Paging message.

Initiation

The network initiates the paging procedure by transmitting the Paging message at the UE's paging occasion as specified in TS 38.304 [20]. The network may address multiple UEs within a Paging message by including one PagingRecord for each UE.

Reception of the Paging message by the UE
Upon receiving the Paging message, the UE shall:
1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored fulll-RNTI:
3> (newly added) if a reconfigurationPaging is included in the PagingRecord:
4> perform the preparation actions e.g. equivalent to the resume initiation actions like stopping timers, cleaning up of variables, etc.;
4> restore the RRC configuration and the KgNB and KRRCint keys from the UE Inactive AS context, except the masterCellGroup;
4> derive the KgNB key based on the current KgNB key or the NH, using the stored nextHopChainingCount value, as specified in TS 33.501 [11];
4> derive the KRRCenc key, the KRRCint key, the KUPint key and the KUPenc key;
4> configure lower layers to apply integrity protection for all radio bearers except SRB0 using the configured algorithm and the KRRCint key and KUPint key derived in this subclause immediately, i.e., integrity protection shall be applied to all subsequent messages received and sent by the UE, including the PDCP PDU within the Paging Record;
NOTE 1: Only DRBs with previously configured UP integrity protection shall resume integrity protection.
4> configure lower layers to apply ciphering for all radio bearers except SRB0 and to apply the configured ciphering algorithm, the KRRCenc key and the KUPenc key derived in this subclause, i.e. the ciphering configuration shall be applied to all subsequent messages received and sent by the UE, including the PDCP PDU within the PagingRecord;
4> re-establish PDCP entities for SRB1;
4> resume SRB1;
4> process the reconfigurationPaging PDCP PDU as an SRB1 message (i.e. RRCReconfigurationPdcpPdu);
NOTE 2: Only DRBs with previously configured UP ciphering shall resume ciphering.
3> else if the UE is configured by upper layers with Access Identity 1:
4> initiate the RRC connection resumption procedure according to 5.3.13 with resumeCause set to mps-PriorityAccess;
3> else if the UE is configured by upper layers with Access Identity 2:
4> initiate the RRC connection resumption procedure according to 5.3.13 with resumeCause set to mcs-PriorityAccess;
3> else if the UE is configured by upper layers with one or more Access Identities equal to 11-15:
4> initiate the RRC connection resumption procedure according to 5.3.13 with resumeCause set to highPriorityAccess;
3> else:
4> initiate the RRC connection resumption procedure according to 5.3.13 with resumeCause set to mt-Access;
2> else if the ue-Identity included in the PagingRecord matches the UE identity allocated by upper layers:
3> forward the ue-Identity to upper layers and accessType (if present) to the upper layers;
3> perform the actions upon going to RRC_IDLE as specified in 5.3.11 with release cause 'other'.
. . .

- Paging
The Paging message is used for the notification of one or more UEs.
Signalling radio bearer: N/A
RLC-SAP: TM
Logical channel: PCCH
Direction: Network to UE
Paging message
-- ASN1START
-- TAG-PAGING-START
Paging ::=               SEQUENCE {
    pagingRecordList             PagingRecordList
    OPTIONAL, -- Need N
    lateNonCriticalExtension     OCTET STRING
    OPTIONAL,
    nonCriticalExtension         SEQUENCE{ }
    OPTIONAL

```
}
PagingRecordList ::=          SEQUENCE (SIZE(1..maxNrofPageRec)) OF
PagingRecord
PagingRecord ::=              SEQUENCE {
    ue-Identity               PagingUE-Identity,
    accessType                ENUMERATED {non3GPP}   OPTIONAL, -- Need N
    [
    reconfigurationPaging     OCTET STRING (CONTAINING
RRCReconfigurationPdcpPdu) OPTIONAL,-- Need M
    ],
    ...
}
PagingUE-Identity ::=         CHOICE {
    ng-5G-S-TMSI                  NG-5G-S-TMSI,
    fullI-RNTI                    I-RNTI-Value,
    ...
}
-- TAG-PAGING-STOP
-- ASN1STOP
```

Figure 17:
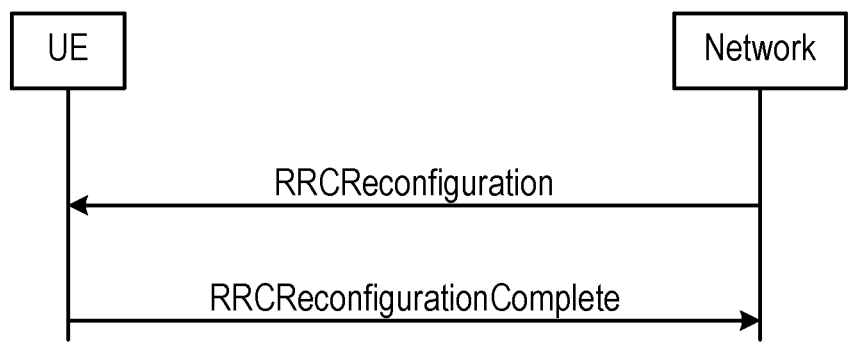
FIG. 17 is a signalling diagram illustrating a further paging procedure.

FIG. 17 is a signalling diagram corresponding to FIG. 5.3.5.1-1 in the standard, showing a successful RRC reconfiguration.

Figure 18:
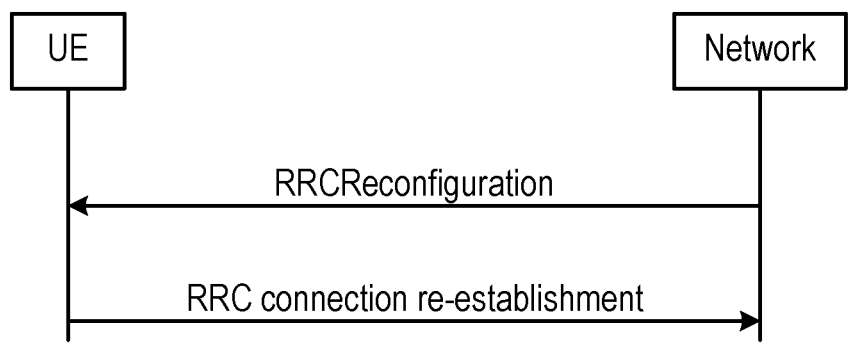
FIG. 18 is a signalling diagram illustrating a further paging procedure.

FIG. 18 is a signalling diagram corresponding to FIG. 5.3.5.1-2 in the standard, showing a RRC reconfiguration in the event of a failure.

The following is a description of the modified RRC reconfiguration procedure.

The purpose of this procedure is to modify an RRC connection, e.g. to establish/modify/release RBs, to perform reconfiguration with sync, to setup/modify/release measurements, to add/modify/release SCells and cell groups, and to update the RRC configuration in the AS Inactive context of a UE in RRC_INACTIVE. As part of the procedure, NAS dedicated information may be transferred from the Network to the UE.

RRC reconfiguration to perform reconfiguration with sync includes, but is not limited to, the following cases:
  reconfiguration with sync and security key refresh, involving RA to the PCell/PSCell, MAC reset, refresh of security and re-establishment of RLC and PDCP triggered by explicit L2 indicators;
  reconfiguration with sync but without security key refresh, involving RA to the PCell/PSCell, MAC reset and RLC re-establishment and PDCP data recovery (for AM DRB) triggered by explicit L2 indicators.

In Next Generation eNodeB Dual Connectivity ((NG)EN-DC) and New Radio Dual Connectivity (NR-DC), the System Resource Block SRB3 can be used for measurement configuration and reporting, to (re-)configure MAC, RLC, physical layer and RLF timers and constants of the SCG configuration, and to reconfigure PDCP for DRBs associated with the S-KgNB or SRB3, and to reconfigure SDAP for DRBs associated with S-KgNB in (NG)EN-DC and NR-DC, provided that the configuration or reconfiguration does not require any MN involvement. In EN-DC, only measConfig, radioBearerConfig and/or secondaryCellGroup are included in RRCReconfiguration received via SRB3.

Initiation

The Network may initiate the RRC reconfiguration procedure to a UE in RRC_CONNECTED. The Network applies the procedure as follows:
  the establishment of RBs (other than SRB1, that is established during RRC connection establishment) is performed only when AS security has been activated;
  the addition of Secondary Cell Group and SCells is performed only when AS security has been activated;
  the reconfigurationWithSync is included in secondary-CellGroup only when at least one DRB is setup in SCG;
  the reconfigurationWithSync is included in masterCell-Group only when AS security has been activated, and SRB2 with at least one DRB are setup and not suspended.

Reception of an RRCReconfiguration by the UE

The UE shall perform the following actions upon reception of the RRCReconfiguration:
1> if the RRCReconfiguration is received via other RAT (i.e., inter-RAT handover to NR):
  2> if the RRCReconfiguration does not include the fullConfig and the UE is connected to 5GC (i.e., delta signalling during intra 5GC handover):
    3> re-use the source RAT SDAP and PDCP configurations if available (i.e., current SDAP/PDCP configurations for all RBs from source E-UTRA RAT prior to the reception of the inter-RAT HO RRCReconfiguration message);
1> else:
  2> if the RRCReconfiguration includes the fullConfig:
    3> perform the full configuration procedure as specified in 5.3.5.11;
  1> if the RRCReconfiguration includes the masterCellGroup:
    2> perform the cell group configuration for the received masterCellGroup according to 5.3.5.5;
  1> if the RRCReconfiguration includes the masterKeyUpdate:
    2> perform AS security key update procedure as specified in 5.3.5.7;
  1> if the RRCReconfiguration includes the sk-Counter:
    2> perform security key update procedure as specified in 5.3.5.7;
  1> if the RRCReconfiguration includes the secondary-CellGroup:
    2> perform the cell group configuration for the SCG according to 5.3.5.5;
  1> if the RRCReconfiguration includes the mrdc-SecondaryCellGroupConfig:
    2> if the mrdc-SecondaryCellGroupConfig is set to setup:
      3> if the mrdc-SecondaryCellGroupConfig includes mrdc-ReleaseAndAdd:
        4> perform MR-DC release as specified in section 5.3.5.10;
      3> if the received mrdc-SecondaryCellGroup is set to nr-SCG:

4> perform the RRC reconfiguration according to 5.3.5.3 for the RRCReconfiguration message included in nr-SCG;
3> if the received mrdc-SecondaryCellGroup is set to eutra-SCG:
4> perform the RRC connection reconfiguration as specified in TS 36.331 [10], clause 5.3.5.3 for the RRCConnectionReconfiguration message included in eutra-SCG;
2> else (mrdc-SecondaryCellGroupConfig is set to release):
3> perform MR-DC release as specified in section 5.3.5.10;
1> if the RRCReconfiguration message includes the radioBearerConfig:
2> perform the radio bearer configuration according to 5.3.5.6;
1> if the RRCReconfiguration message includes the radioBearerConfig2:
2> perform the radio bearer configuration according to 5.3.5.6;
1> if the RRCReconfiguration message includes the measConfig:
2> perform the measurement configuration procedure as specified in 5.5.2;
1> if the RRCReconfiguration message includes the dedicatedNAS-MessageList:
2> forward each element of the dedicatedNAS-MessageList to upper layers in the same order as listed;
1> if the RRCReconfiguration message includes the dedicatedSIB1-Delivery:
2> perform the action upon reception of SIB1 as specified in 5.2.2.4.2;
1> if the RRCReconfiguration message includes the dedicatedSystemInformationDelivery:
2> perform the action upon reception of System Information as specified in 5.2.2.4;
1> if the RRCReconfiguration message includes the otherConfig:
2> perform the other configuration procedure as specified in 5.3.5.9;
1> set the content of RRCReconfigurationComplete message as follows:
2> if the RRCReconfiguration includes the masterCellGroup containing the reportUplinkTxDirectCurrent; or
2> if the RRCReconfiguration includes the secondaryCellGroup containing the reportUplinkTxDirectCurrent:
3> include the uplinkTxDirectCurrentList for each serving cell with UL;
3> if UE is configured with SUL carrier:
4> include uplinkDirectCurrentBWP-SUL for each serving cell with SUL within the uplinkTxDirectCurrentList;
2> if the received RRCReconfiguration message includes the mrdc-SecondaryCellGroupConfig with mrdc-SecondaryCellGroup set to eutra-SCG:
3> include eutra-SCG-Response within scg-Response in accordance with TS 36.331 [10] clause 5.3.5.3;
2> if the received RRCReconfiguration message includes the mrdc-SecondaryCellGroupConfig with mrdc-SecondaryCellGroup set to nr-SCG:
3> include nr-SCG-Response within scg-Response;
1> if the UE is configured with E-UTRA nr-SecondaryCellGroupConfig (MCG is E-UTRA):
2> if RRCReconfiguration was received via SRB1:
3> submit the RRCReconfigurationComplete via the E-UTRA MCG embedded in E-UTRA RRC message RRCConnectionReconfigurationComplete as specified in TS 36.331 [10];
3> if reconfigurationWithSync was included in spCellConfig of an SCG:
4> initiate the Random Access procedure on the SpCell, as specified in TS 38.321 [3];
3> else:
4> the procedure ends;
NOTE 1: The order the UE sends the RRCConnectionReconfigurationComplete message and performs the Random Access procedure towards the SCG is left to UE implementation.
2> else (RRCReconfiguration was received via SRB3):
3> submit the RRCReconfigurationComplete message via SRB3 to lower layers for transmission using the new configuration;
NOTE 2: In (NG)EN-DC and NR-DC, in the case RRCReconfiguration is received via SRB1, the random access is triggered by RRC layer itself as there is not necessarily other UL transmission. In the case RRCReconfiguration is received via SRB3, the random access is triggered by the MAC layer due to arrival of RRCReconfigurationComplete.
1> else if RRCReconfiguration message was received within the nr-SCG within mrdc-SecondaryCellGroup (NR SCG RRC Reconfiguration):
2> if reconfigurationWithSync was included in spCellConfig in nr-SCG:
3> initiate the Random Access procedure on the PSCell, as specified in TS 38.321 [3];
2> else
3> the procedure ends;
1> else if RRCReconfiguration was received via SRB3:
2> submit the RRCReconfigurationComplete message via SRB3 to lower layers for transmission using the new configuration;
1> else (MCG RRCReconfiguration):
2> submit the RRCReconfigurationComplete message via SRB1 to lower layers for transmission using the new configuration;
2> if this is the first RRCReconfiguration message after successful completion of the RRC re-establishment procedure:
3> resume SRB2 and DRBs that are suspended;
1> if reconfigurationWithSync was included in spCellConfig of an MCG or SCG, and when MAC of an NR cell group successfully completes a Random Access procedure triggered above;
2> stop timer T304 for that cell group;
2> apply the parts of the CQI reporting configuration, the scheduling request configuration and the sounding RS configuration that do not require the UE to know the SFN of the respective target SpCell, if any;
2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
2> if the reconfigurationWithSync was included in spCellConfig of an MCG:
3> if T390 is running:
4> stop timer T390 for all access categories;
4> perform the actions as specified in 5.3.14.4.

3> if RRCReconfiguration does not include dedicated-SIB1-Delivery and
3> if the active downlink BWP, which is indicated by the firstActiveDownlinkBWP-Id for the target SpCell of the MCG, has a common search space configured by searchSpaceSIB1:
4> acquire the SIB1, which is scheduled as specified in TS 38.213 [13], of the target SpCell of the MCG;
4> upon acquiring SIB1, perform the actions specified in clause 5.2.2.4.2;
1> if RRCReconfiguration was received via paging:
2> store in the UE Inactive AS Context the current KgNB and KRRCint keys, the ROHC state, the C-RNTI used in the source PCell, the cellIdentity and the physical cell identity of the source PCell, and all other parameters configured except for the ones within ReconfigurationWithSync and servingCellConfigCommonSIB;
2> suspend all SRB(s) and DRB(s), except SRB0;
2> indicate PDCP suspend to lower layers of all DRBs;
2> indicate the suspension of the RRC connection to upper layers;
2> enter RRC_INACTIVE and perform cell selection as specified in TS 38.304 [20];
1> else
2> perform the actions upon going to RRC_IDLE as specified in 5.3.11, with the release cause 'other'.

Figure 19:
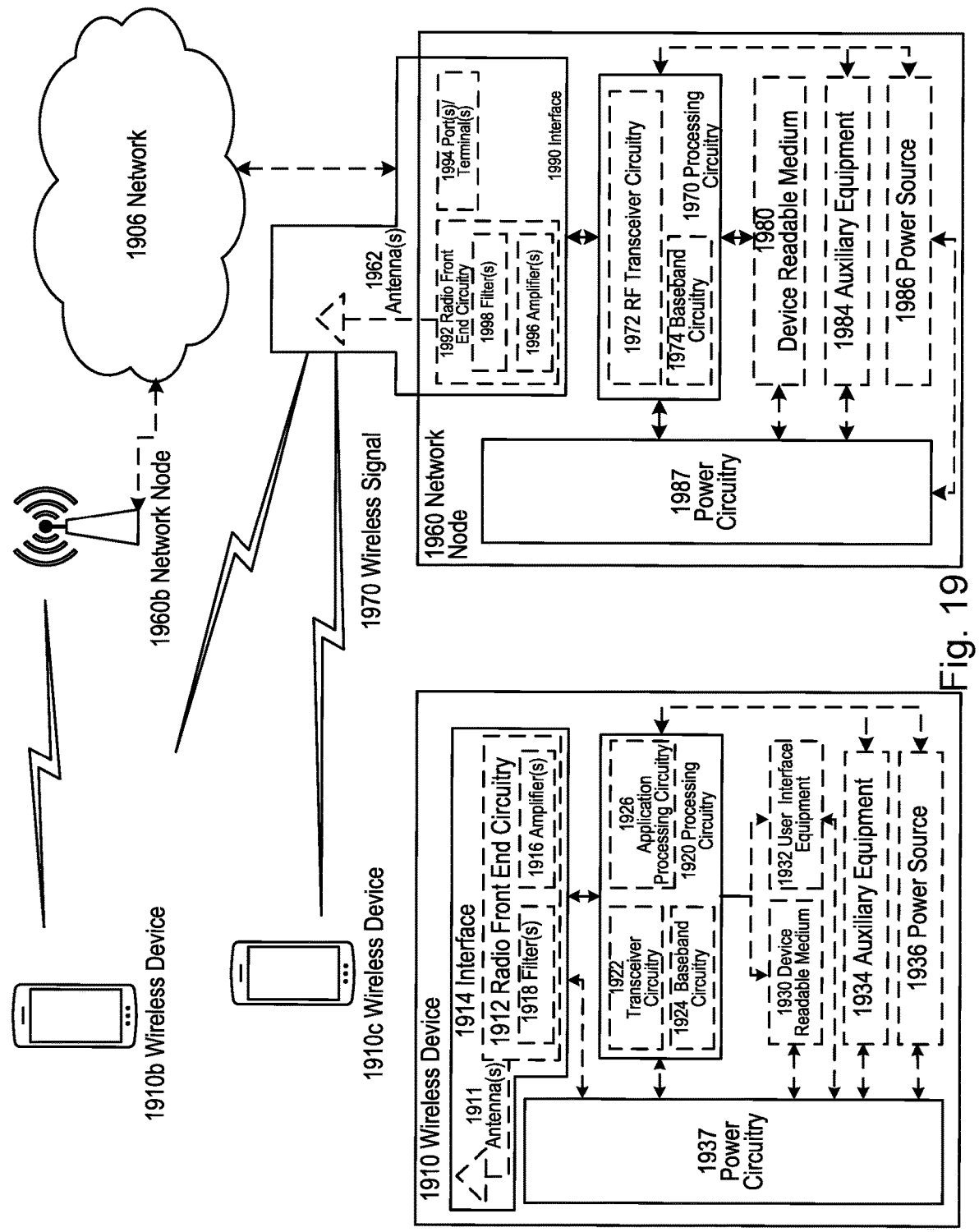
FIG. 19 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 1906, network nodes 1960 and 1960b, and WDs 1910, 1910b, and 1910c. In practice, a wireless network may further include any additional elements suitable to support communication between wireless devices or between a wireless device and another communication device, such as a landline telephone, a service provider, or any other network node or end device. Of the illustrated components, network node 1960 and wireless device (WD) 1910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network. In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1960 are depicted as single boxes located within a larger box, or nested within multiple boxes, in practice, a network node may comprise multiple different physical components that make up a single illustrated component (e.g., device readable medium 1980 may comprise multiple separate hard drives as well as multiple RAM modules).

Similarly, network node 1960 may be composed of multiple physically separate components (e.g., a NodeB component and a RNC component, or a BTS component and a BSC component, etc.), which may each have their own respective components. In certain scenarios in which network node 1960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1960 may be configured to support multiple radio access technologies (RATs). In such embodiments, some components may be duplicated (e.g., separate device readable medium 1980 for the different RATs) and some components may be reused (e.g., the same antenna 1962 may be shared by the RATs). Network node 1960 may also include multiple sets of the various illustrated components for different wireless technologies integrated into network node 1960, such as, for example, GSM, WCDMA, LTE, NR, WiFi, or Bluetooth wireless technologies. These wireless technologies may be integrated into the same or different chip or set of chips and other components within network node 1960. Processing circuitry 1970 is configured to perform any determining, calculating, or similar operations (e.g., certain obtaining operations) described herein as being provided by a network node. These operations performed by processing circuitry 1970 may include processing information obtained by processing circuitry 1970 by, for example, converting the obtained information into other information, comparing the obtained information or converted information to information stored in the network node, and/or performing one or more operations based on the obtained information or converted information, and as a result of said processing making a determination. Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1960 components, such as device readable medium 1980, network node 1960 functionality. For example, processing circuitry 1970 may execute instructions stored in device readable medium 1980 or in memory within processing circuitry 1970. Such functionality may include providing any of the various wireless features, functions, or benefits discussed herein. In some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units In certain embodiments, some or all of the functionality described herein as being provided by a network node, base station, eNB or other such network device may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or WDs via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970. In other embodiments, the interface may comprise different components and/or different combinations of components.

In certain alternative embodiments, network node 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1962 may be separate from network node 1960 and may be connectable to network node 1960 through an interface or port.

Antenna 1962, interface 1990, and/or processing circuitry 1970 may be configured to perform any receiving operations and/or certain obtaining operations described herein as being performed by a network node. Any information, data and/or signals may be received from a wireless device, another network node and/or any other network equipment. Similarly, antenna 1962, interface 1990, and/or processing circuitry 1970 may be configured to perform any transmitting operations described herein as being performed by a network node. Any information, data and/or signals may be transmitted to a wireless device, another network node and/or any other network equipment.

Power circuitry 1987 may comprise, or be coupled to, power management circuitry and is configured to supply the components of network node 1960 with power for performing the functionality described herein. Power circuitry 1987 may receive power from power source 1986. Power source 1986 and/or power circuitry 1987 may be configured to provide power to the various components of network node 1960 in a form suitable for the respective components (e.g., at a voltage and current level needed for each respective component). Power source 1986 may either be included in, or external to, power circuitry 1987 and/or network node 1960. For example, network node 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Alternative embodiments of network node 1960 may include additional components beyond those shown in FIG. 19 that may be responsible for providing certain aspects of the network node's functionality, including any of the functionality described herein and/or any functionality necessary to support the subject matter described herein. For example, network node 1960 may include user interface equipment to allow input of information into network node 1960 and to allow output of information from network node 1960. This may allow a user to perform diagnostic, maintenance, repair, and other administrative functions for network node 1960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 may include multiple sets of one or more of the illustrated components for different wireless technologies supported by WD 1910, such as, for example, GSM, WCDMA, LTE, NR, WiFi, WiMAX, or Bluetooth wireless technologies, just to mention a few. These wireless technologies may be integrated into the same or different chips or set of chips as other components within WD 1910.

Antenna 1911 may include one or more antennas or antenna arrays, configured to send and/or receive wireless signals, and is connected to interface 1914. In certain alternative embodiments, antenna 1911 may be separate from WD 1910 and be connectable to WD 1910 through an interface or port. Antenna 1911, interface 1914, and/or processing circuitry 1920 may be configured to perform any receiving or transmitting operations described herein as being performed by a WD. Any information, data and/or signals may be received from a network node and/or another WD. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, WD 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or WDs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1910 components, such as device readable medium 1930, WD 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of WD 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a WD may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 may be configured to perform any determining, calculating, or similar operations (e.g., certain obtaining operations) described herein as being performed by a WD. These operations, as performed by processing circuitry 1920, may include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination. Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with WD 1910. Such interaction may be of many forms, such as visual, audial, tactile, etc. User interface equipment 1932 may be operable to produce output to the user and to allow the user to provide input to WD 1910. The type of interaction may vary depending on the type of user interface equipment 1932 installed in WD 1910. For example, if WD 1910 is a smart phone, the interaction may be via a touch screen; if WD 1910 is a smart meter, the interaction may be through a screen that provides usage (e.g., the number of gallons used) or a speaker that provides an audible alert (e.g., if smoke is detected). User interface equipment 1932 may include input interfaces, devices and circuits, and output interfaces, devices and circuits. User interface equipment 1932 is configured to allow input of information into WD 1910, and is connected to processing circuitry 1920 to allow processing circuitry 1920 to process the input information. User interface equipment 1932 may include, for example, a microphone, a proximity or other sensor, keys/buttons, a touch display, one or more cameras, a USB port, or other input circuitry. User interface equipment 1932 is also configured to allow output of information from WD 1910, and to allow processing circuitry 1920 to output information from WD 1910. User interface equipment 1932 may include, for example, a speaker, a display, vibrating circuitry, a USB port, a headphone interface, or other output circuitry. Using one or more input and output interfaces, devices, and circuits, of user interface equipment 1932, WD 1910 may communicate with end users and/or the wireless network, and allow them to benefit from the functionality described herein.

Auxiliary equipment 1934 is operable to provide more specific functionality which may not be generally performed by WDs. This may comprise specialized sensors for doing measurements for various purposes, interfaces for additional types of communication such as wired communications etc. The inclusion and type of components of auxiliary equipment 1934 may vary depending on the embodiment and/or scenario.

Power source 1936 may, in some embodiments, be in the form of a battery or battery pack. Other types of power sources, such as an external power source (e.g., an electricity outlet), photovoltaic devices or power cells, may also be used. WD 1910 may further comprise power circuitry 1937 for delivering power from power source 1936 to the various parts of WD 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case WD 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936. Power circuitry 1937 may perform any formatting, converting, or other modification to the power from power source 1936 to make the power suitable for the respective components of WD 1910 to which power is supplied.

Figure 20:
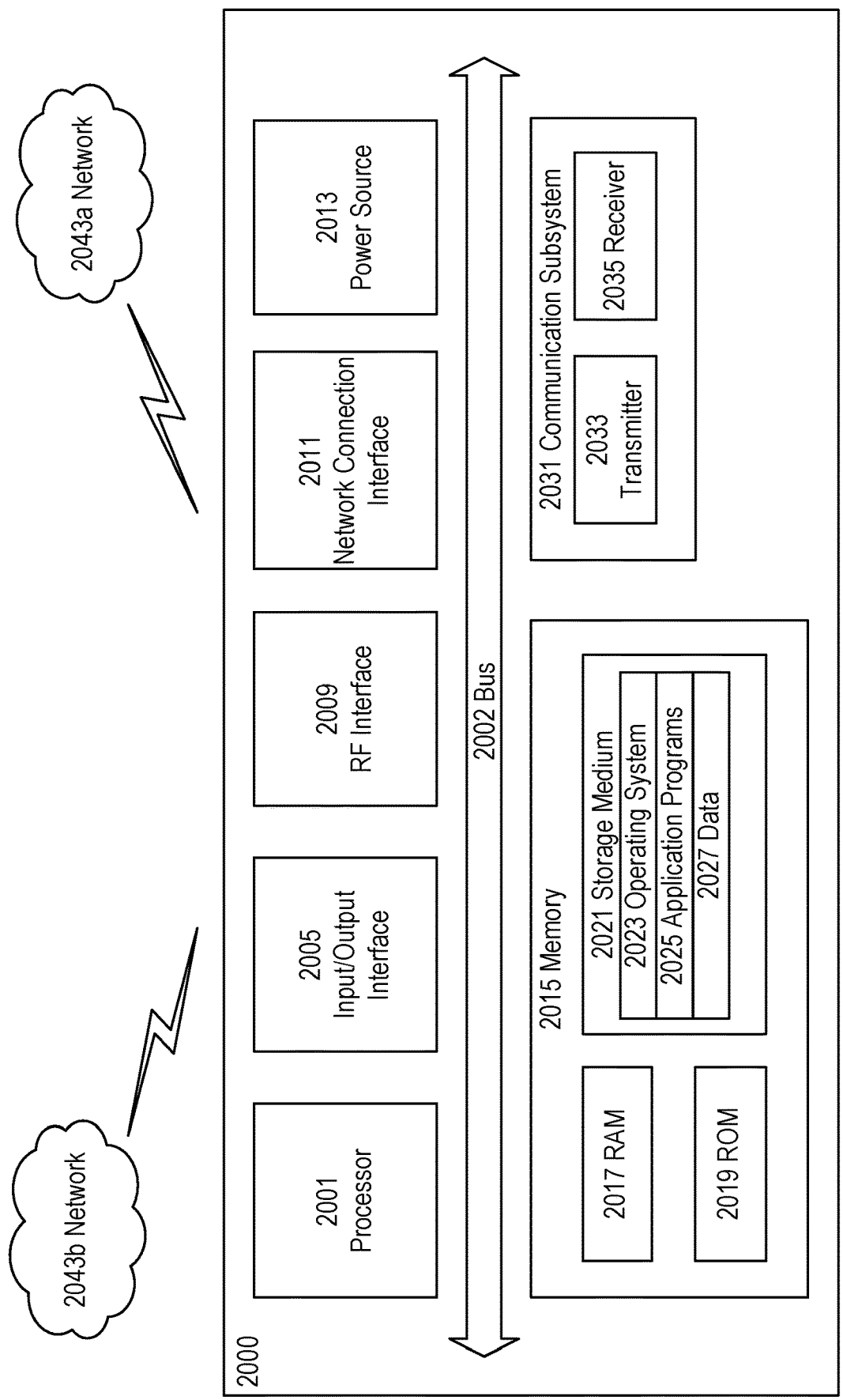
FIG. 20 shows a User Equipment in accordance with some embodiments.

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2000 may be any UE identified by the 3rd Generation Partnership Project (3GPP), including a NB-IoT UE, a machine type communication (MTC) UE, and/or an enhanced MTC (eMTC) UE. UE 2000, as illustrated in FIG. 20, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE 2000 includes processing circuitry 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2033, and/or any other component, or any combination thereof. Storage medium 2021 includes operating system 2023, application program 2025, and data 2027. In other embodiments, storage medium 2021 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry 2001 may be configured to process computer instructions and data. Processing circuitry 2001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2001 may include two central processing units (CPUs). Data may be information in a form suitable for use by a computer.

In the depicted embodiment, input/output interface 2005 may be configured to provide a communication interface to an input device, output device, or input and output device. UE 2000 may be configured to use an output device via input/output interface 2005. An output device may use the same type of interface port as an input device. For example, a USB port may be used to provide input to and output from UE 2000. The output device may be a speaker, a sound card, a video card, a display, a monitor, a printer, an actuator, an emitter, a smartcard, another output device, or any combination thereof. UE 2000 may be configured to use an input device via input/output interface 2005 to allow a user to capture information into UE 2000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 2009 may be configured to provide a communication interface to RF components such as a transmitter, a receiver, and an antenna. Network connection interface 2011 may be configured to provide a communication interface to network 2043a. Network 2043a may encompass wired and/or wireless networks such as a local-area network (LAN), a wide-area network (WAN), a computer network, a wireless network, a telecommunications network, another like network or any combination thereof. For example, network 2043a may comprise a Wi-Fi network. Network connection interface 2011 may be configured to include a receiver and a transmitter interface used to communicate with one or more other devices over a communication network according to one or more communication protocols, such as Ethernet, TCP/IP, SONET, ATM, or the like. Network connection interface 2011 may implement receiver and transmitter functionality appropriate to the communication network links (e.g., optical, electrical, and the like). The transmitter and receiver functions may share circuit components, software or firmware, or alternatively may be implemented separately.

RAM 2017 may be configured to interface via bus 2002 to processing circuitry 2001 to provide storage or caching of data or computer instructions during the execution of software programs such as the operating system, application programs, and device drivers. ROM 2019 may be configured to provide computer instructions or data to processing circuitry 2001. For example, ROM 2019 may be configured to store invariant low-level system code or data for basic system functions such as basic input and output (I/O), startup, or reception of keystrokes from a keyboard that are stored in a non-volatile memory. Storage medium 2021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2021 may be configured to include operating system 2023, application program 2025 such as a web browser application, a widget or gadget engine or another application, and data file 2027. Storage medium 2021 may store, for use by UE 2000, any of a variety of various operating systems or combinations of operating systems.

Storage medium 2021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 may allow UE 2000 to access computer-executable instructions, application programs or the like, stored on transitory or non-transitory memory media, to off-load data, or to upload data. An article of manufacture, such as one utilizing a communication system may be tangibly embodied in storage medium 2021, which may comprise a device readable medium.

In FIG. 20, processing circuitry 2001 may be configured to communicate with network 2043b using communication subsystem 2031. Network 2043a and network 2043b may be the same network or networks or different network or networks. Communication subsystem 2031 may be configured to include one or more transceivers used to communicate with network 2043b. For example, communication subsystem 2031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2033 and/or receiver 2035 to implement transmitter or receiver functionality, respectively, appropriate to the RAN links (e.g., frequency allocations and the like). Further, transmitter 2033 and receiver 2035 of each transceiver may share circuit components, software or firmware, or alternatively may be implemented separately.

In the illustrated embodiment, the communication functions of communication subsystem 2031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 may include cellular communication, Wi-Fi communication, Bluetooth communication, and GPS communication. Network 2043b may encompass wired and/or wireless networks such as a local-area network (LAN), a wide-area network (WAN), a computer network, a wireless network, a telecommunications network, another like network or any combination thereof. For example, network 2043b may be a cellular network, a Wi-Fi network, and/or a near-field network. Power source 2013 may be configured to provide alternating current (AC) or direct current (DC) power to components of UE 2000.

The features, benefits and/or functions described herein may be implemented in one of the components of UE 2000 or partitioned across multiple components of UE 2000. Further, the features, benefits, and/or functions described herein may be implemented in any combination of hardware, software or firmware. In one example, communication subsystem 2031 may be configured to include any of the components described herein. Further, processing circuitry 2001 may be configured to communicate with any of such components over bus 2002. In another example, any of such components may be represented by program instructions stored in memory that when executed by processing circuitry 2001 perform the corresponding functions described herein. In another example, the functionality of any of such components may be partitioned between processing circuitry 2001 and communication subsystem 2031. In another example, the non-computationally intensive functions of any of such components may be implemented in software or firmware and the computationally intensive functions may be implemented in hardware.

Figure 21:
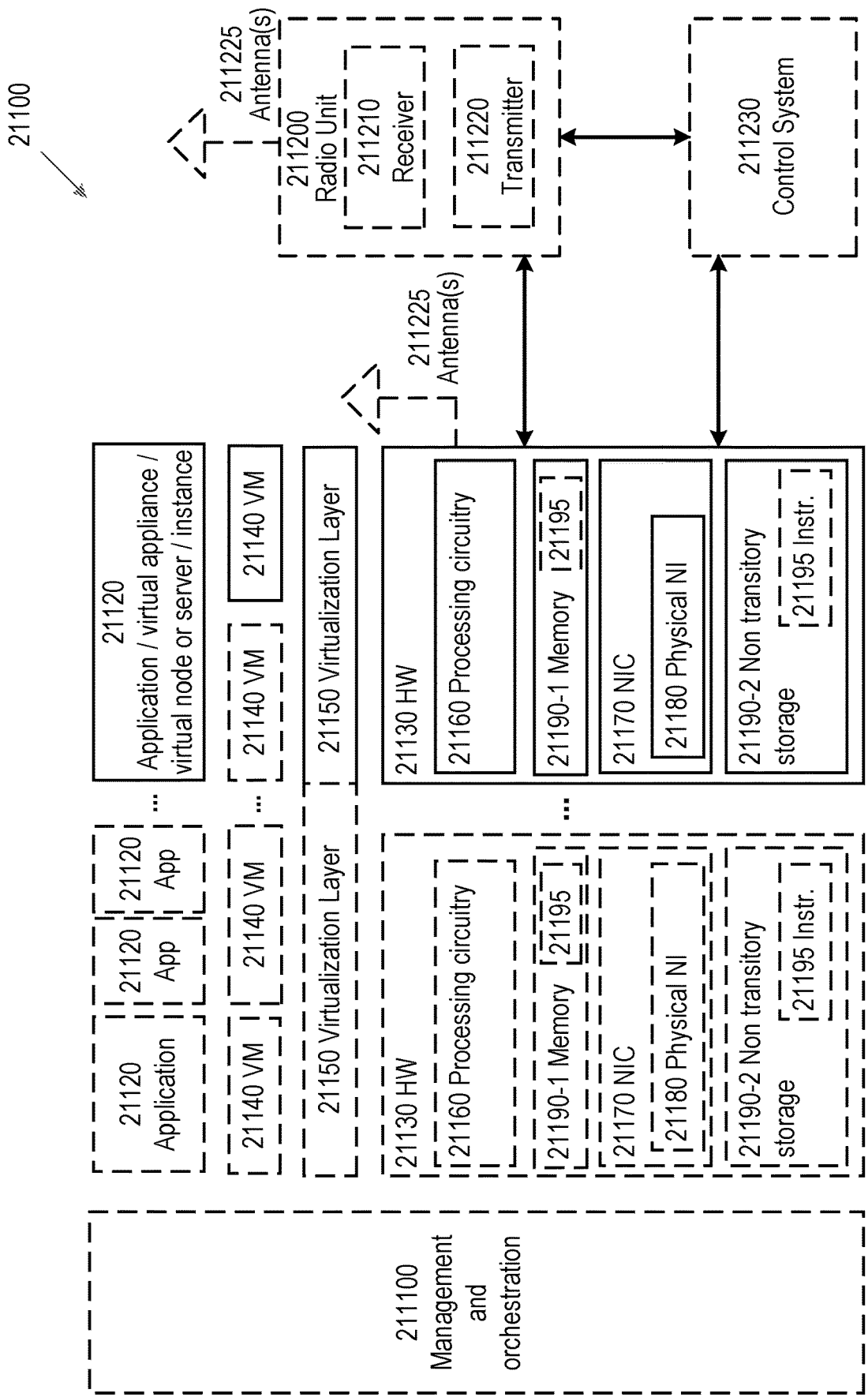
FIG. 21 shows a virtualization environment in accordance with some embodiments.

FIG. 21 is a schematic block diagram illustrating a virtualization environment 2100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2100 hosted by one or more of hardware nodes 2130. Further, in embodiments in which the virtual node is not a radio access node or does not require radio connectivity (e.g., a core network node), then the network node may be entirely virtualized.

The functions may be implemented by one or more applications 2120 (which may alternatively be called software instances, virtual appliances, network functions, virtual nodes, virtual network functions, etc.) operative to implement some of the features, functions, and/or benefits of some of the embodiments disclosed herein. Applications 2120 are run in virtualization environment 2100 which provides hardware 2130 comprising processing circuitry 2160 and memory 2190. Memory 2190 contains instructions 2195 executable by processing circuitry 2160 whereby application 2120 is operative to provide one or more of the features, benefits, and/or functions disclosed herein.

Virtualization environment 2100, comprises general-purpose or special-purpose network hardware devices 2130 comprising a set of one or more processors or processing circuitry 2160, which may be commercial off-the-shelf (COTS) processors, dedicated Application Specific Integrated Circuits (ASICs), or any other type of processing circuitry including digital or analog hardware components or special purpose processors. Each hardware device may comprise memory 2190-1 which may be non-persistent memory for temporarily storing instructions 2195 or software executed by processing circuitry 2160. Each hardware device may comprise one or more network interface controllers (NICs) 2170, also known as network interface cards, which include physical network interface 2180. Each hardware device may also include non-transitory, persistent, machine-readable storage media 2190-2 having stored therein software 2195 and/or instructions executable by processing circuitry 2160. Software 2195 may include any type of software including software for instantiating one or more virtualization layers 2150 (also referred to as hypervisors), software to execute virtual machines 2140 as well as software allowing it to execute functions, features and/or benefits described in relation with some embodiments described herein.

Virtual machines 2140, comprise virtual processing, virtual memory, virtual networking or interface and virtual storage, and may be run by a corresponding virtualization layer 2150 or hypervisor. Different embodiments of the instance of virtual appliance 2120 may be implemented on one or more of virtual machines 2140, and the implementations may be made in different ways.

During operation, processing circuitry 2160 executes software 2195 to instantiate the hypervisor or virtualization layer 2150, which may sometimes be referred to as a virtual machine monitor (VMM). Virtualization layer 2150 may present a virtual operating platform that appears like networking hardware to virtual machine 2140. As shown in FIG. 21, hardware 2130 may be a standalone network node with generic or specific components. Hardware 2130 may comprise antenna 21225 and may implement some functions via virtualization. Alternatively, hardware 2130 may be part of a larger cluster of hardware (e.g. such as in a data center or customer premise equipment (CPE)) where many hardware nodes work together and are managed via management and orchestration (MANO) 21100, which, among others, oversees lifecycle management of applications 2120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2140 may be a software implementation of a physical machine that runs programs as if they were executing on a physical, non-virtualized machine. Each of virtual machines 2140, and that part of hardware 2130 that executes that virtual machine, be it hardware dedicated to that virtual machine and/or hardware shared by that virtual machine with others of the virtual machines 2140, forms a separate virtual network elements (VNE).

Still in the context of NFV, Virtual Network Function (VNF) is responsible for handling specific network functions that run in one or more virtual machines 2140 on top of hardware networking infrastructure 2130 and corresponds to application 2120 in FIG. 21.

In some embodiments, one or more radio units 21200 that each include one or more transmitters 21220 and one or more receivers 21210 may be coupled to one or more antennas 21225. Radio units 21200 may communicate directly with hardware nodes 2130 via one or more appropriate network interfaces and may be used in combination with the virtual components to provide a virtual node with radio capabilities, such as a radio access node or a base station.

In some embodiments, some signalling can be effected with the use of control system 21230 which may alternatively be used for communication between the hardware nodes 2130 and radio units 21200.

Figure 22:
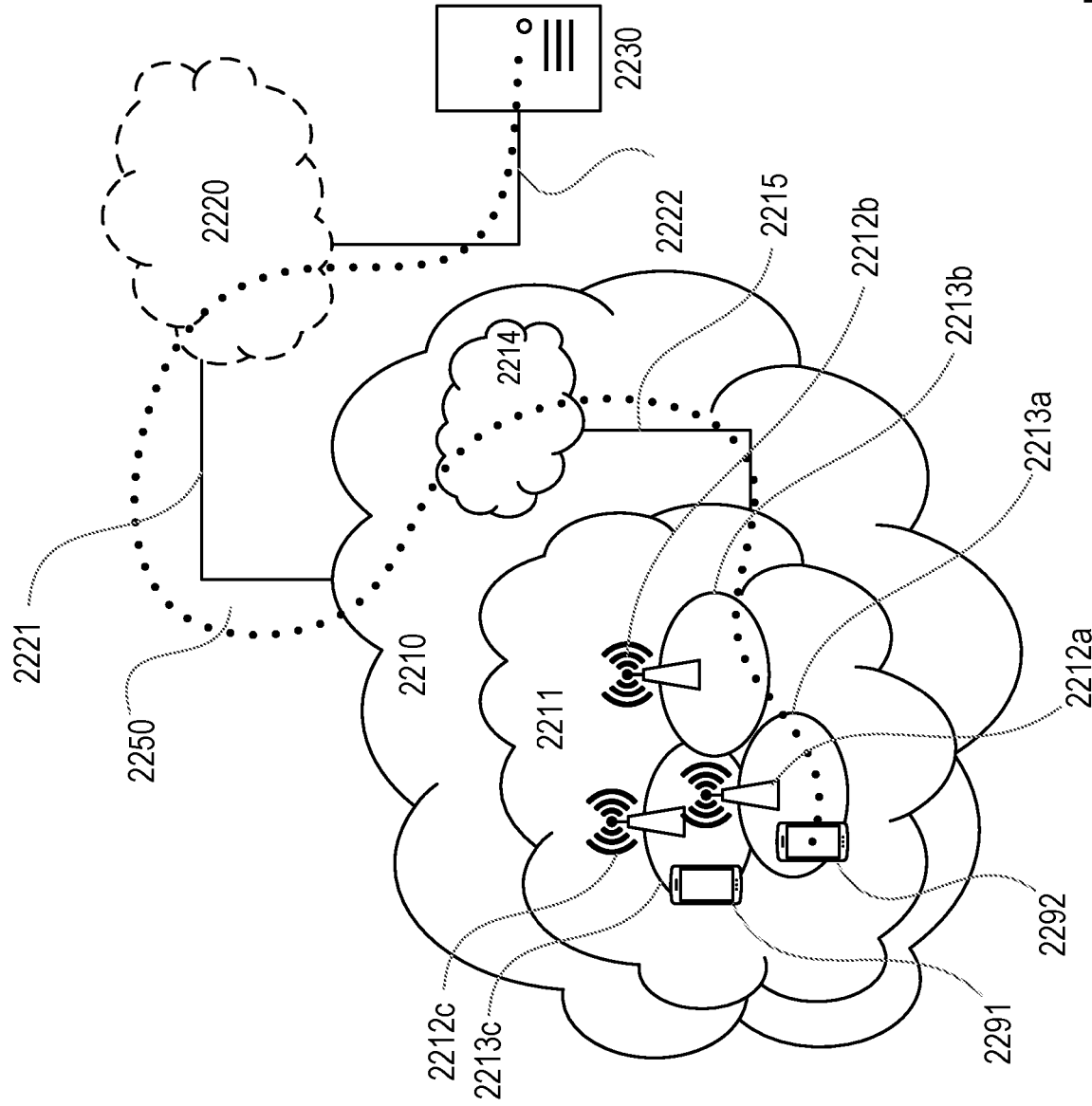
FIG. 22 shows a telecommunication network connected via an intermediate network to a host computer in accordance with some embodiments.

With reference to FIG. 22, in accordance with an embodiment, a communication system includes telecommunication network 2210, such as a 3GPP-type cellular network, which comprises access network 2211, such as a radio access network, and core network 2214. Access network 2211 comprises a plurality of base stations 2212a, 2212b, 2212c, such as NBs, eNBs, gNBs or other types of wireless access points, each defining a corresponding coverage area 2213a, 2213b, 2213c. Each base station 2212a, 2212b, 2212c is connectable to core network 2214 over a wired or wireless connection 2215. A first UE 2291 located in coverage area 2213c is configured to wirelessly connect to, or be paged by, the corresponding base station 2212c. A second UE 2292 in coverage area 2213a is wirelessly connectable to the corresponding base station 2212a. While a plurality of UEs 2291, 2292 are illustrated in this example, the disclosed embodiments are equally applicable to a situation where a sole UE is in the coverage area or where a sole UE is connecting to the corresponding base station 2212.

Telecommunication network 2210 is itself connected to host computer 2230, which may be embodied in the hardware and/or software of a standalone server, a cloud-implemented server, a distributed server or as processing resources in a server farm. Host computer 2230 may be under the ownership or control of a service provider, or may be operated by the service provider or on behalf of the service provider. Connections 2221 and 2222 between telecommunication network 2210 and host computer 2230 may extend directly from core network 2214 to host computer 2230 or may go via an optional intermediate network 2220. Intermediate network 2220 may be one of, or a combination of more than one of, a public, private or hosted network; intermediate network 2220, if any, may be a backbone network or the Internet; in particular, intermediate network 2220 may comprise two or more sub-networks (not shown).

The communication system of FIG. 22 as a whole enables connectivity between the connected UEs 2291, 2292 and host computer 2230. The connectivity may be described as an over-the-top (OTT) connection 2250. Host computer 2230 and the connected UEs 2291, 2292 are configured to communicate data and/or signaling via OTT connection 2250, using access network 2211, core network 2214, any intermediate network 2220 and possible further infrastructure (not shown) as intermediaries. OTT connection 2250 may be transparent in the sense that the participating communication devices through which OTT connection 2250 passes are unaware of routing of uplink and downlink communications. For example, base station 2212 may not or need not be informed about the past routing of an incoming downlink communication with data originating from host computer 2230 to be forwarded (e.g., handed over) to a connected UE 2291. Similarly, base station 2212 need not be aware of the future routing of an outgoing uplink communication originating from the UE 2291 towards the host computer 2230.

Example implementations, in accordance with an embodiment, of the UE, base station and host computer discussed in the preceding paragraphs will now be described with reference to FIG. 23. In communication system 2300, host computer 2310 comprises hardware 2315 including communication interface 2316 configured to set up and maintain a wired or wireless connection with an interface of a different communication device of communication system 2300. Host computer 2310 further comprises processing circuitry 2318, which may have storage and/or processing capabilities. In particular, processing circuitry 2318 may comprise one or more programmable processors, application-specific integrated circuits, field programmable gate arrays or combinations of these (not shown) adapted to execute instructions. Host computer 2310 further comprises software 2311, which is stored in or accessible by host computer 2310 and executable by processing circuitry 2318. Software 2311 includes host application 2312. Host application 2312 may be operable to provide a service to a remote user, such as UE 2330 connecting via OTT connection 2350 terminating at UE 2330 and host computer 2310. In providing the service to the remote user, host application 2312 may provide user data which is transmitted using OTT connection 2350.

Communication system 2300 further includes base station 2320 provided in a telecommunication system and comprising hardware 2325 enabling it to communicate with host computer 2310 and with UE 2330. Hardware 2325 may include communication interface 2326 for setting up and maintaining a wired or wireless connection with an interface of a different communication device of communication system 2300, as well as radio interface 2327 for setting up and maintaining at least wireless connection 2370 with UE 2330 located in a coverage area (not shown in FIG. 23) served by base station 2320. Communication interface 2326 may be configured to facilitate connection 2360 to host computer 2310. Connection 2360 may be direct or it may pass through a core network (not shown in FIG. 23) of the telecommunication system and/or through one or more intermediate networks outside the telecommunication system. In the embodiment shown, hardware 2325 of base station 2320 further includes processing circuitry 2328, which may comprise one or more programmable processors, application-specific integrated circuits, field programmable gate arrays or combinations of these (not shown) adapted to execute instructions. Base station 2320 further has software 2321 stored internally or accessible via an external connection.

Communication system 2300 further includes UE 2330 already referred to. Its hardware 2335 may include radio interface 2337 configured to set up and maintain wireless connection 2370 with a base station serving a coverage area in which UE 2330 is currently located. Hardware 2335 of UE 2330 further includes processing circuitry 2338, which may comprise one or more programmable processors, application-specific integrated circuits, field programmable gate arrays or combinations of these (not shown) adapted to execute instructions. UE 2330 further comprises software 2331, which is stored in or accessible by UE 2330 and executable by processing circuitry 2338. Software 2331 includes client application 2332. Client application 2332 may be operable to provide a service to a human or non-human user via UE 2330, with the support of host computer 2310. In host computer 2310, an executing host application 2312 may communicate with the executing client application 2332 via OTT connection 2350 terminating at UE 2330 and host computer 2310. In providing the service to the user, client application 2332 may receive request data from host application 2312 and provide user data in response to the request data. OTT connection 2350 may transfer both the request data and the user data. Client application 2332 may interact with the user to generate the user data that it provides.

Figure 23:
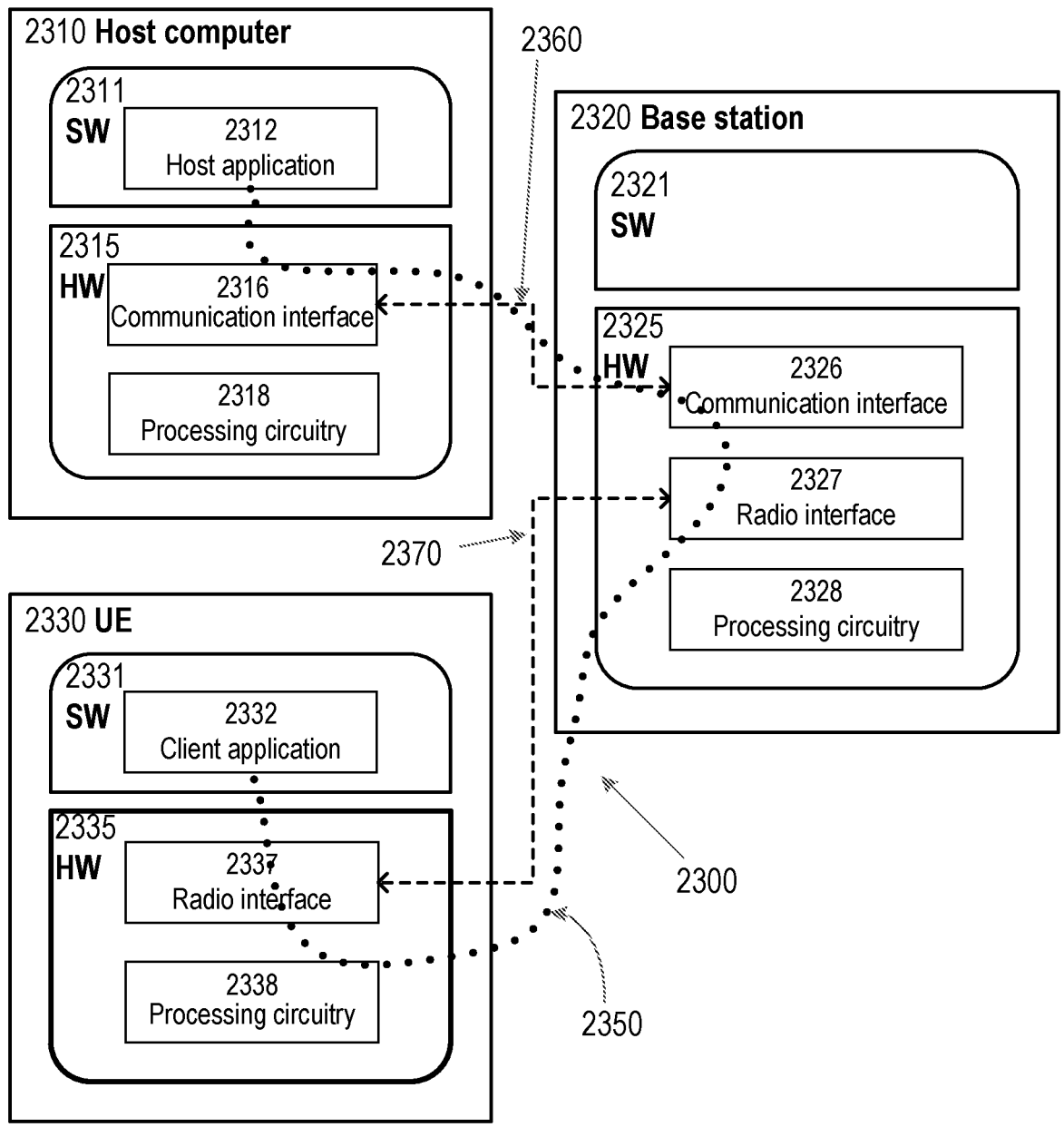
FIG. 23 shows a host computer communicating via a base station with a user equipment over a partially wireless connection in accordance with some embodiments.

It is noted that host computer 2310, base station 2320 and UE 2330 illustrated in FIG. 23 may be similar or identical to host computer 2230, one of base stations 2212a, 2212b, 2212c and one of UEs 2291, 2292 of FIG. 22, respectively. This is to say, the inner workings of these entities may be as shown in FIG. 23 and independently, the surrounding network topology may be that of FIG. 22.

In FIG. 23, OTT connection 2350 has been drawn abstractly to illustrate the communication between host computer 2310 and UE 2330 via base station 2320, without explicit reference to any intermediary devices and the precise routing of messages via these devices. Network infrastructure may determine the routing, which it may be configured to hide from UE 2330 or from the service provider operating host computer 2310, or both. While OTT connection 2350 is active, the network infrastructure may further take decisions by which it dynamically changes the routing (e.g., on the basis of load balancing consideration or reconfiguration of the network).

Wireless connection 2370 between UE 2330 and base station 2320 is in accordance with the teachings of the embodiments described throughout this disclosure. One or more of the various embodiments improve the performance of OTT services provided to UE 2330 using OTT connection 2350, in which wireless connection 2370 forms the last segment. More precisely, the teachings of these embodiments may improve the data rate, latency, and/or power consumption and thereby provide benefits such as reduced user waiting time, relaxed restriction on file size, better responsiveness, and extended battery lifetime.

A measurement procedure may be provided for the purpose of monitoring data rate, latency and other factors on which the one or more embodiments improve. There may further be an optional network functionality for reconfiguring OTT connection 2350 between host computer 2310 and UE 2330, in response to variations in the measurement results. The measurement procedure and/or the network functionality for reconfiguring OTT connection 2350 may be implemented in software 2311 and hardware 2315 of host computer 2310 or in software 2331 and hardware 2335 of UE 2330, or both. In embodiments, sensors (not shown) may be deployed in or in association with communication devices through which OTT connection 2350 passes; the sensors may participate in the measurement procedure by supplying values of the monitored quantities exemplified above, or supplying values of other physical quantities from which software 2311, 2331 may compute or estimate the monitored quantities. The reconfiguring of OTT connection 2350 may include message format, retransmission settings, preferred routing etc.; the reconfiguring need not affect base station 2320, and it may be unknown or imperceptible to base station 2320. Such procedures and functionalities may be known and practiced in the art. In certain embodiments, measurements may involve proprietary UE signaling facilitating host computer 2310's measurements of throughput, propagation times, latency and the like. The measurements may be implemented in that software 2311 and 2331 causes messages to be transmitted, in particular empty or 'dummy' messages, using OTT connection 2350 while it monitors propagation times, errors etc.

Figure 24:
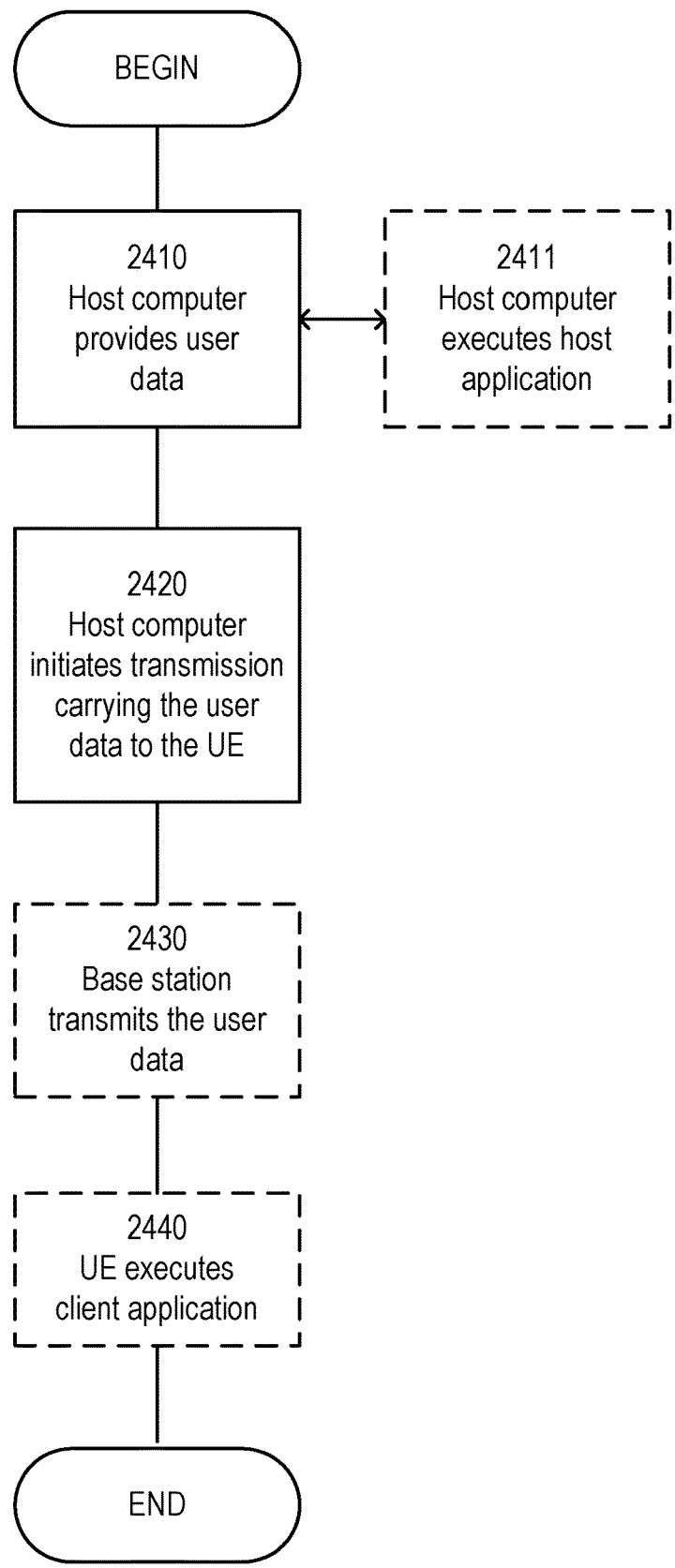
FIG. 24 shows methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step 2410, the host computer provides user data. In substep 2411 (which may be optional) of step 2410, the host computer provides the user data by executing a host application. In step 2420, the host computer initiates a transmission carrying the user data to the UE. In step 2430 (which may be optional), the base station transmits to the UE the user data which was carried in the transmission that the host computer initiated, in accordance with the teachings of the embodiments described throughout this disclosure. In step 2440 (which may also be optional), the UE executes a client application associated with the host application executed by the host computer.

Figure 25:
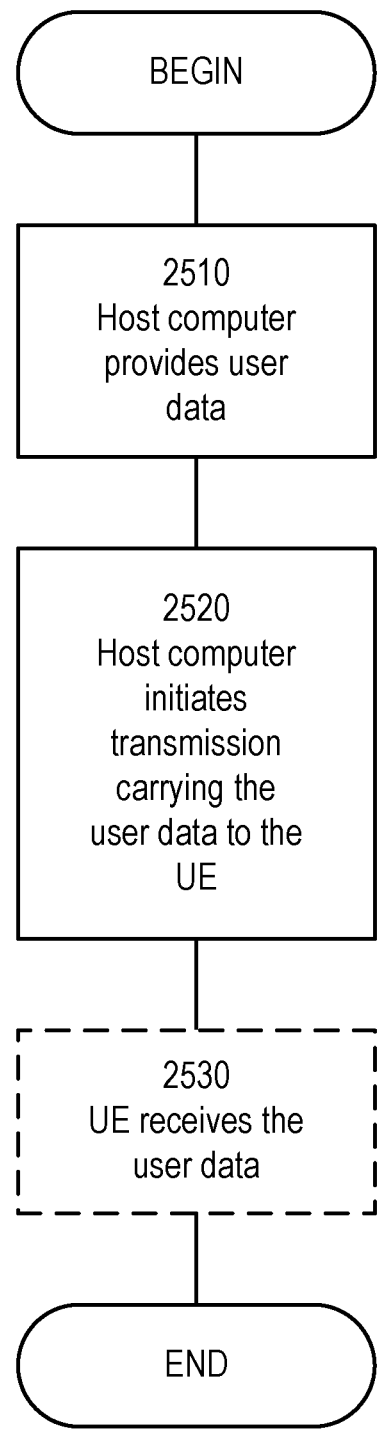
FIG. 25 shows methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission may pass via the base station, in accordance with the teachings of the embodiments described throughout this disclosure. In step 2530 (which may be optional), the UE receives the user data carried in the transmission.

Figure 26:
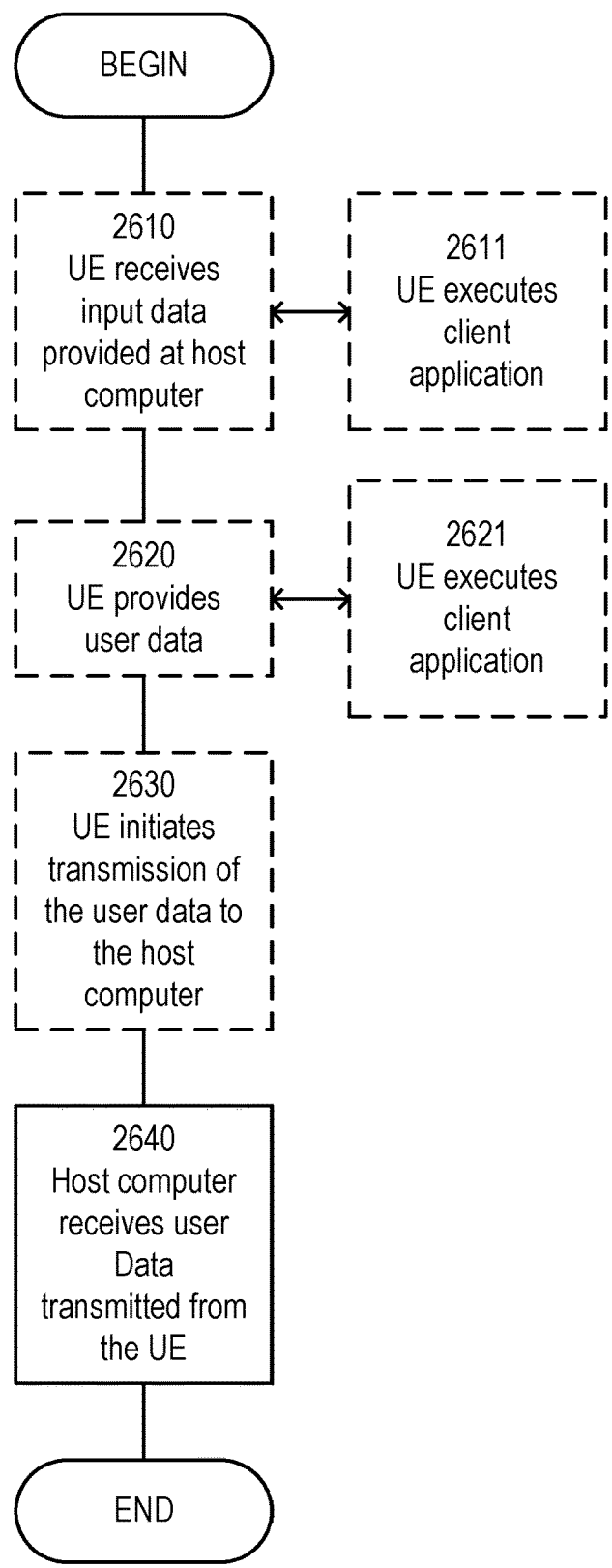
FIG. 26 shows methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step 2610 (which may be optional), the UE receives input data provided by the host computer. Additionally or alternatively, in step 2620, the UE provides user data. In substep 2621 (which may be optional) of step 2620, the UE provides the user data by executing a client application. In substep 2611 (which may be optional) of step 2610, the UE executes a client application which provides the user data in reaction to the received input data provided by the host computer. In providing the user data, the executed client application may further consider user input received from the user. Regardless of the specific manner in which the user data was provided, the UE initiates, in substep 2630 (which may be optional), transmission of the user data to the host computer. In step 2640 of the method, the host computer receives the user data transmitted from the UE, in accordance with the teachings of the embodiments described throughout this disclosure.

Figure 27:
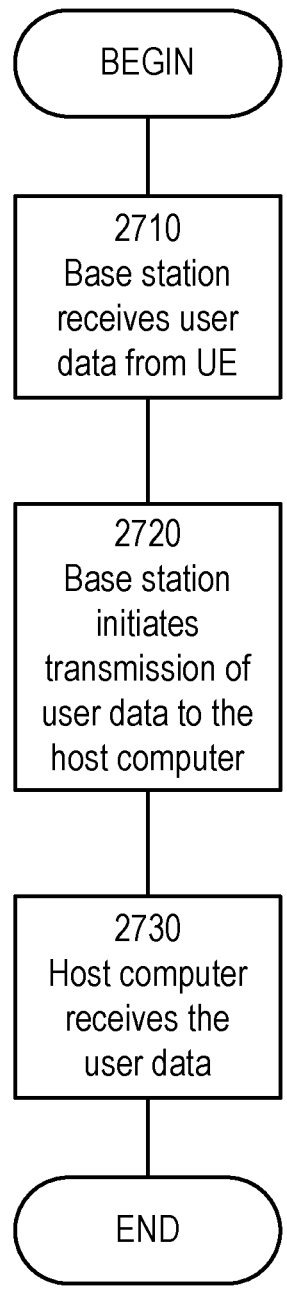
FIG. 27 shows methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step 2710 (which may be optional), in accordance with the teachings of the embodiments described throughout this disclosure, the base station receives user data from the UE. In step 2720 (which may be optional), the base station initiates transmission of the received user data to the host computer. In step 2730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 28:
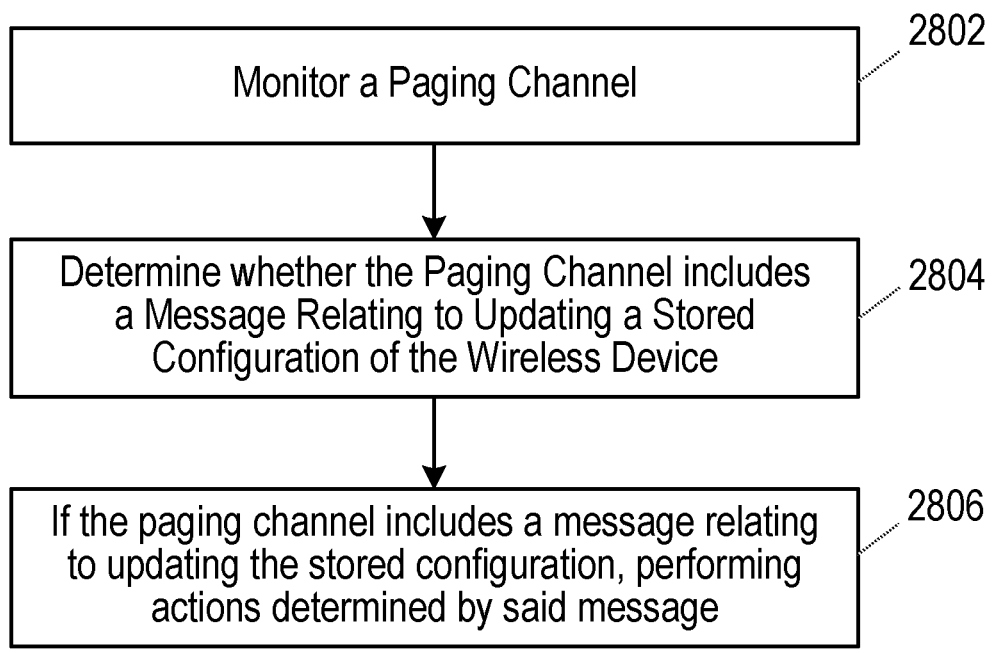
FIG. 28 is a flow diagram showing a method in accordance with some embodiments.

FIG. 28 depicts a method in accordance with particular embodiments, performed by a wireless device for updating a stored configuration. The method begins at step 2802, while the wireless device is in a power saving state, and monitoring a paging channel. When the wireless device receives a paging message on the paging channel, at step 2804 it determines whether the paging channel includes a message relating to updating a stored configuration of the wireless device, that is, re-configuring a context of the wireless device. If the paging channel includes a message relating to updating the stored configuration of the wireless device, at step 2806 it performs actions determined by said message.

The message relating to updating a stored configuration of the wireless device, or re-configuring a context of the wireless device, may include information relating to updating the stored configuration, or re-configuring the context, of the wireless device, or may include a pointer to such information.

The step of performing the actions determined by the message may comprise updating the stored configuration, for example re-configuring the context of the wireless device.

Figure 29:
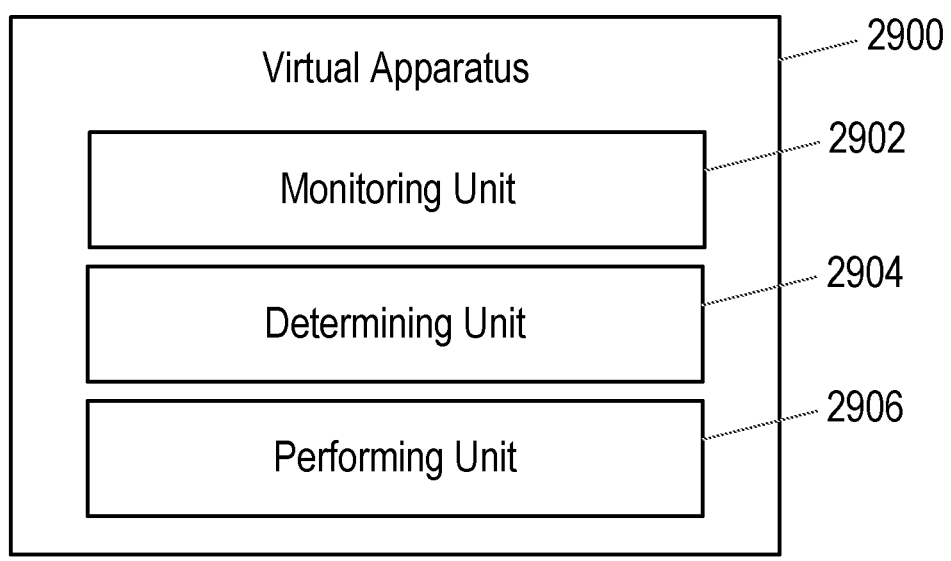
FIG. 29 illustrates a virtualization apparatus in accordance with some embodiments.

FIG. 29 illustrates a schematic block diagram of an apparatus 2900 in a wireless network (for example, wireless network shown in FIG. 19). The apparatus may be implemented in a wireless device or network node (e.g., wireless device 1910 or network node 1960 shown in FIG.

19). Apparatus 2900 is operable to carry out the example method described with reference to FIG. 28 and possibly any other processes or methods disclosed herein. It is also to be understood that the method of FIG. 28 is not necessarily carried out solely by apparatus 2900. At least some operations of the method can be performed by one or more other entities.

Virtual Apparatus 2900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause monitoring unit 2902, determining unit 2904, and performing unit 2906, and any other suitable units of apparatus 2900 to perform corresponding functions according one or more embodiments of the present disclosure.

As illustrated in FIG. 29, apparatus 2900 includes a monitoring unit 2902, configured, while the wireless device is in a power saving state, for monitoring a paging channel; a determining unit 2904, configured for, when receiving a paging message on the paging channel, determining whether the paging channel includes a message relating to updating the stored configuration of the wireless device; and a performing unit 2906, configured for, if the paging channel includes a message relating to updating the stored configuration of the wireless device, performing actions determined by said message.

Figure 30:
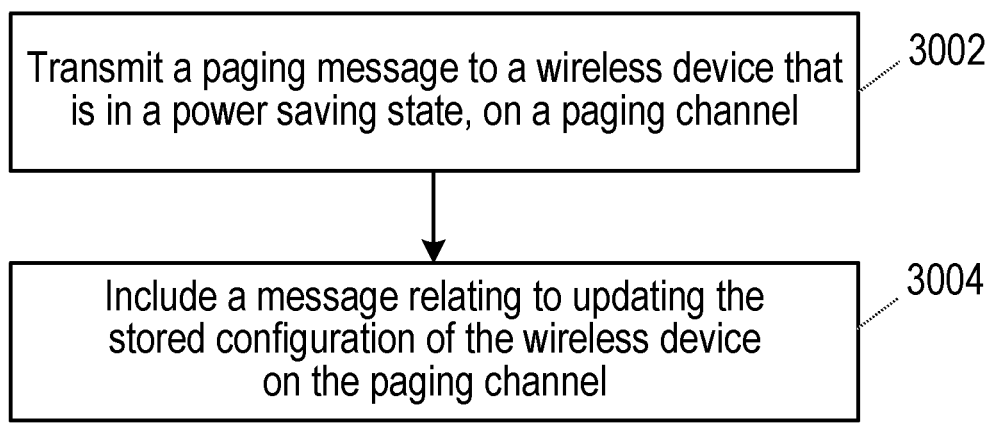
FIG. 30 is a flow diagram showing a method in accordance with some embodiments.

FIG. 30 is a flow chart that depicts a method in accordance with particular embodiments, performed by a base station for updating a stored configuration of a wireless device. At step 3002, the base station transmits a paging message to a wireless device that is in a power saving state, on a paging channel. At step 3004, the base station includes a message relating to updating a stored configuration, or re-configuring a context, of the wireless device on the paging channel.

Figure 31:
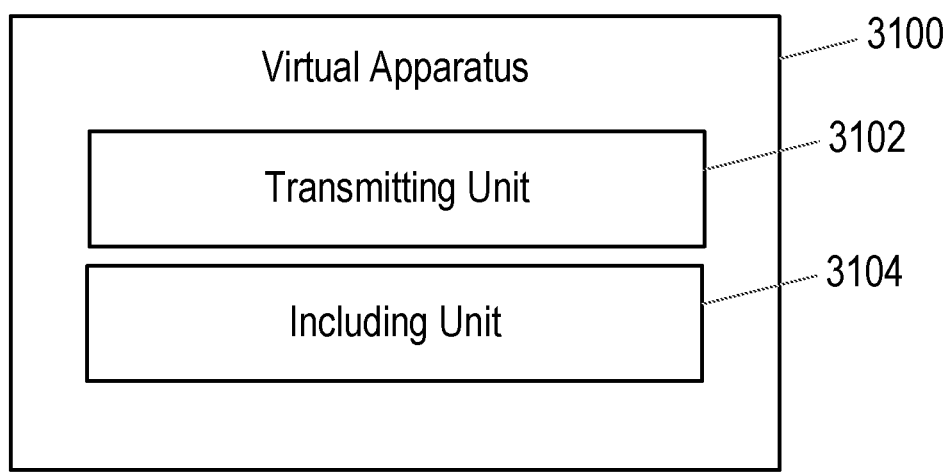
FIG. 31 illustrates a virtualization apparatus in accordance with some embodiments.

FIG. 31 is a schematic block diagram of an apparatus 3100 in a wireless network (for example, the wireless network shown in FIG. 19). The apparatus may be implemented in a wireless device or network node (e.g., wireless device 1910 or network node 1960 shown in FIG. 19). Apparatus 3100 is operable to carry out the example method described with reference to FIG. 30 and possibly any other processes or methods disclosed herein. It is also to be understood that the method of FIG. 30 is not necessarily carried out solely by apparatus 3100. At least some operations of the method can be performed by one or more other entities.

Virtual Apparatus 3100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 3102, and including unit 3104, and any other suitable units of apparatus 3100, to perform corresponding functions according one or more embodiments of the present disclosure.

As illustrated in FIG. 31, apparatus 3100 is configured to perform a method by a base station for updating a stored configuration of a wireless device, and includes a transmitting unit 3102, configured for transmitting a paging message to a wireless device that is in a power saving state, on a paging channel; and an including unit 3104, configured for including a message relating to updating a stored configuration of the wireless device on the paging channel.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Various numbered embodiments of the disclosure are set out below:

Group A Embodiments

1. A method performed by a wireless device for updating a stored configuration, the method comprising:
    while in a power saving state, monitoring a paging channel;
    when receiving a paging message on the paging channel, determining whether the paging channel includes a message relating to re-configuring a context of the wireless device; and
    if the paging channel includes a message relating to re-configuring the context of the wireless device, performing actions determined by said message.
2. The message of embodiment 1, wherein the message relating to re-configuring the context of the wireless device comprises information about re-configuring the context of the wireless device, included in the paging message.
3. The message of embodiment 1, wherein the message relating to re-configuring the context of the wireless device comprises information about re-configuring the context of the wireless device, separate from the paging message but sent in conjunction with the paging message.
4. The message of embodiment 1, wherein the message relating to re-configuring the context of the wireless device comprises information indicating where the wireless device should look for information about re-configuring the context of the wireless device.
5. The method of embodiment 2, 3 or 4, wherein the information about re-configuring the context of the wireless device is provided in a Packet Data Convergence Protocol, PDCP, Protocol Data Unit, PDU.
6. The method of embodiment 5, wherein the PDCP PDU is encrypted.
7. The method of embodiment 5, wherein the PDCP PDU is partially encrypted.
8. The method of embodiment 5, wherein the PDCP PDU is unencrypted.

9. The method of any of embodiments 2-8, wherein the information about re-configuring the context of the wireless device comprises a message re-configuring the Inactive state parameters of the wireless device.
10. The method of embodiment 9, wherein the message re-configuring the Inactive state parameters of the wireless device comprises: an RRCRelease message with a suspend configuration; an RRCRelease message without a suspend configuration; an RRCConnectionRelease message with a suspend configuration; or a RRCConnectionRelease message without a suspend configuration.
11. The method of any of embodiments 2-8, wherein the information about re-configuring the context of the wireless device comprises a message re-configuring the Connected state parameters of the wireless device for use when the wireless device resumes the Connected state.
12. The method of embodiment 11, wherein the message re-configuring the Inactive state parameters of the wireless device comprises: an RRCReconfiguration message; or an RRCReconfiguration message.
13. The method of any of embodiments 1-12, wherein the power saving state comprises an RRC Inactive state.
14. The method of any of embodiments 1-12, wherein the power saving state comprises an RRC Idle state with a stored context.
15. The method of any of embodiments 1-12, wherein the power saving state comprises an RRC Idle state without a stored context.
16. The method of any of embodiments 1-15, wherein the step of determining whether the paging channel includes a message relating to re-configuring the context of the wireless device comprises:
determining that the paging channel includes a message that may be a message relating to re-configuring the context of the wireless device;
performing preparation actions and decoding the message included in the paging channel; and
determining whether the message included in the paging channel is a message relating to re-configuring the context of the wireless device.
17. The method of embodiment 16, further comprising, in response to determining that the paging channel includes a message that may be a message relating to re-configuring the context of the wireless device, verifying the integrity of the content of said message.
18. The method of embodiment 16 or 17, further comprising, in response to determining that the paging channel includes a message that may be a message relating to re-configuring the context of the wireless device, restoring a configuration last used by the wireless device in a Connected state.
19. The method of any of embodiments 1-18, further comprising acknowledging that said message relating to re-configuring the context of the wireless device has been received.
20. The method of embodiment 19, wherein acknowledging that said message relating to re-configuring the context of the wireless device has been received comprises performing a random access procedure.
21. The method of any of embodiments 1-20, comprising monitoring the paging channel during discontinuous reception, DRX, paging opportunities.
22. The method of any of the previous embodiments, further comprising:
providing user data; and
forwarding the user data to a host computer via the transmission to the base station.

Group B Embodiments

23. A method performed by a base station for updating a stored configuration of a wireless device, the method comprising:
transmitting a paging message to a wireless device that is in a power saving state, on a paging channel; and
including a message relating to re-configuring a context of the wireless device on the paging channel.
24. The message of embodiment 23, wherein the message relating to re-configuring the context of the wireless device comprises information about re-configuring the context of the wireless device, included in the paging message.
25. The message of embodiment 23, wherein the message relating to re-configuring the context of the wireless device comprises information about re-configuring the context of the wireless device, separate from the paging message but sent in conjunction with the paging message.
26. The message of embodiment 23, wherein the message relating to re-configuring the context of the wireless device comprises information indicating where the wireless device should look for information about re-configuring the context of the wireless device.
27. The method of embodiment 24, 25 or 26, wherein the information about re-configuring the context of the wireless device is provided in a Packet Data Convergence Protocol, PDCP, Protocol Data Unit, PDU.
28. The method of embodiment 27, wherein the PDCP PDU is encrypted.
29. The method of embodiment 27, wherein the PDCP PDU is partially encrypted.
30. The method of embodiment 27, wherein the PDCP PDU is unencrypted.
31. The method of any of embodiments 23-30, wherein the information about re-configuring the context of the wireless device comprises a message re-configuring the Inactive state parameters of the wireless device.
32. The method of embodiment 31, wherein the message re-configuring the Inactive state parameters of the wireless device comprises: an RRCRelease message with a suspend configuration; an RRCRelease message without a suspend configuration; an RRCConnectionRelease message with a suspend configuration; or a RRCConnectionRelease message without a suspend configuration.
33. The method of any of embodiments 23-30, wherein the information about re-configuring the context of the wireless device comprises a message re-configuring the Connected state parameters of the wireless device for use when the wireless device resumes the Connected state.
34. The method of embodiment 33, wherein the message re-configuring the Inactive state parameters of the wireless device comprises: an RRCReconfiguration message; or an RRCReconfiguration message.
35. The method of any of embodiments 23-34, wherein the power saving state comprises an RRC Inactive state.

36. The method of any of embodiments 23-34, wherein the power saving state comprises an RRC Idle state with a stored context.
37. The method of any of embodiments 23-34, wherein the power saving state comprises an RRC Idle state without a stored context.
38. The method of any of embodiments 23-37, further comprising applying integrity protection to said message relating to re-configuring the context of the wireless device.
39. The method of any of embodiments 23-38, further comprising receiving from the wireless device an acknowledgement that said message relating to re-configuring the context of the wireless device has been received by said wireless device.
40. The method of embodiment 39, wherein said acknowledgement comprises a random access procedure.
41. The method of any of the previous embodiments, further comprising:
obtaining user data; and
forwarding the user data to a host computer or a wireless device.

Group C Embodiments

42. A wireless device, comprising:
processing circuitry configured to perform any of the steps of any of the Group A embodiments; and
power supply circuitry configured to supply power to the wireless device.
43. A base station, comprising:
processing circuitry configured to perform any of the steps of any of the Group B embodiments;
power supply circuitry configured to supply power to the base station.
44. A user equipment (UE), comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
45. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
46. The communication system of the previous embodiment further including the base station.

47. The communication system of the previous 2 embodiments, further including the UE, wherein the UE is configured to communicate with the base station.
48. The communication system of the previous 3 embodiments, wherein:
the processing circuitry of the host computer is configured to execute a host application, thereby providing the user data; and
the UE comprises processing circuitry configured to execute a client application associated with the host application.
49. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
50. The method of the previous embodiment, further comprising, at the base station, transmitting the user data.
51. The method of the previous 2 embodiments, wherein the user data is provided at the host computer by executing a host application, the method further comprising, at the UE, executing a client application associated with the host application.
52. A user equipment (UE) configured to communicate with a base station, the UE comprising a radio interface and processing circuitry configured to performs the of the previous 3 embodiments.
53. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
54. The communication system of the previous embodiment, wherein the cellular network further includes a base station configured to communicate with the UE.
55. The communication system of the previous 2 embodiments, wherein:
the processing circuitry of the host computer is configured to execute a host application, thereby providing the user data; and
the UE's processing circuitry is configured to execute a client application associated with the host application.
56. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
57. The method of the previous embodiment, further comprising at the UE, receiving the user data from the base station.
58. A communication system including a host computer comprising:
communication interface configured to receive user data originating from a transmission from a user equipment (UE) to a base station, wherein the UE comprises a radio interface and processing circuitry, the UE's processing circuitry configured to perform any of the steps of any of the Group A embodiments.
59. The communication system of the previous embodiment, further including the UE.
60. The communication system of the previous 2 embodiments, further including the base station, wherein the base station comprises a radio interface configured to communicate with the UE and a communication interface configured to forward to the host computer the user data carried by a transmission from the UE to the base station.
61. The communication system of the previous 3 embodiments, wherein:
the processing circuitry of the host computer is configured to execute a host application; and
the UE's processing circuitry is configured to execute a client application associated with the host application, thereby providing the user data.
62. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
63. A method implemented in a communication system including a host computer, a base station and a user equipment (UE), the method comprising:
at the host computer, receiving user data transmitted to the base station from the UE, wherein the UE performs any of the steps of any of the Group A embodiments.
64. The method of the previous embodiment, further comprising, at the UE, providing the user data to the base station.
65. The method of the previous 2 embodiments, further comprising:
at the UE, executing a client application, thereby providing the user data to be transmitted; and
at the host computer, executing a host application associated with the client application.
66. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
67. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
68. The communication system of the previous embodiment further including the base station.
69. The communication system of the previous 2 embodiments, further including the UE, wherein the UE is configured to communicate with the base station.
70. The communication system of the previous 3 embodiments, wherein:
the processing circuitry of the host computer is configured to execute a host application;
the UE is configured to execute a client application associated with the host application, thereby providing the user data to be received by the host computer.
71. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.
72. The method of the previous embodiment, further comprising at the base station, receiving the user data from the UE.
73. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for updating a stored configuration, the method comprising:
   monitoring a paging channel while the wireless device is in a power-saving state;
   when receiving a paging message on the paging channel, determining whether the paging channel includes a message relating to updating a stored configuration of the wireless device;
   when the paging channel includes the message relating to updating the stored configuration of the wireless device, performing actions associated with the message relating to updating the stored configuration; and
   the message relating to updating the stored configuration of the wireless device comprising:
     information about updating the stored configuration of the wireless device received separate from the paging message but received in conjunction with the paging message; and
     a message re-configuring Inactive state parameters of the wireless device, the message re-configuring the Inactive state parameters of the wireless device comprising one of the following:
       an RRCRelease message without a suspend configuration; or
       an RRCConnectionRelease message without a suspend configuration.

2. The method of claim 1, wherein the message relating to updating the stored configuration of the wireless device comprises information indicating where the wireless device should look for information about updating the stored configuration of the wireless device.

3. The method of claim 1, wherein the information about updating the stored configuration of the wireless device is received in a Packet Data Convergence Protocol (PDCP) Protocol Data Unit (PDU).

4. The method of claim 1, wherein the message relating to updating the stored configuration of the wireless device comprises an RRCReconfiguration message that re-configures Connected state parameters of the wireless device for use when the wireless device resumes the Connected state.

5. The method of claim 1, wherein the message relating to updating the stored configuration of the wireless device comprises a message re-configuring one or more of the following: an Inactive Radio Network Temporary Identifier (I-RNTI) of the wireless device; cell reselection priorities of the wireless device; and a Radio Access Notification Area Configuration (RANAC) of the wireless device.

6. The method of claim 1, wherein determining whether the paging channel includes a message relating to updating the stored configuration of the wireless device comprises:
   determining that the paging channel includes a message that may be a message relating to updating the stored configuration of the wireless device;
   performing preparation actions and decoding the message included in the paging channel; and
   determining whether the message included in the paging channel is a message relating to updating the stored configuration of the wireless device.

7. The method of claim 6, further comprising performing one or more of the following in response to determining that the paging channel includes a message that may be a message relating to updating the stored configuration of the wireless device:
   verifying integrity of content of the message included in the paging channel; and
   restoring a configuration last used by the wireless device in a Connected state.

8. The method of claim 1, further comprising performing a random access procedure to acknowledge that said message relating to updating the stored configuration of the wireless device has been received by the wireless device.

9. The method of claim 1, wherein the paging channel is monitored during one paging opportunity per discontinuous reception (DRX) cycle of the wireless device.

10. A method performed by a base station for updating a stored configuration of a wireless device, the method comprising:
    transmitting the following on a paging channel to a wireless device that is in a power saving state: a paging message, and a message relating to updating the stored configuration of the wireless device; and
    the message relating to updating the stored configuration of the wireless device comprising:
        information about updating the stored configuration of the wireless device transmitted separate from the paging message but transmitted in conjunction with the paging message; and
        a message re-configuring Inactive state parameters of the wireless device, the message re-configuring the Inactive state parameters of the wireless device comprising one of the following:
            an RRCRelease message without a suspend configuration; or
            an RRCConnectionRelease message without a suspend configuration.

11. The method of claim 10, wherein the message relating to updating the stored configuration of the wireless device comprises information indicating where the wireless device should look for information about updating the stored configuration of the wireless device.

12. The method of claim 10, wherein the information about updating the stored configuration of the wireless device is provided in a Packet Data Convergence Protocol (PDCP) Protocol Data Unit (PDU).

13. The method of claim 10, wherein the message relating to updating the stored configuration of the wireless device comprises an RRCReconfiguration message that reconfigures the Connected state parameters of the wireless device for use when the wireless device resumes the Connected state.

14. The method of claim 10, wherein the message relating to updating the stored configuration of the wireless device comprises a message re-configuring one or more of the following: an Inactive Radio Network Temporary Identifier (I-RNTI) of the wireless device; cell reselection priorities of the wireless device; and a Radio Access Notification Area Configuration (RANAC) of the wireless device.

15. The method of claim 10, further comprising receiving from the wireless device a random access that comprises an acknowledgement that said message relating to updating the stored configuration has been received by the wireless device.

16. A wireless device, comprising:
    a processor; and
    a memory storing computer-executable instructions that, when executed by the processor, configure the wireless device to:
        monitor a paging channel while the wireless device is in a power-saving state;
        when receiving a paging message on the paging channel, determining whether the paging channel includes a message relating to updating a stored configuration of the wireless device; and
        when the paging channel includes the message relating to updating the stored configuration of the wireless device, perform actions associated with the message relating to updating the stored configuration;
    the message relating to updating the stored configuration of the wireless device comprising:
        information about updating the stored configuration of the wireless device received separate from the paging message but received in conjunction with the paging message; and
        a message re-configuring Inactive state parameters of the wireless device, the message re-configuring the Inactive state parameters of the wireless device comprising one of the following:
            an RRCRelease message without a suspend configuration; or
            an RRCConnectionRelease message without a suspend configuration.

17. A base station comprising:
    a processor; and
    a memory storing computer-executable instructions that, when executed by the processor, configure the base station to:
        transmit the following on a paging channel to a wireless device that is in a power saving state: a paging message, and a message relating to updating the stored configuration of the wireless device; and
        the message relating to updating the stored configuration of the wireless device comprising:
            information about updating the stored configuration of the wireless device transmitted separate from the paging message but transmitted in conjunction with the paging message; and
            a message re-configuring Inactive state parameters of the wireless device, the message re-configuring the Inactive state parameters of the wireless device comprising one of the following:
                an RRCRelease message without a suspend configuration; or
                an RRCConnectionRelease message without a suspend configuration.

* * * * *